(12) United States Patent
Blodgett et al.

(10) Patent No.: US 11,319,920 B2
(45) Date of Patent: May 3, 2022

(54) SYSTEMS AND METHODS FOR HYDRO-BASED ELECTRIC POWER GENERATION

(71) Applicant: BIG MOON POWER, INC., Salt Lake City, UT (US)

(72) Inventors: Lynn Blodgett, Malad City, ID (US); Colin Bagley, Salt Lake City, UT (US); Andrew Jenkins, Midway, UT (US); Jeff Blodgett, Cottonwood Heights, UT (US); Robert Dunow, West Jordan, UT (US); Ernest Blodgett, Heber City, UT (US)

(73) Assignee: Big Moon Power, Inc., Salt Lake City, UT (US)

( * ) Notice: Subject to any disclaimer, the term of this patent is extended or adjusted under 35 U.S.C. 154(b) by 0 days.

(21) Appl. No.: 16/811,446

(22) Filed: Mar. 6, 2020

(65) Prior Publication Data
US 2021/0246866 A1  Aug. 12, 2021

Related U.S. Application Data

(60) Provisional application No. 62/866,376, filed on Jun. 25, 2019, provisional application No. 62/815,670, filed on Mar. 8, 2019.

(51) Int. Cl.
*F03B 17/06* (2006.01)
*F03B 3/14* (2006.01)
(Continued)

(52) U.S. Cl.
CPC ............ *F03B 17/065* (2013.01); *F03B 3/145* (2013.01); *F03B 7/00* (2013.01); *H02K 7/1004* (2013.01);
(Continued)

(58) Field of Classification Search
CPC .......... F03B 3/145; F03B 7/00; F03B 17/065; H02K 7/1004; H02K 7/1823; B63B 2035/4466; F05B 2220/706
(Continued)

(56) References Cited

U.S. PATENT DOCUMENTS

| 4,843 A | 11/1846 | Rowand |
| 244,221 A | 7/1881 | Fountain et al. |

(Continued)

FOREIGN PATENT DOCUMENTS

| CA | 2546897 | 2/2007 |
| CA | 2899837 | 5/2016 |

(Continued)

OTHER PUBLICATIONS

International Search Report and Written Opinion for PCT Application No. PCT/US2020/021402 dated May 19, 2020, 14 pages.
(Continued)

*Primary Examiner* — Pedro J Cuevas
(74) *Attorney, Agent, or Firm* — Cadwalader, Wickersham & Taft LLP

(57) ABSTRACT

A hydrodynamic power generation assembly and method of use therefor for generating electrical power from the combination of kinetic energy, hydrostatic energy, and turbulent energy of water. The power generation assembly comprises a water accelerator assembly comprising a support structure which is at least partially buoyant and a baffle panel member (or an array of baffle panel members) having an opening, inter-panel spacing, or flow passageway around the baffle panel(s). A hydropower converter is supported from, by, or on the support structure and is operatively coupled to a generator. The hydropower converter is positioned behind baffle assembly. Water flowing through or around the baffle assembly has an increased velocity relative the ambient
(Continued)

current and therefore is capable of generating more power relative to the ambient water where power generation assembly is deployed. Particular types of hydropower converters suitable for use with the invention are turbines and water wheels.

103 Claims, 27 Drawing Sheets

(51) Int. Cl.
    *F03B 7/00*                (2006.01)
    *H02K 7/10*              (2006.01)
    *H02K 7/18*              (2006.01)
    *B63B 1/04*               (2006.01)
    *B63B 35/34*            (2006.01)
    *B63B 35/44*            (2006.01)

(52) U.S. Cl.
    CPC .............. *H02K 7/1823* (2013.01); *B63B 1/04* (2013.01); *B63B 35/34* (2013.01); *B63B 35/44* (2013.01); *B63B 2035/4466* (2013.01); *F05B 2220/706* (2013.01)

(58) Field of Classification Search
    USPC ................ 290/42, 43, 53, 54; 415/7; 416/87
    See application file for complete search history.

(56) References Cited

U.S. PATENT DOCUMENTS

| | | | |
|---|---|---|---|
| 313,746 A * | 3/1885 | Man ......................... | F03B 13/00 290/43 |
| 328,447 A * | 10/1885 | Brady ..................... | F03B 13/00 290/43 |
| 946,585 A | 1/1910 | Smith | |
| 1,020,574 A | 3/1912 | Redfield | |
| 1,157,416 A * | 10/1915 | Olive ........................... | 416/119 |
| 1,333,443 A | 3/1920 | Rennolds | |
| 1,334,595 A * | 3/1920 | Canaday ............... | F03B 17/063 416/246 |
| 3,275,008 A | 9/1966 | Kerensky | |
| 3,314,647 A | 4/1967 | Pavlecka | |
| 3,644,052 A | 2/1972 | Lininger | |
| 3,785,159 A | 1/1974 | Hammond | |
| 3,883,261 A * | 5/1975 | Saxmann .............. | F03D 3/0463 415/7 |
| 3,986,787 A * | 10/1976 | Mouton, Jr. .......... | F03B 17/061 415/7 |
| 4,023,041 A * | 5/1977 | Chappell ............... | F03B 13/184 290/53 |
| 4,025,220 A | 5/1977 | Thompson et al. | |
| 4,075,500 A | 2/1978 | Oman et al. | |
| 4,076,447 A | 2/1978 | Granath et al. | |
| 4,172,689 A * | 10/1979 | Thorsheim ............ | F03B 13/145 415/7 |
| 4,219,303 A | 8/1980 | Mouton, Jr. et al. | |
| 4,239,976 A | 12/1980 | Collard | |
| 4,241,283 A * | 12/1980 | Storer, Sr. ................ | E02B 9/04 290/54 |
| 4,383,797 A * | 5/1983 | Lee ....................... | F03B 17/062 415/7 |
| 4,622,471 A * | 11/1986 | Schroeder ............. | F03B 13/145 290/42 |
| 4,625,124 A * | 11/1986 | Ching-An ............. | F03B 13/145 290/42 |
| 4,710,101 A * | 12/1987 | Jamieson ............... | F03D 7/0252 416/32 |
| 4,746,807 A | 5/1988 | Furo | |
| 4,843,249 A * | 6/1989 | Bussiere ............... | F03B 13/184 290/53 |
| 5,009,568 A | 4/1991 | Bell | |
| 5,405,250 A | 4/1995 | Vowles et al. | |
| 5,430,332 A | 7/1995 | Dunn, Jr. | |
| 5,440,175 A * | 8/1995 | Mayo, Jr. ................. | F03B 7/003 290/54 |
| 5,575,587 A | 11/1996 | Chen | |
| 5,850,108 A | 12/1998 | Bernard | |
| 6,029,688 A | 2/2000 | Kaufman | |
| 6,091,161 A * | 7/2000 | Dehlsen .................... | B63G 8/22 290/43 |
| 6,168,373 B1 | 1/2001 | Vauthier | |
| 6,208,037 B1 * | 3/2001 | Mayo, Jr. .................. | E02B 9/00 290/54 |
| 6,365,984 B1 * | 4/2002 | Shu ......................... | F03B 17/02 290/53 |
| 6,499,939 B2 | 12/2002 | Downing | |
| 6,902,370 B2 * | 6/2005 | Dawson ................ | F03D 7/0236 415/4.1 |
| 6,954,006 B2 | 10/2005 | Williams, Jr. | |
| 7,018,166 B2 | 3/2006 | Gaskell | |
| 7,071,578 B1 * | 7/2006 | Shibata ................. | F03D 7/0236 290/55 |
| 7,081,690 B2 * | 7/2006 | Coman ................. | F03B 17/063 290/54 |
| 7,223,137 B1 | 5/2007 | Sosnowski | |
| 7,270,513 B2 | 9/2007 | Regan et al. | |
| 7,291,936 B1 | 11/2007 | Robson | |
| 7,375,437 B2 | 5/2008 | Peckham | |
| 7,425,774 B2 * | 9/2008 | Shibata ................. | F03D 7/0236 290/55 |
| 7,425,775 B2 * | 9/2008 | Shibata ................. | F03D 7/0236 290/55 |
| 7,436,085 B2 * | 10/2008 | Shibata ................. | F03D 7/0236 290/55 |
| 7,462,949 B2 | 12/2008 | Coman | |
| 7,466,035 B1 | 12/2008 | Srybnik et al. | |
| 7,470,087 B2 | 12/2008 | Liou | |
| 7,581,926 B1 * | 9/2009 | Dehlsen ................ | F03D 7/0236 416/87 |
| 7,633,178 B1 | 12/2009 | Embree | |
| 7,685,804 B2 | 3/2010 | Evulet | |
| 7,851,936 B2 | 12/2010 | Bolin | |
| 7,855,468 B2 * | 12/2010 | Lin ........................... | F03D 3/067 290/54 |
| 7,902,687 B2 | 3/2011 | Sauer et al. | |
| 7,969,034 B2 | 6/2011 | Winius | |
| 8,072,091 B2 | 12/2011 | Wilson et al. | |
| 8,102,071 B2 | 1/2012 | Catlin | |
| 8,115,329 B2 | 2/2012 | Thompson | |
| 8,120,196 B1 * | 2/2012 | Neese .................... | F03B 13/262 290/54 |
| 8,129,855 B1 | 3/2012 | Tong et al. | |
| 8,143,736 B2 | 3/2012 | Farb | |
| 8,152,441 B2 | 4/2012 | Hofmann | |
| 8,164,209 B2 | 4/2012 | Rovinsky | |
| 8,177,477 B2 | 5/2012 | Lyatkher | |
| 8,206,107 B2 * | 6/2012 | Dawson ................ | F03D 7/0236 416/87 |
| 8,206,113 B2 * | 6/2012 | Ryynanen ............ | F03B 13/183 416/176 |
| 8,210,805 B1 | 7/2012 | Osborne | |
| 8,231,347 B2 * | 7/2012 | Dawson ................ | F03D 1/0683 416/87 |
| 8,237,304 B2 * | 8/2012 | Dehlsen ................ | F03B 17/061 290/54 |
| 8,277,168 B2 | 10/2012 | Jack | |
| 8,288,882 B2 * | 10/2012 | Bolin .................... | F03B 17/061 290/54 |
| 8,341,957 B2 | 1/2013 | Joseph | |
| 8,354,758 B1 | 1/2013 | Boschma | |
| 8,358,023 B2 | 1/2013 | West | |
| 8,466,574 B2 | 6/2013 | Bear et al. | |
| 8,475,113 B2 | 7/2013 | Unno | |
| 8,601,808 B1 | 12/2013 | Joseph | |
| 8,616,830 B2 | 12/2013 | Unno | |
| 8,668,452 B2 | 3/2014 | Henriksen | |
| 8,772,957 B2 * | 7/2014 | Willingham ............. | F03B 7/00 290/55 |
| 8,970,055 B2 | 3/2015 | Sharon et al. | |

(56) References Cited

U.S. PATENT DOCUMENTS

| | | |
|---|---|---|
| 9,000,604 B2 | 4/2015 | Sireli et al. |
| 9,041,235 B1 | 5/2015 | Hunter et al. |
| 9,222,460 B2 | 12/2015 | Petrounevitch |
| 9,228,560 B2 | 1/2016 | Willingham |
| 9,243,605 B2 | 1/2016 | Nunez |
| D748,576 S | 2/2016 | Guinard |
| 9,291,149 B1 | 3/2016 | Hostetler |
| 9,303,619 B2 | 4/2016 | Antonucci et al. |
| 9,534,579 B2* | 1/2017 | Van Rompay ........ F03B 17/063 |
| 9,556,848 B2 | 1/2017 | Lin et al. |
| 9,657,399 B2 | 5/2017 | Leonard |
| 9,664,170 B2 | 5/2017 | Nogueira Dias Da Silva |
| 9,677,539 B2 | 6/2017 | Tamatsu |
| 9,689,368 B2 | 6/2017 | Hopper |
| 9,712,094 B2 | 7/2017 | Bergman |
| 9,719,482 B2 | 8/2017 | Hong |
| 9,739,255 B2 | 8/2017 | Heald |
| 9,745,951 B1 | 8/2017 | Doyle |
| 9,752,552 B2 | 9/2017 | Yu et al. |
| 9,765,752 B2 | 9/2017 | Lin et al. |
| 9,803,614 B2 | 10/2017 | Williams et al. |
| 9,976,535 B2 | 5/2018 | Beane |
| 9,995,268 B2 | 6/2018 | Kim et al. |
| 10,041,468 B2 | 8/2018 | Lai |
| 10,054,103 B2 | 8/2018 | Lin et al. |
| 10,060,407 B2 | 8/2018 | Elefant et al. |
| 10,100,803 B1 | 10/2018 | Alvarado |
| 10,138,563 B2 | 11/2018 | Kumano |
| 10,151,302 B2 | 12/2018 | Takahashi et al. |
| 10,161,379 B2 | 12/2018 | Nanehkaran |
| 10,167,844 B2 | 1/2019 | Schneider |
| 10,190,566 B2 | 1/2019 | Lin et al. |
| 10,221,830 B2 | 3/2019 | Schneider |
| 10,330,073 B2 | 6/2019 | Shin et al. |
| 10,378,504 B2 | 8/2019 | Blodgett et al. |
| 10,422,311 B2* | 9/2019 | Gehring ................ F03B 13/00 |
| 10,458,385 B2 | 10/2019 | Blodgett et al. |
| 10,458,394 B2 | 10/2019 | De Luca et al. |
| 10,527,021 B2 | 1/2020 | Schneider |
| 10,560,043 B2 | 2/2020 | Bergman |
| 10,648,449 B2* | 5/2020 | Kawai ................... F03B 17/061 |
| 10,666,174 B2 | 5/2020 | Bergman |
| 10,683,840 B2* | 6/2020 | Doria Iriarte ......... F03B 17/063 |
| 10,975,832 B2* | 4/2021 | Gehring ................ F03B 13/10 |
| 2002/0141858 A1* | 10/2002 | Downing ............. F03B 17/065 415/3.1 |
| 2002/0195823 A1 | 12/2002 | Aguirre |
| 2003/0123973 A1* | 7/2003 | Murakami ............ F03D 7/0228 415/4.1 |
| 2003/0223868 A1* | 12/2003 | Dawson ................ F03D 7/0236 416/1 |
| 2004/0131466 A1* | 7/2004 | Shu ....................... F03B 17/065 416/131 |
| 2005/0200134 A1* | 9/2005 | Shibata ................. F03D 7/0236 290/55 |
| 2005/0200135 A1* | 9/2005 | Shibata ................. F03D 7/0236 290/55 |
| 2005/0207889 A1* | 9/2005 | Shibata ................. F03D 7/0236 416/132 B |
| 2005/0207890 A1* | 9/2005 | Shibata ................. F03D 7/0236 416/132 B |
| 2005/0236843 A1 | 10/2005 | Roddier et al. |
| 2006/0119107 A1* | 6/2006 | Coman ................. F03B 17/063 290/54 |
| 2006/0186671 A1 | 8/2006 | Honda et al. |
| 2007/0015452 A1 | 1/2007 | Chen |
| 2007/0020097 A1 | 1/2007 | Ursua |
| 2007/0029806 A1* | 2/2007 | Coman ................. F03B 17/063 290/54 |
| 2007/0122279 A1 | 5/2007 | Sredzki et al. |
| 2007/0241566 A1 | 10/2007 | Kuehnle |
| 2007/0292259 A1 | 12/2007 | Choie |
| 2008/0088132 A1 | 4/2008 | Laube von Laubenfels |
| 2008/0159873 A1 | 7/2008 | Tran |
| 2008/0309089 A1* | 12/2008 | Lin ........................ F03D 3/067 290/54 |
| 2009/0189395 A1* | 7/2009 | Ryynanen ............. F03B 13/183 290/53 |
| 2009/0322091 A1 | 12/2009 | Jack |
| 2009/0322093 A1* | 12/2009 | Winius ................. F03B 17/063 290/54 |
| 2010/0034649 A1 | 2/2010 | Taylor |
| 2010/0066089 A1 | 3/2010 | Best et al. |
| 2010/0084870 A1 | 4/2010 | Burcik |
| 2010/0181774 A1* | 7/2010 | Dehlsen ................ F03B 17/061 290/54 |
| 2010/0258449 A1 | 10/2010 | Fielder |
| 2010/0260603 A1* | 10/2010 | Dawson ................ F03D 7/0236 416/87 |
| 2010/0295313 A1 | 11/2010 | Chen |
| 2010/0301609 A1 | 12/2010 | Kim et al. |
| 2012/0003077 A1 | 1/2012 | Churchill |
| 2012/0007361 A1* | 1/2012 | Agtuca .................... H02P 9/04 290/43 |
| 2012/0032447 A1 | 2/2012 | Bang-Moeller |
| 2012/0086207 A1 | 4/2012 | Gray |
| 2012/0099977 A1 | 4/2012 | Churchill et al. |
| 2012/0141249 A1 | 6/2012 | Carlson |
| 2012/0317970 A1 | 12/2012 | Edvardsen |
| 2013/0115045 A1 | 5/2013 | Korac |
| 2013/0285383 A1 | 10/2013 | Belarbi |
| 2013/0294918 A1 | 11/2013 | Jaquier et al. |
| 2013/0313833 A1 | 11/2013 | Bang |
| 2014/0044543 A1 | 2/2014 | Jokela |
| 2014/0265335 A1 | 9/2014 | Andreis et al. |
| 2015/0292473 A1 | 10/2015 | Laval-Jeantet |
| 2015/0369207 A1 | 12/2015 | Cinque |
| 2016/0032888 A1 | 2/2016 | McCormack |
| 2016/0079829 A1 | 3/2016 | Vera |
| 2016/0084218 A1 | 3/2016 | Obermeyer et al. |
| 2016/0115937 A1 | 4/2016 | Pettersson |
| 2016/0141911 A1 | 5/2016 | Al-Garni |
| 2016/0141986 A1* | 5/2016 | Bergman .................. H02P 9/04 290/43 |
| 2016/0141987 A1* | 5/2016 | Bergman ................ F03B 13/00 290/43 |
| 2016/0201639 A1* | 7/2016 | Hong .................... F03B 17/063 290/54 |
| 2016/0319798 A1 | 11/2016 | Blodgett et al. |
| 2017/0045026 A1 | 2/2017 | Fang et al. |
| 2017/0074232 A1 | 3/2017 | Shin et al. |
| 2017/0138333 A1 | 5/2017 | Toran |
| 2017/0175699 A1 | 6/2017 | Bolin |
| 2017/0204830 A1 | 7/2017 | Schneider |
| 2017/0210447 A1 | 7/2017 | Chen |
| 2017/0317627 A1 | 11/2017 | Bergman |
| 2018/0023537 A1 | 1/2018 | Oh |
| 2018/0023625 A1 | 1/2018 | Lin |
| 2018/0106236 A1 | 4/2018 | Lee |
| 2018/0195496 A1 | 7/2018 | De Luca et al. |
| 2018/0202414 A1 | 7/2018 | Hume |
| 2018/0252199 A1 | 9/2018 | Huebner |
| 2018/0258905 A1 | 9/2018 | Elefant et al. |
| 2018/0274516 A1 | 9/2018 | Doria Iriarte |
| 2019/0072065 A1* | 3/2019 | Kawai ..................... F03B 15/00 |
| 2019/0242354 A1 | 8/2019 | Schneider |
| 2019/0249645 A1 | 8/2019 | Schneider |

FOREIGN PATENT DOCUMENTS

| | | |
|---|---|---|
| CN | 200961557 Y | 10/2007 |
| CN | 202690309 U | 1/2013 |
| CN | 202900528 U | 4/2013 |
| CN | 102845275 B | 11/2013 |
| CN | 204572326 U | 8/2015 |
| CN | 205315190 U | 6/2016 |
| CN | 103790756 B | 8/2016 |
| CN | 105840392 B | 12/2017 |
| DE | 4128886 A1 | 7/1992 |
| DE | 19849975 A1 | 5/2000 |
| DE | 10036307 A1 | 2/2002 |
| DE | 102005040805 A1 | 3/2007 |

(56) References Cited

FOREIGN PATENT DOCUMENTS

| | | |
|---|---|---|
| DE | 102005040807 A1 | 3/2007 |
| DE | 202010001796 U1 | 6/2010 |
| DE | 102010048791 A1 | 4/2012 |
| DE | 102011052667 | 2/2013 |
| EP | 2136072 A1 | 12/2009 |
| EP | 1731757 B1 | 1/2011 |
| EP | 2439402 A4 | 4/2013 |
| EP | 2307711 B1 | 7/2013 |
| EP | 2541043 A3 | 3/2014 |
| EP | 2728174 A1 | 5/2014 |
| FR | 2900205 A1 | 10/2007 |
| FR | 2988441 | 9/2013 |
| FR | 3029498 A1 | 6/2016 |
| GB | 2487448 | 7/2012 |
| GB | 2490729 | 11/2012 |
| IN | 201390 B | 2/2007 |
| KR | 20050003976 A | 1/2005 |
| KR | 100697717 | 3/2007 |
| KR | 20120030291 A | 3/2012 |
| WO | WO 1981000595 | 3/1981 |
| WO | WO 1999064740 | 12/1999 |
| WO | WO 2002092919 | 11/2002 |
| WO | WO 2007/022549 | 2/2007 |
| WO | WO 2007031592 | 3/2007 |
| WO | WO 2009004308 | 1/2009 |
| WO | WO 2010114496 | 10/2010 |
| WO | WO 2011088748 | 7/2011 |
| WO | WO 2011097747 | 8/2011 |
| WO | WO 2012127218 | 9/2012 |
| WO | WO 2013089398 | 6/2013 |
| WO | WO 2014041232 | 3/2014 |
| WO | WO 2014065475 | 5/2014 |
| WO | WO 2014136134 | 9/2014 |
| WO | WO 2014194438 | 12/2014 |
| WO | WO 2015/055962 | 4/2015 |
| WO | WO 2015187028 | 12/2015 |
| WO | WO 2016005219 | 1/2016 |
| WO | WO 2016147019 | 9/2016 |
| WO | WO 2017026894 | 2/2017 |
| WO | WO 2017149389 | 9/2017 |
| WO | WO 2017/200383 | 11/2017 |
| WO | WO 2017212356 | 12/2017 |
| WO | WO 2018077414 | 5/2018 |
| WO | WO 2018146511 | 8/2018 |
| WO | WO 2018191779 | 10/2018 |

OTHER PUBLICATIONS

Makken Makken, "Water Power Generator Part 2" YouTube video, published Jul. 30, 2013, https://www.youtube.com/watch?v=jwmZEXp9kLU.

Turnock, et al., "Development of a floating tidal energy system suitable for use in shallow water," Proceedings of the 7th European Wave and Tidal Energy Conference, Porto, Portugal, 2007, 9 pages.

Zarate-Orrego et al., "Horizontal Vortex Single Chamber Hydroturbine," Revista Facultad de Ingeniería, Universidad de Antioquía, No. 79, pp. 150-162, 2016.

Senior et al., "New hydropower converters for very low-head differences", Journal of Hydraulic Research vol. 48, No. 6 (2010), pp. 703-714.

Müller, G. et al. "Stream wheels for applications in shallow and deep water." (2007).

Müller, G. et al. "Potential, performance limits and environmental effects of floating water mills" River Flow (2010).

Batten, W. et al., "Potential for Using the Floating Body Structure to Increase the Efficiency of a Free Stream Energy Converter." (2011).

Batten, W. et al. "Design and Stability of a Floating Free Stream Energy Converter." (2011).

\* cited by examiner

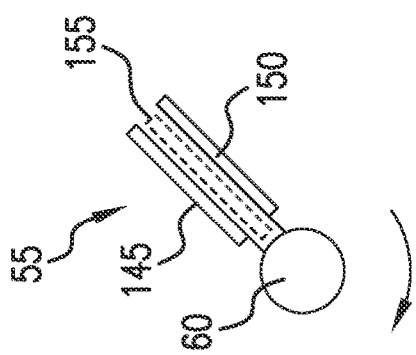
FIG.20B
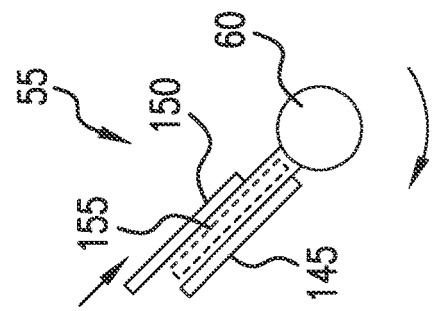
FIG.20E
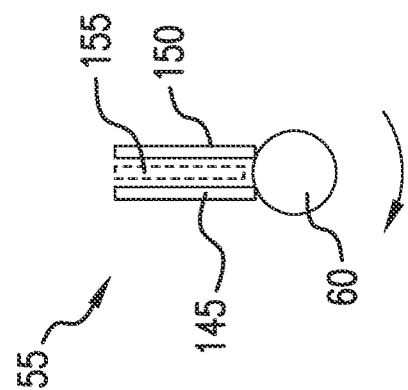
FIG.20A
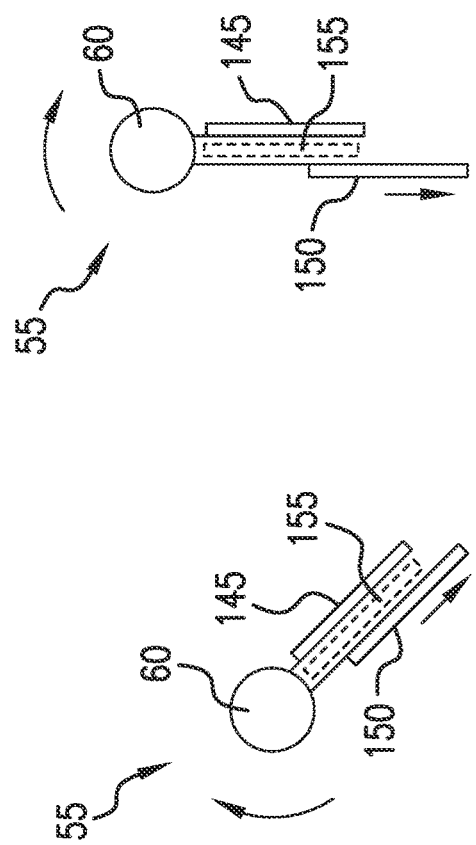
FIG.20D
FIG.20C

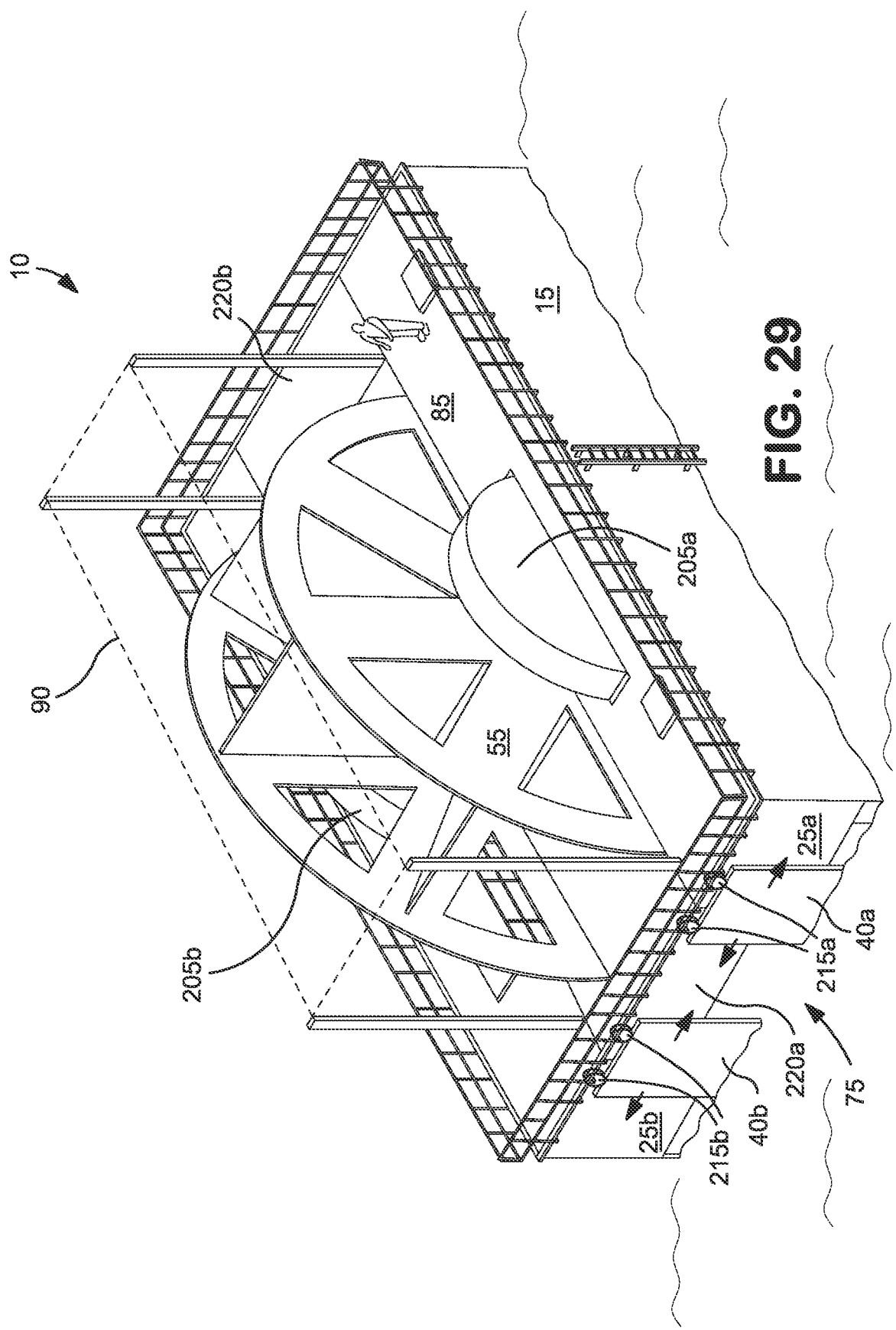

SYSTEMS AND METHODS FOR HYDRO-BASED ELECTRIC POWER GENERATION

This application claims the priority benefit of U.S. provisional patent application Ser. No. 62/815,670, filed on Mar. 8, 2019, and U.S. provisional patent application Ser. No. 62/866,376, filed on Jun. 25, 2019, the contents of both of which are incorporated herein by reference in their entirety.

FIELD OF THE INVENTION

The present invention is directed to a power generation assembly for generating electrical power from active or flowing water. More specifically, the invention is directed to a hydrodynamic power generation assembly comprising a baffle assembly which is structured to accelerate the water flow towards or into a hydropower converter which is spaced behind, that is, downstream of, the baffle assembly for actuation by the accelerated water flow, with a generator operatively coupled to the hydropower converter for producing electrical power. As so structured, the baffle assembly comprises a baffle panel member (or an array of baffle panel members) mounted to a support structure and having one or more openings, or an inter-panel spacing between adjacent baffle panels to form the one or more openings, for allowing water flow therethrough such that the velocity of water flowing against, around, and/or otherwise impinging upon the baffle assembly increases (or is accelerated) relative to the velocity of the ambient water in the vicinity of the deployment site for the assembly and thereby enable an increase in the electrical power produced by the generator. The hydropower convertor may be a turbine assembly, a water wheel assembly, or other device or assembly which is capable of converting energy of flowing water to mechanical energy which can then be used to actuate, activate, or otherwise power one or more generators to produce electricity. The hydropower converter is positioned a spaced distance behind the baffle opening(s)/spacing(s) and operatively coupled to the at least one generator.

BACKGROUND

Remote inland communities typically have little or no access to power grids and face significant challenges in obtaining electrical power, particularly when such communities are in cold-weather climates. Such off-grid communities do not typically have nearby sources of readily-available power or means of generating such power. The low populations of such communities typically cannot incentivize utilities to extend power lines over long distances to these communities. Furthermore, building electrical transmission towers and power transmission lines can be extremely costly due to difficult terrain and the need to clear trees and maintain the power lines from overgrowth. Remote communities may also not have good roads for delivery of fuel such as gasoline, coal, or diesel for powering generators. Local governments therefore sometimes subsidize fuel purchases or arrange for delivery of fuel but these activities can be very costly, unreliable, and environmentally unfriendly. Consequently, a lack of adequate power can frequently restrict business development and investment in distant villages or towns and impede the livelihood of inhabitants.

Notwithstanding periodic significant drops in crude oil prices (such as during 2014-15), the long-term trend of increasing fossil fuel prices is likely to continue due to diminishing global oil and gas reserves. Alternative (preferably renewable) energy generation systems have become an increasingly significant topic of interest for countries around the world, particularly as fossil fuel consumption as well as the attendant emissions and environmental concerns threaten to continue unabated. As a result, significant time, resources, and funding have been invested to research and develop alternative electrical energy generation systems utilizing such renewable sources as solar power, water flow, wind power, and the like to supply ever-increasing amounts of energy.

The oceans have recently been explored as sources of energy generation. The potential for generating electrical energy from the ocean generally comes via three types of energy/power sources: ocean thermal power, wave power, and tidal power. Ocean thermal power generation takes advantage of the difference in temperature between cooler deep water and warmer surface water that is heated by the sun; that thermal differential is then used to operate a heat engine for generating electricity. Ocean thermal power generation, however, is expensive, has low efficiencies, and may require equipment that can be unsightly if located near populated areas, and even may be environmentally unfriendly. Furthermore, ocean thermal power generation requires large temperature gradients or differentials to function adequately. In many areas of the ocean, the local thermal differential is not large enough to generate significant amounts of electrical energy to meet demand.

Wave power generation takes advantage of the waves generated by the action of wind on the ocean surface. Wave power generation is, however, highly dependent on wavelength and thus only suitable to specific locations of the ocean where large wavelengths are present. Wave power can sometimes be unreliable because wave quality is irregular and difficult to forecast, leading to inconsistent energy generation.

Wave and tidal energy generation may cause noise or visual pollution if the energy generators are located near a populated area. For example, certain tidal energy systems require the construction and placement of machinery such as hydraulics and moveable tanks that extend far above the surface of the water, such as those described in U.S. Pat. Nos. 5,426,332, 5,872,406, and U.S. Patent Application Publication No. 2013/0134714. In another example described in U.S. Pat. No. 4,288,985, a tidal energy system may require the construction of a large reservoir on land that must be filled so that a large duct system may capture the flow of water. Such tidal energy systems require large structures that are built either above the water or on shore, requiring significant costs in engineering and land, and are likely to raise environmental concerns.

WO 2016/179048 (hereby incorporated by reference in its entirety) discloses a tidal energy generation system which includes assemblies for capturing energy from the vertical rising and falling or ebb and flow of the tides using a buoyant displacement vessel and converting the energy into electrical power using a directional converter mounted on the displacement vessel. WO 2018/200005 (hereby incorporated by reference in its entirety) discloses a tidal energy conversion assembly which generates energy utilizing drift/drag forces from the ebb and flow of the tide and/or currents, and includes a displacement vessel having a drag panel operatively connected to a generator. The generator produces electricity as the displacement vessel travels due to the flow of water.

Although thermal, wave, and tidal energy can be sources of power for communities located near the coast, such energy sources are not available to towns and villages which are located away from bodies of water. If conditions are not suitable for alternative sources of energy such as solar or wind power generation, isolated communities are likely to have to subsist on very expensive hydrocarbon fuel which is trucked in or airlifted.

One relatively untapped renewable energy source which has recently received increased attention is that of flowing water, such as the potentially endless energy inherent in a constantly-flowing water current such as a river, stream, tide, or ocean current such as the Gulf Stream or the Florida Current. Many communities live near a river or stream which flows constantly throughout the year, even if the surface freezes during the winter. It would be advantageous to be able to utilize hydrodynamic power from flowing water to generate power.

Dams have been used for over 2000 years for conversion of hydrodynamic or kinetic energy to other types of energy such as mechanical energy, and dams have been used for hydroelectric power generation for over 100 years. The principal purpose of a dam is to build up "head" in the water upstream of a hydroelectric plant. Hydraulic "head" is a measurement of the water level in a static (i.e., non-flowing) water body usually expressed in meters or feet. The higher the water level or hydraulic head, the more energy that the water at a particular location possesses. A dam converts the kinetic energy of a moving body of water (velocity) into a built-up head (in meters or feet). This head then pressurizes the penstock or pipe leading to the turbine. Energy is then captured as the high pressure and high velocity water is released through the penstock and impels the turbine which rotates and generates electricity.

Although dams provide significant other benefits such as water storage and flood control in addition to hydroelectric power, they also disrupt the natural flow of water of a river or stream and can cause environmental problems such as obliteration of human settlements and plant, animal, and fish habitats, sediment settling, water temperature changes, and bank erosion. Dams are therefore generally not considered "green" or truly beneficial for the natural environment.

As an alternative to a dam for generating hydroelectric power, turbines can be immersed in flowing water such as a river or stream to harness the kinetic energy in the water flow. Because streams and rivers have a generally consistent flow of water in the channel, it would be advantageous to use this flow to generate electricity. However, slow-flowing streams may not have sufficient velocity to generate adequate power. A turbine usually has a minimum specified water flow rate to generate a rated amount of power; a water velocity below this required minimum flow rate will generate only a fraction of the rated power. For example, a turbine may require a minimum current flow of 5 knots (2.5 m/sec) to generate its rated power, and a flow of 3 knots (1.5 m/sec) (60% of the minimum velocity) may generate only 20% or less of the rated power. Consequently, faster flow velocities are highly desirable to generate more power, but there are limited ways of increasing water speed, particularly in an environmentally-friendly manner.

Funneling structures have been proposed to channel water to an inlet of a turbine or water wheel in order to increase the water flow. However, such funneling structures (e.g. a conical funnel) such as those having a wide inlet and a reduced outlet may not increase water velocity as may be expected, especially in low velocity ambient water flows. Rather, the water becomes dammed in the funnel and does not exit the funnel with a higher velocity as intended or theorized, depending on the relative dimensions and sizes of the funneling structure(s) inlet(s) and outlet(s).

A need therefore exists for an alternative, practical and cost-effective system and method for reliably generating power through renewable energy technology from flowing water. Similarly, there is a need for effectively harnessing the potential for generating electrical power from continuously flowing water sources such as slow-moving rivers that would otherwise be unsuitable or impractical for generating electrical power.

SUMMARY OF THE INVENTION

The present invention provides a cost-effective solution to the needs mentioned above by providing a reliable hydrodynamic power generation assembly which is positioned within a river, bay, ocean, or other area where water is generally continuously flowing. The invention described herein utilizes several hydrodynamic principles to provide a low-cost and novel system for generating power from the energy inherent in a flowing stream of water.

The discussion herein will occasionally make reference to particular types of energy, such as kinetic energy, potential energy, hydrostatic energy, hydrodynamic energy, and turbulence/turbulent kinetic energy, that can be harnessed to generate power using the invention. Such energy types present in a stream of flowing water are merely exemplary, and it is to be understood that the invention is not limited to generating power solely from these particular types of energy. Thus, the invention is intended to increase the amount of power (electrical or otherwise) which can be generated from a stream of flowing water, and any discussion of particular energy types is merely exemplary and is not limiting or bound by theory. Without being bound by theory, it is believed that the invention primarily concentrates the kinetic energy of the ambient water flow and that concentration of other kinds of energy such as hydrostatic and turbulent energy occurs to a lesser degree.

The discussion herein will also occasionally make reference to units such as knots, meters, feet, and inches. Metric and imperial equivalents are typically provided for all units, and it is to be understood that conversions and stated equivalents of dimensions are exemplary and not limiting. In certain instances, dimensions have been rounded when converting between metric and imperial units for ease of discussion.

Energy in water can be categorized into two principal types: hydrostatic energy (or head) and kinetic energy. Hydrostatic head is the potential and pressure energy built up on the front of the baffles of the present device, as further discussed below. Kinetic energy is the velocity and turbulent energy in the moving water that acts on an energy conversion device. Velocity head can be expressed in terms of velocity using the equation $h = v^2/2g$, where h is hydraulic head, v is the velocity of the water, and g is the acceleration due to gravity. In a flowing liquid, the $v^2/2g$ term represents the energy of the fluid due to its bulk motion. Turbulent energy is the energy contained in the natural chaos in water, and is accounted for mathematically by the drag coefficient. The turbulence that occurs in a real-world environment can generate about 20-30% more drag than would be predicted in a model or during lab tests. The present invention utilizes various methods to capture energy from each of these forms of hydraulic energy to generate electricity.

In contrast to prior approaches, the present invention does not block the flow of an entire body of water as does a hydroelectric dam. The present invention also generates more electricity than would an equivalent size stand-alone hydropower converter in the absence of the invention. The invention provides a novel apparatus and method for generating electrical power in which a hydropower converter (such as a water wheel or turbine) can operate to generate more electricity than would otherwise be possible by these devices on their own. Without being bound by theory, it is believed that the invention focuses and captures kinetic energy as well as other types of energy from the ambient water flow passing through a baffle assembly to generate a pressure difference and thereby provide an acceleration of water velocity. The resultant increase in the energy density of the water flow can be used to turn a hydropower converter such as a turbine or water wheel to generate electrical power at a higher rate than the ambient water flow alone.

In an embodiment of the invention, the power generation assembly comprises a support structure (which may be partially buoyant in particular embodiments) and a baffle assembly having an opening (or an array of baffle panels having an inter-panel spacing(s) therebetween) and mounted to the support structure for positioning in the ambient flow of water at a deployment site. Together, the support structure and baffle assembly form a water accelerator assembly. A hydropower converter may be supported from, by, or on the support structure and may be operatively coupled to at least one generator. The hydropower converter may be positioned behind (or downstream of) the opening(s)/spacing(s) of the baffle assembly. Flowing water passing through and/or around the baffle assembly has an increased velocity relative the ambient current and therefore is capable of generating more power relative to the ambient water flow where the power generation assembly is deployed.

In another embodiment of the invention, the hydrodynamic power generation assembly for generating electricity in an ambient water flow comprises a support structure; a baffle assembly mounted to the support structure and positionable in the water flow for increasing velocity of the ambient water flow, the baffle assembly comprising at least one baffle panel member and having at least one opening for enabling water to pass the baffle assembly at an increased velocity relative to that of the ambient water when the support structure is deployed therein; a hydropower converter located at a predetermined distance rearward, or downstream, of the baffle assembly and positioned to be actuated by water passing the baffle assembly at the increased velocity, and a generator operatively coupled to the hydropower converter for generating electricity as a result of flowing water actuating the hydropower converter.

The support structure of the invention may be buoyant or variably buoyant to float on or near the surface of a body of water at the deployment location. The support structure alternatively need not be buoyant but can be anchored below the surface of the body of water, for example, at or near an ocean, river, or bay bottom. In certain instances, it may be desirable for the support structure to be partly or variably buoyant while deployed below the water surface and/or anchored below the surface of the body of water, for example, to facilitate raising the invention to the surface for maintenance or repairs, and/or for enabling continuous operation if, e.g., the water surface freezes at the deployment site. In any of the embodiments of the invention, even if not expressly stated, the hydropower converter(s), gearing mechanism(s), generator(s), and/or other mechanical, electrical, or hydraulic equipment may be located below the top surface of, and/or enclosed within, the support structure in order to maintain a low center of gravity and minimize deterioration due to, e.g. a harsh marine environment.

In an embodiment of the invention, the baffle assembly comprises two or more separate individual baffle panels having an inter-panel spacing between adjacent panels to form the opening through which the flow of water passes at increased velocity relative to ambient water flow. Alternatively, or additionally, the opening in the baffle assembly may be located in one or more of the individual baffle panels and the flow of water passes through the opening in the baffle panel(s), and/or around the baffle panel(s) or member(s), at an increased velocity relative to ambient water flow.

Another aspect of the present invention is directed to a hydrodynamic power generation assembly for generating electricity in a water flow, the power generation assembly comprising a support structure; a baffle assembly mounted to the support structure; a hydropower converter located at a predetermined distance downstream of the baffle assembly; and at least one generator operatively coupled to the hydropower converter. The baffle assembly may be positioning in the water flow and comprises at least one baffle panel member and has at least one opening for enabling water to pass through the opening at an increased velocity relative to that of the ambient water flow where the support structure is deployed. The opening may be at the top or bottom of the baffle panel. The hydropower converter may be positioned to be actuated by water passing through the at least one opening at the increased velocity. The generator generates electricity as a result of the operative coupling to the hydropower converter which is actuated by water flowing through the baffle assembly. In an embodiment, the opening may be located below the water line such that the accelerated water passes through or below the baffle assembly below the ambient water surface. In particular embodiments, the bottom edge of the baffle panel(s) may not extend as deeply in the water as an adjacent support structure which may, for example, include two or more pontoons that may also form side walls of a flow passage and may help direct the accelerated water flow towards the hydropower converter. Inward-facing sides of the pontoons may define a water channel for water flowing past the baffle assembly. One or more plates may also be mounted to the support structure to define one or more sides of the water channel for water flowing past the baffle assembly. Consequently, water is channeled to flow past the baffle panel(s) and its velocity is accelerated as compared to the ambient water flow for increased power generation.

The hydropower converter may be any structure which can convert any one or more of kinetic energy, hydrostatic energy, and/or turbulent energy in a water flow into another type of energy such as mechanical energy or potential energy. In a first embodiment, the hydropower converter may be a turbine. Examples of common turbines suitable for use with the invention are bladed turbines, water turbines, and screw turbines, although there is no restriction as to the type of turbine that may be used as a hydropower converter. In order for a turbine to generate electrical energy, water impinges upon the turbine blades (or other structural component) to convert kinetic energy in the water into rotational mechanical energy which actuates a generator to generate electrical energy. A turbine may be mounted to the support structure of the invention so that it may be fully immersed in the accelerated water current or zone of accelerated water emanating from the baffle assembly.

In a second embodiment, the hydropower converter is a water wheel, such as a water wheel comprising a plurality of paddles (also sometimes referred to as blades or plates)

mounted to a rotatable shaft. Examples of suitable water wheels are stream shot water wheels or suspension wheels which are mounted to the support structure of the invention so that the paddles of the water wheel are impelled to turn by the accelerated water current flowing past the baffle assembly. The water wheel may have any number of paddles emanating radially outwardly from the axle in any orientation or configuration, such as a single set of paddles mounted to the wheel axle, or two or more adjacent sets of paddles mounted to the axle. If a water wheel is equipped with two or more sets of paddles, the paddles of respective sets may be circumferentially aligned with each other or offset from each other for, inter alia, enhancing more uniform rotation of the water wheel. The water wheel paddles may be fixedly mounted to the shaft or they may be adjustably mounted to the shaft to permit adjustment of the number and position of the paddles. The paddles may also be adjustably mounted to the shaft to vary the length to which they extend radially outward from the shaft (and the resulting surface area of the paddle acted-on by the water flow), depending on the instantaneous position of each paddle as the shaft rotates through 360°. The paddles of the water wheel may have any particular configuration to maximize the amount of energy extracted from the water. For example, the paddles may have a flat surface, or a non-flat surface which, for example, cups water during rotation.

The water wheel paddles may be independently retractable when out of the water and extendable when approaching/entering and when immersed in the water to improve the aerodynamics of the water wheel and reduce drag caused by the air. For example, the paddles may have a fixed section attached to the shaft and a retractable section capable of moving radially inwardly and outwardly, such that the retractable section retracts into the fixed section when exiting and out of the water and extends radially outwardly from the fixed section when the paddle is entering and immersed in the water. The retractable section may slide along a structure such as a slotted track to move between retracted and extended configurations. The water wheel paddles may also or alternatively have a hinge for allowing the paddles to fold and thereby reduce the projected area of the paddle during its partial cycle out of the water. In certain embodiments, the paddles are at least partly retractable when out of the water to improve performance, for example, by reducing air resistance and/or to reduce sound levels. The paddles of the water wheel may also or alternatively be pivotally attached to the shaft and fold down as they exit the water to reduce air resistance, sound levels or both. The paddle may also be provided with a detent or other structure to secure the paddles in a predetermined radially-extended configuration when re-entering/immersed in the water for full engagement by the water flow, or to prevent the paddles from moving beyond a predetermined angle or position.

A water wheel may be mounted to the support structure so that only the lower portion of the water wheel is immersed in the water. In certain embodiments, the water wheel may be reversible to capture water flow in two directions, such as the ebb and flow of a tide, and/or equipped with rim gears to provide additional generating or power capabilities. For example, the support structure may be moored or otherwise anchored at opposite ends and a baffle assembly located at opposite ends of the support structure. When the tide ebbs, one side of the power generation assembly and baffle assembly may face the direction of ambient water flow, and when the tide changes to a flood tide, the other baffle assembly on the opposite side of the power generation assembly may face the direction of the reversed ambient flow. In this manner, one of the baffle assemblies/water accelerator assemblies is always facing an ambient water flow. The water wheel (or other hydropower converter) may be reversible to allow for generation of electricity in either direction of ambient water flow. The water wheel may comprise a cover configured to enclose the water wheel, or any part of the power generation assembly may have a cover. The cover may protect the parts of the invention from the elements such as the sun, rain, or water spray, etc. The cover may also provide a sound-dampening function to reduce noise produced by the water wheel.

The type of hydropower converter used in a particular situation will depend upon factors such as the deployment site, speed of the water, environmental factors, anticipated costs, and energy output. The hydropower converter may be positioned in the zone of accelerated water produced by the baffle assembly. Water flows into, or impinges upon, the intake of the hydropower converter, for example, the intake of a turbine or the paddles of a water wheel, to generate power, while the outlet of the hydropower converter may be where water flows out of the device, such as the outflow of a turbine or aft end of a water wheel, to merge back into the ambient current.

Without being bound by theory, it is believed that the baffle assembly may potentially act as a partial dam in the water current and create "head" so that water flowing through or around the baffle assembly has an increased velocity compared to the otherwise ambient current flow, thus converting hydrodynamic and potential energy from the water head into kinetic energy. The head buildup may be visualized and monitored during operation of the device by measuring the height of the water built up in front of the baffle assembly as compared to the height of the water downstream of the baffle assembly. Without being bound by theory, it is believed that the baffle assembly and the position of the hydropower converter, in combination with a water flow channel having a water inlet and water outlet, focus the kinetic energy in the ambient water by increasing the velocity of the water flow passing through the invention as compared to the surrounding or ambient current. The inventive baffle assembly increases the amount of energy which may be harnessed by the hydropower converter as compared to the energy that might otherwise be extractable from the surrounding or ambient current. As discussed, embodiments of the invention may not have a baffle opening or an inter-panel spacing but rather the depth of the baffle panels in the water may be adjusted so that the ambient current flow is accelerated by the movement of water around or beneath the baffle panels, or any combination of the foregoing may be implemented depending on deployment conditions.

Table 1 below shows the potential effect of a doubling of water velocity on the power available in a fluid flow on potential power generation from the invention. The table shows that a doubling of the water velocity will provide an exponential increase in the potential power available in the water. Although the amount of energy extracted will depend on the particular device implementation and energy conversion method used, it is clear that increases in water velocity are desirable. Even small increases in the velocity of a water current may provide significantly increased amounts of extractable energy.

TABLE 1

Effect of Increased Water Velocity on Potential Power

| Water Speeds | | | | Potential Power of a 100 ft² (9.3 m³) Plate | |
|---|---|---|---|---|---|
| | | | | Potential Power of Water | Potential Power of Accelerated Water |
| Water Speed | | Accelerated Speed | | $V^3$ | $V^3$ |
| Knots | m/sec | Knots | m/sec | kW | kW |
| 3.0 | 1.5 | 6.0 | 3.0 | 18 | 140 |
| 4.0 | 2.0 | 8.0 | 4.0 | 42 | 332 |
| 4.5 | 2.3 | 9.0 | 4.5 | 59 | 473 |
| 5.0 | 2.5 | 10.0 | 5.0 | 81 | 649 |
| 6.0 | 3.0 | 12.0 | 6.0 | 140 | 1,121 |
| 7.0 | 3.6 | 14.0 | 7.2 | 222 | 1,780 |
| 8.0 | 4.0 | 16.0 | 8.0 | 332 | 2,657 |
| 10.0 | 5.1 | 20.0 | 10.2 | 649 | 5,189 |
| 12.0 | 6.2 | 24.0 | 12.3 | 1,121 | 8,967 |

Again, without being bound by theory, the baffle arrangement is believed to cause the water to back up and be forced to flow either around the baffle panel(s) and/or through the opening(s) of the baffle assembly (or inter-baffle spacing(s)), with a result that the water is accelerated as it reaches the hydropower converter which is spaced rearwardly from (downstream of) the baffle assembly. The increased water flow velocity produced by the present invention is unexpected and, in fact, contrary to conventional wisdom: as preferably embodied, there may be no structure (such as piping or fluid conduit or cowl-like structure) needed between the baffle opening (or inter-panel spacing for the multi-panel baffle approach described below) and the hydropower converter. Rather, the spacing between the baffle panel/array and the hydropower converter inlet may be free of any intervening device within the support structure which is intended to direct or divert the water flow. In certain embodiments, the flow channel may be defined by structures affixed to the support structure, such as plates or other structural elements which are affixed to inwardly-facing sides of pontoons.

Certain prior hydropower systems employed venturi devices or cowls in an attempt to increase speed of water. Such systems require a minimum current velocity to provide any acceleration effect. In contrast, the present invention can accelerate water which may be moving at even relatively slow velocities, even down to 0.5 knots (0.25 m/sec) in certain embodiments of the invention, to produce sufficiently increased water flow velocities to power a hydropower converter for generating electricity, whereas such slow moving water would be considered unsuitable for use in renewable energy generation.

Advantageously, the invention is completely scalable and it may be as large or small as required for a particular implementation, which might be dependent upon the amount of electricity to be generated and the speed and depth of the water in the channel or other conditions at the deployment site. This scalable capability has unexpected advantages because it enables, e.g., the use of one relatively large-scale hydropower converter and a large scale generator; and/or the use of two or more relatively small-scale hydropower converters and small-scale generators arranged in parallel configuration; and/or multiple generators operatively coupled to the same hydropower converter; or any combinations thereof, such as any combination of series and parallel components. In certain embodiments, the hydrodynamic power converter allows water to flow under it or around it, or it may be sized and configured to span most or all of a water stream, allowing flow only through the opening(s) in the baffle or between baffle panel(s)/section(s). As discussed elsewhere, the size and location of deployment of the power generation assembly will likely also depend on the size of the water stream, its inherent velocity, and environmental factors. The support structure of the invention may be implemented as a boat, barge, pontoon, or other buoyant vessel if desired. The baffle panels may be as small as 12 inches to 24 inches (30 cm to 60 cm) in width and 6 inches to 12 inches (15 cm to 30 cm) deep into the water and still accelerate water velocity sufficiently to generate a usable amount of electrical power.

The invention does not require that the entire current stream be stopped such as the case of a hydroelectric dam. In most cases, the deployed hydrodynamic power converter may only affect a relatively small percentage of the total water stream and, thus, have minimal, if any, negative impact on the environment, marine life, etc. Because the invention does not rely on increases in water height over the entire body of water to accelerate the current flow, it may not be necessary to deploy devices or procedures which may avoid harm the environment or to mitigate damage to wildlife. For example, the invention obviates the need for fish ladders or other structures for allowing wildlife to move upstream or otherwise pass the hydropower converter generation assembly of the invention. Similarly, fish and other species' migration patterns are not significantly affected. The invention does not slow the ambient current such that sediment would begin to sink to the bottom of the channel, thereby obviating sedimentation which is a major problem for any fixed structure placed in any water stream. The invention also does not discharge pollutants into the environment during operation and therefore provides a "green" method of generating power.

The hydropower converter may be mounted in a "bottomless" flow channel (or passage) of the power generation assembly. That is, the flow passage or channel in which the hydropower converter may be located may not have a bottom surface or structure and therefore the bottom of the flow channel may be open to the ambient water current. Such embodiments may help minimize potentially deleterious impacts on aquatic wildlife as compared to having a closed channel for the water flow where wildlife may become trapped or injured by operation of the invention. The bottomless flow channel also helps avoid damage to or potential interference with operation of the hydropower converter by allowing free movement of the accelerated water in the flow passage or channel. In other embodiments, the flow channel may have a bottom surface to help direct water to the hydropower converter. To the same end, the flow passage may be open from above and not constrained by any cover or other structure which may affect free flow of accelerated water.

In certain embodiments of the invention, the hydropower converter may convert the kinetic energy in the water current to other types of energy such as mechanical or rotational energy before it is converted to electrical energy. For example, the hydropower converter may be connected to a flywheel which may store rotational energy for subsequent conversion to electrical energy. Embodiments of the invention also allow for replacement of one hydropower converter type to another. For example, a turbine may be replaced with a water wheel, Archimedes screw, or other device, particularly when the invention may be implemented in a modular or scalable fashion. Small hydropower converters, such as personal turbines which have been developed for charging cell phones or laptop computers, may be used in particular implementations of the invention. Smaller embodiments of the invention may therefore be portable for use in the field, for example, by researchers, fishermen, or others who are near a current flow but do not have access to electrical power.

The hydropower converter does not necessarily need to be installed where the water velocity flowing through the accelerator (baffle) assembly may be a maximum or certain high level, as long as the water velocity can be accelerated by the invention to a value greater than the velocity of the surrounding water channel or ambient water flow and sufficient to activate the generator to produce power.

As further described below, the baffle assembly may be a single structural element such as a baffle panel member which has an opening therethrough or a flow passage therearound. Alternatively, the baffle assembly may comprise an array of two or more baffle panels which are spaced apart and/or otherwise arranged to have a distance therebetween through which the flowing water may pass. The baffle panels may also provide a flow passage or path such that water may pass around and/or below the baffle assembly. Terms such as "baffle", "baffle assembly", "baffle array", "baffle section", and "baffle panel", whether singular or plural, are intended to encompass all variants of structural embodiments of a baffle assembly including but not limited to a single structural element and arrays composed of two or more baffle panels or sections, regardless of the specific configuration. Similarly, terms such as "opening", "baffle opening", "inter-panel spacing", and "baffle spacing", whether singular or plural, are intended to encompass all variants of one or more openings or flow passages or paths in baffle assemblies as well as separations between two or more baffle sections which serve to accelerate water. The terms "flow channel" and "flow passage" are to be understood as a zone of typically-accelerated water which is flowing or has flowed past the baffle assembly. The terms "through" and "therethrough" are to be interpreted as encompassing embodiments wherein the water flows around and/or under a baffle assembly, baffle panel, or array of any of these, even if not expressly stated, in order to accelerate water. Features present in particular embodiments of the invention can be used with other embodiments, even if not expressly stated, to form new embodiments.

In certain embodiments of the invention, it may be useful to provide the baffle assembly or the hydropower converter with a screen to prevent damage caused by undesirable objects such as vegetation, tree branches, ice flows, or litter. The screen may have any kind of structure which will prevent undesirable objects from passing through while still permitting the ambient current to enter the assembly for water flow acceleration and have minimal, if any, effect on marine life. For example, the screen may be have a flat surface or it may be V-shaped and point into or away from the direction of the current flow, or be formed of a mesh or parallel slats. The size of the openings in the screen will depend upon its particular implementation. The baffle assembly may also open and close (as further discussed herein) to prevent debris from entering and damaging the equipment.

The hydropower converter may be spaced at a predetermined distance behind, or downstream of (when in its deployed state), the baffle assembly such that the velocity of water entering, impinging or acting upon the hydropower converter may be increased and greater than that of the ambient water flow in the vicinity of the deployment site. In order to adjust the velocity of the water flowing through the baffle assembly, the size of the opening in the baffle assembly, or the inter-panel distance between baffle sections, may be made larger or smaller, or consistent with the invention, the baffle assembly or individual baffle panels may be angled with respect to the perpendicular or vertical, or both. In one embodiment, the flow channel of the power generation assembly may not have an enclosed bottom (or top) in order to minimize negative effects on aquatic wildlife and to reduce the potential for damage to the hydropower converter. In other embodiments, the flow channel may be provided with an enclosed bottom surface to restrict flow to a defined flow channel.

In one embodiment, the baffle sections are arranged perpendicular to the direction of flow when the assembly may be deployed, so that the baffle sections are directly facing the current "head-on". In such an arrangement, the baffle sections will be generally parallel to each other. In certain conditions, for example, when the water velocity is high, it may be desirable to angle the baffle sections horizontally, vertically, or both, with respect to the direction of water flow, so that the baffle sections form a V or an inverted V shape. It may be also possible to move the baffle panels closer together or farther apart, to accelerate the water flow to a lesser degree or to reduce the amount of water entering the baffle assembly. It may also be desirable to close the baffle opening or the inter-baffle spacing to decrease water flow into the flow channel. If the water velocity is very high, it may be desirable in certain instances to remove the baffle sections out of the water flow, partially or wholly or any variation therebetween to adjust for increased or decreased water flow, or to turn the baffle sections so that they vary from perpendicular through parallel to the direction of flow so that at least some (or all) of the water flows directly past the baffle sections without being impeded, in order to avoid damage to the power generation assembly due to high flow velocity. A water velocity meter may be used to measure the water velocity at different points after the baffle assembly in order to optimize the placement of the hydropower converter with respect to the baffle assembly and/or the distance between baffle panels (or size of the opening(s)). Adjustability of the baffle location or angle (vertical or horizontal, or both) using a motor or other adjustment or control mechanism may provide, e.g., the ability to control or adjust the velocity of accelerated water flow in order to prevent damaging the hydropower converter by too-high velocity water flows or based on other operational and flow or local conditions.

Under certain conditions (described hereafter), the water flowing around the baffle assembly may generate lift similar to an airfoil, and thereby providing an upward-lifting force on the baffle assembly or support structure. The invention may be configured so that the baffle assembly or individual baffle panel(s) may move any number of degrees laterally or vertically or both in order to counter such lift forces. For example, the baffle panels may be adjusted with an adjustment control mechanism to rotate 15° degrees with respect to the current flow and 30° with respect to the horizontal. A control mechanism such as a steering gear may be used to adjust the orientation or position of the baffle panels, or a harness (further discussed below) may be used in which each corner of a baffle may be connected to a control cable. Alternatively, the baffle assembly may be mounted permanently or removably on one or more axles and the position of the axle(s) or other structures may be adjusted to optimize the location of the baffle panels in the current flow. In the case that significant lift of lateral movement may be generated by the baffle structure, lift may be countered with a spoiler structure mounted on the front or back (or both) of the baffle or incorporated as part of a support member conjoining adjacent pontoons. The spoilers may be mounted in any arrangement, such as vertically, horizontally, or at an angle.

The baffle assembly may also be configured using a control mechanism to rotate or otherwise move the baffle panels completely out of the current flow, for example, at any angle between 0° and 90° from the horizontal or vertical axes, or both, for maintenance or storage purposes. The control mechanism may thus adjust the angle of the baffle panel(s), about the horizontal axis, vertical axis, or both, for example, by an angle between 0° and 360° depending on the particular implementation of the invention. The control mechanism may independently adjust the angle of each of the plurality of baffle panels. There may also be a plurality of control mechanisms, each control mechanism independently adjusting the angle of a corresponding baffle panel member about the horizontal axis, vertical axis, or both. In certain embodiments, any of the components of the power generation assembly such as the baffle assembly may be manufactured to be modular and interchangeable with replacement parts, for example, with a replacement baffle assembly or baffle panels.

Particular embodiments of the invention may be computer-controlled using a computer system to facilitate operation of any of the components. The computer system may comprise components such as a display, an input device such as a keyboard and/or handheld pointing device, a processor, and memory for storing data and computer instruction code to perform the invention. The inventive power generation assembly may also be connected to a network such as the Internet, a local area network (LAN), or a virtual private network (VPN) to permit remote operation. The computer control of the invention may be implemented as a software program or as hardware instructions, for example, using an application-specific reprogrammable integrated circuit (IC) or a reprogrammable IC device comprising embedded hardware instructions for performing the functions and steps of the invention. The computer control may be configured using a hardware description language, such as Verilog or VHDL, or a computer programming language such as SystemC or C/C++. Such computer configurations may be readily prepared by a skilled practitioner.

The computer system may also be configured to make adjustments to the position of the various components, such as the relative spacing between the baffle assembly and the hydropower converter to optimize the water acceleration effect as a function of the ambient water velocity. Similarly, the computer system may be configured to control the size of the baffle opening(s) or spacing(s) and other operational settings to the same end, for example, as discussed in paras. 0050, 0053, 0065, 0080, 0083, 0118, 0120, 0123-0125, 0134, 0135, and 0140 herein.

In certain embodiments of the invention, sensors as are known in the art may be deployed to monitor various settings such as water speed, hydropower converter rotation speed, and torque on the generator. These sensors may be connected to the computer system via a wired or wireless connection to provide real-time monitoring of operating conditions. In this manner, an operator has current operating conditions and may make adjustments to the operation of the invention as appropriate. The collected data may also be saved to maintain a historical record of operating conditions and settings. An alarm for an operator may also be triggered if operating conditions are outside an expected or desired range.

In one aspect of the present invention, the assembly comprises: a support structure which may be anchored in a generally stationary manner within the flowing water; a baffle assembly which may be mounted to the support structure and oriented in the water flow, the baffle assembly having an opening or flow passageway for allowing water to pass therethrough or therearound; and a hydropower converter which may be mounted to the support structure and operatively coupled to at least one generator for producing electrical power. The hydropower converter may be structured and positioned so as to be actuated or energized in the zone of accelerated water. The spacing between the baffle assembly opening or spacing and the hydropower converter inlet or actuation area produces an increase in the velocity of the water action on the hydropower converter which, in turn, enables the converter to spin (or otherwise generate power) at a faster rate or generate greater torque than if it were immersed in the ambient water flow at the deployment site, thereby enabling the generation of a greater amount of electrical power than would otherwise be possible. Where more than one opening, flow passage, or inter-panel spacing may be utilized, or if the opening or spacing is sufficiently large, more than one hydropower converter may be utilized.

In addition, depending upon the accelerated velocity of water flow, the buoyancy of the support structure may be controllably adjusted to vary the depth of the hydropower converter in the water, e.g. the water wheel paddles may thereby be acted on by more or less of the accelerated water flow depending on, e.g., the degree of accelerated water flow or other conditions at the deployment site. In an embodiment of the invention, the support structure may include one or more winches with cabling connecting to, e.g. an anchor member, for controllably adjusting the pitch, roll, and/or yaw of the support structure. The baffle opening may be at any location of the baffle assembly, such as in the middle, offset at one side, or at the bottom or top of the baffle panel member to allow water to flow through, around, and/or below the baffle assembly.

In one embodiment, the baffle opening proportions may be about 30-50% of the width of the face of the entire baffle assembly, or there may be a flow passage which permits accelerated water to flow below or around the baffle assembly. In embodiments where the baffle assembly comprises a plurality of baffle panels having an inter-panel spacing between adjacent panels, the total width of the inter-panel spacings may be about 30-50% of the width of the entire face of the baffle assembly. In further embodiments of the invention, the width of the baffle opening may be about 35-45% of the total width of the baffle, or about 40% of the width of the baffle assembly. The baffle sections may have widths which are about 50-70% of the total width of the baffle assembly. The baffle sections may have the same width, or they may have different widths. In one example, a 10-foot (3 m) baffle assembly may comprise a 2 foot (0.6 m) baffle section and a 4-foot (1.2 m) baffle section separated by a 4-foot (1.2 m) baffle opening. In another example, a baffle assembly having an overall width of 100 feet (30.5 m) may be comprised of two baffle sections, each about 30 feet (9.1 m) in width, and a baffle opening which may be about 40 feet (12.2 m) wide, and the same or less in depth. In another embodiment, the baffle sections may have an opening at the top or bottom such that water flows around and/or below the baffle assembly to accelerate the ambient current.

The baffle opening (or baffle array inter-panel spacing) may have any size which may channel water through the opening and/or around the baffle panel. The baffle assembly or any of its component baffle panels may extend in a generally downwards direction from the support structure so that the bottom edge may be at about the same depth or slightly lower than the bottom of the hydropower converter. Alternatively, the baffle assembly may be mounted to a pontoon or other support structure and extend laterally from the support structure into the ambient current. The baffle assembly may have any dimensions, although a typical height (measured out of the water) may be slightly less than the width of the opening or inter-baffle spacing between adjacent baffle panels. The baffle assembly may extend as deep in the water as, or slightly deeper than, the lowest portion of the energy conversion device that is submerged in the water as it operates. For example, the baffle assembly may extend slightly deeper than the bottom of a submerged turbine or the bottom paddles of a water wheel or intake of an Archimedes screw for maximal or optimal impingement of the accelerated water flow on the hydropower converter. A flow meter may be used to determine the optimal spacing(s)/opening(s) size of the baffle assembly and the optimal distance behind (downstream of) the baffle assembly for maximum water acceleration, or for other adjustments due to conditions at the deployment site. In an embodiment of the invention, the baffle assembly may be oriented generally perpendicular to the direction of ambient water flow.

In alternative embodiments, the baffle panel members may not be as deep in the water as adjacent pontoons or other support structures such that the ambient current may be accelerated as it flows underneath the baffle assembly. One of skill will recognize that the baffle assembly or the component baffle panels may have any suitable height provided that it accelerates water through the opening or through the inter-panel spacing or around the baffle panel(s). The baffle assembly may be positioned such that a portion of the baffle panel(s) extends above the waterline while most of the baffle panel members may be submerged in the water. In an exemplary embodiment, an upper 10-40% portion of the baffle panel member(s) may be positioned above the water surface while the remaining 60-90% of the baffle panel member may be below the surface of the water. As previously discussed, the bottom edge of the baffle panel(s) may be at about the same depth or slightly lower in the water as the lowest portion of the hydropower converter such as a turbine or water wheel if the baffle assembly has an opening or inter-panel spacing. For example, the bottom edge of the baffle assembly may extend 0-3 feet (0-1 m) below the lowest part of the hydropower converter, or 0-30% of the total length of the baffle assembly. In other embodiments, the baffle panels may not be as deep in the water as the intake of the hydropower converter for other deployments where such a configuration enhances optimal impingement of accelerated water.

The thickness of the baffle panels forming the baffle assembly is not believed to be critical so long as they are sufficiently strong to withstand the maximum anticipated accelerated water flow, and they may be, for example, between 0.1 and 6 inches (0.25 cm to 15 cm) thick. A baffle panel member may also be thinner than these dimensions as long as the baffle has sufficient strength to withstand the water pressure exerted against it. It may be advantageous to make the baffle assembly structure out of the thinnest material that can withstand the anticipated water pressure as many fabrication costs are tied directly to weight, and this is particularly true if steel is being used. One skilled in the art will recognize that any suitable thickness may be used and the size of the baffle assembly may be proportionally increased or decreased depending upon the anticipated water conditions at the deployment site.

The distance between the intake of the hydropower converter and the baffle assembly opening(s), inter-panel spacing(s), and/or the baffle panel(s) themselves, will depend upon the particular implementation of the invention and conditions prevailing or expected at the deployment site. For example, factors such as the ambient water current velocity and depth of the water channel, the size of the baffles, and the dimensions of the hydropower converter will affect the velocity of the accelerated water and the point of greatest acceleration and hence the determination of the desired position of the hydropower converter in the power generation assembly. The faster the ambient water flow, the farther back (downstream) the hydropower converter may be positioned relative to the baffle assembly, although the accelerated water velocity can be measured at different points to determine the optimal placement of the hydropower converter. As discussed elsewhere, a water velocity meter may be used to determine the flow velocity at particular points behind the baffle for optimal positioning of the hydropower converter. In an exemplary embodiment, the actuation area of the hydropower converter (such as the inlet of a turbine) may be placed about 10 feet (3 m) behind the baffle in the outflow current stream, although the placement of the actuation area will depend upon the particular embodiment of the invention.

The power generation assembly of the invention may be used in any kind of flowing water, although its advantages may be most evident in water flows which may not otherwise have sufficient velocity for conventional hydroelectric power generation or tidal power generation, such as in slow-moving rivers and/or in areas where surface water may freeze and access to flowing water may be restricted. The invention may have particular practical utility in remote areas where access, even for delivering fuel to run generators, is very limited. Conversely, in areas of fast flowing water, the efficiencies of the invention will enable it to have a smaller overall size and therefore be more economical than existing energy conversion devices.

Because the invention can operate in flowing water currents which tend to run constantly, the invention provides a feasible solution to 24/7 power generation making it a "dispatchable" form of renewable energy. Dispatchable forms of energy are those that can be turned on and off on demand, according to market needs, such as hydroelectric power and natural gas, and therefore such sources can be used as base load generators. In contrast, non-dispatchable forms of energy, such as wind power, solar power, coal, and nuclear power cannot be turned on and off at will by plant operators to generate power and can take hours (or days in certain instances) to cycle off and then on again. The present invention therefore advantageously may be used as a base load power source.

The power generation assembly may be able to operate at a relatively fixed position tethered in any desired position within the water current and therefore advantageously does not need to be rigidly installed at a particular location. The invention may be anchored to a fixed location such as a pier, bulkhead, or bollard so as to allow movement but yet remain in generally the same location in the river or water current. Because current flows are not absolutely consistent or follow an exact path, a tether permits the baffle assembly to vary positions as the current flow or water height may change, for example, due to a tidal effect or seasonal changes in water levels, or due to drought, rainfall, snow melt, winds, lunar cycle, season, salinity, temperature, or human factors such as irrigation. In addition, it may be possible to move the power generation assembly to another location, by decoupling it from the mooring structure, steering (or towing) the invention while it remains attached to the same mooring structure, or moving the mooring structure itself if this may be deemed advisable. Hence, the power generation assembly may be considered mobile. Nevertheless, the power generation assembly may be permanently mounted at a stationary location such as at or near a river bottom or sea bed, or slightly suspended thereabove, preferably at locations or depths where current flow is sufficient to actuate the power generation assembly in accordance with the principles of the described herein.

The power generation assembly may be fitted with sonar or a spectroscopic or electronic detector to identify or to alert an operator as to the presence of large objects in the water that may potentially cause damage, such as tree branches, debris, and ice blocks including those which may contain rocks frozen inside. The invention may also comprise a steering system which moves or shifts the generator assembly position to avoid collisions with objects including vessels. In particular embodiments, the baffle assembly may close to avoid entry of debris into the hydropower assembly. For example, if an operator sees an item such as litter or tree branches in the water, the operator may close the baffle panel opening(s) or inter-panel spacing(s) in any appropriate manner to prevent such undesired items from passing through or around the inlet of the power generation assembly and/or the baffle assembly and damaging any components of the inventive power generation system.

It may be convenient to place particular components of the power generation assembly at different locations. For example, the baffle assembly may be located in the water current while the generator may be located at the same or a different location. For example, the generator may be located at a stationary location such as in or on the support structure of the power generation assembly or on an fixed location such as land, a pier, or the bed of the body of water, or on a mobile location such as a barge or other structure on the water surface. There may be a pulley or gear system which operatively connects the hydropower converter to the generator, or these systems may be directly connected. The generator and other ancillary components may be located within the one or more pontoons as exemplified in FIGS. 24 and 25.

The power generation assembly may be tethered to the fixed position in the water current using a cable, rope, or other suitable anchoring method. In certain embodiments, a multi-point harness or a steering gear may be used to adjust the position of the baffle assembly or the power generation assembly in the water current. For example, a multi-point harness may be used to orient the baffle assembly to the fixed location using steel cables or other adjustment means, one cable at each corner of the baffle assembly. The use of multiple cables permits adjustment of the position of the baffle assembly or its angle in the current flow so that the assembly may capture more energy, or "spill" energy if it may be deemed advisable. The power generation assembly may operate in shallow water or in deep water, and may be sized to operate in any moving water current having a minimum speed of about 1 knot (0.5 m/sec).

As mentioned previously, the power generation assembly may also be anchored at a particular location. The nature of the anchor and the size of the anchor will generally depend on factors such as the size of the power generation assembly, the velocity of the water current, torque requirements, depth of the water channel, bottom conditions at the anchoring site, and environmental concerns. Non-limiting examples of anchors are a rock to which the power generation assembly may be attached via an anchor cable; a traditional plow or flat anchor as may be known in the art; a very large concrete and steel block weighing several tons or several thousand tons; and sunken barges, rail cars, and the like, often filled with concrete or another weighty substance. An anchor may be composed of any customary and suitable material, for example, steel or concrete and may comprise an anchor cable. The power generation assembly may also be fixedly mounted to a pier, sea bed, river bed, or other structure which is immobile.

In certain instances, such as shown in FIG. 25, it may be desirable to reduce the amount of energy captured, for example, when ambient water current may be flowing with a high velocity after a heavy rain or at the peak of the lunar cycle, in order to reduce possible damage to the equipment or over-stressing the components. The angle of the baffle assembly may be shifted vertically, horizontally, or both, from its usual position in order to reduce the amount of water being channeled through the water accelerator/baffle assembly if this is deemed advisable due to local conditions, or the baffle assembly may be raised partly or substantially out of the flowing water using the described control mechanism. Alternatively or additionally, the size of the opening in the baffle assembly may be increased or decreased as appropriate to modulate the water velocity. The size of the opening may be readily changed if it is mounted on a slide or other apparatus which permits the baffle panel(s) to be moved closer together or farther apart as appropriate. Similarly, if the hydropower converter has a maximum capacity or intake velocity, it will be necessary to ensure that the baffle assembly does not increase the velocity of the water beyond this maximum to avoid equipment damage. Diagonal struts or other structural elements may be used to prevent the baffle assembly from bending under the pressure of the water flow. In certain instances, it may be desirable to completely close any openings or spacings in the baffle assembly to reduce the effect of strong ambient water flows on the equipment.

In certain embodiments, the power generation assembly may comprise a brake to modulate the rate of rotation of the hydropower converter, or to stop its movement altogether. For example, it may be desirable to arrest movement of the hydropower converter during maintenance periods or during severe weather conditions such as rough water or storms to minimize stress on the equipment.

In an embodiment of the invention, the assembly may comprise a plurality of baffle panels and/or a plurality of hydropower converters arranged in an array. At least one baffle panel member has an opening, or the plurality of baffle panels have an inter-panel spacing between adjacent panels to form at least one opening, or the baffle panels may be configured to allow water to flow around the baffle assembly, for passing water therethrough or therearound at an increased velocity relative to ambient water, with a hydropower converter positioned downstream of each opening or panel, or at least one inter-panel spacing of a baffle assembly. There may also be a plurality of hydropower converters positioned downstream of the opening(s) or spacing(s) or panel(s) of the baffle assembly. In this manner, a single support structure may support multiple hydropower converters and generators, in series, parallel, or both, to further increase the power generation potential of the invention. Alternatively, the assembly may comprise an array of components in any desirable combination.

If a particular implementation of the invention comprises a plurality of hydropower converters, the converters may be of the same type or different types. For example, in an embodiment comprising two hydropower converters, one may be a turbine and the other may be a water wheel. When the hydropower converters are of the same type, such as two turbines, they may have the same or different power generation capabilities. For example, one turbine may be rated for 50 kW while another may be rated for 25 kW. It is also possible for a hydropower converter to be connected to a generator assembly comprising multiple generators of various capacities, which may be engaged at various times depending on the speed of the water flow. It may be therefore feasible to allow a smaller generator to run at its optimal power range and then engage additional generators of the assembly when the velocity of the water provides sufficient force to drive the hydropower converter to power additional generators.

In certain implementations of the invention, the hydropower converter or generator may be run faster than its rated capacity. For example, turbines configured with a nominal capacity of 145 kW may be run at higher speeds to generate about 250 kW of power. As energy is proportional to velocity squared, a small increase in water velocity will generate, proportionately, a large increase in available kinetic energy, regardless of the size of the power generator used. Certain hydropower converters and generators have limiters which restrict the amount of kinetic, hydrostatic, and turbulent energy captured by the device; such limiters will depend on the device itself and the capacity of any associated power conditioning equipment. Running a device at a higher speed than it is rated may potentially affect its service schedule and usable life. However, the cost of generators has decreased so dramatically recently that overdriving them may be economically cost-effective even if the generators or turbines would need to be replaced more frequently. The voltage and/or amperage of the generator(s) may also be controlled to reduce strain on the generator and thereby prolong its service life.

As previously stated, there is no restriction on the size of the power generation assembly or its components. Nevertheless, due to cost, scaling considerations, availability factors, and deployment constraints, it may be financially advantageous to employ a plurality of smaller systems instead of a single large system. For example, as economies of scale have not yet taken hold for certain components, it may be usually much less costly to build 4 quarter-megawatt units instead of a single 1-megawatt power unit due to greater availability of the smaller units in the industrial supply chain. Further, with the additional structure and feature described herein for selectively engaging and disengaging separate components—e.g., individual hydropower converters and/or individual generators—the scalability of the present invention offers unexpected flexibility in adapting the overall capabilities of the electrical power generation assembly of the invention to myriad conditions and variables of operation.

The hydropower converter, which receives the impact of the accelerated water resulting from the baffle assembly, may be designed to operate at a suitable rotational velocity. A water wheel may have any number of individual paddle members, although water wheels with fewer paddles may be less costly than those with more paddles. The water wheel paddles may also have any kind of shape which sheds water quickly so that the water wheel is not lifting water and thereby reducing its efficiency in generating torque.

The rotational velocity needed by the generator to generate electricity may be accommodated by gearing placed between the hydropower converter and the generator, for example, to step-up a slower turbine rotational rate to a faster rotational rate for use by the generator. A slower-moving hydropower converter may generally present less danger to wildlife. Alternatively, faster-moving hydropower converters generating less torque may be used, for example, if the step-up gearing would be less complex for a faster-spinning turbine.

The hydropower converter may be modular, or it may be temporarily or permanently mounted to the power generation assembly. Alternatively, the hydropower converter may be rotatable or repositionable to take advantage of changes in the water flow. For example, if the hydropower converter may be located in a stream or river which is subject to tidal currents, the hydropower converter may be repositionable so that it may be turned to "face" the water flow during the appropriate tidal phase. For example, the water in a tidal stream may flow during the flood tide from west to east, and then flow out during the ebb tide from east to west. The power generation assembly may rotate (or be rotated) on its anchor so that it may be oriented to always face the direction of flow. In this manner, the invention is able to generate power during both phases of the tide cycle. Where tide cycle (or even other current flow) changes, the support structure can be re-positioned so it faces the new direction of ambient water flow, e.g. by rotating around the tether point.

Alternatively, the power generation assembly may comprise two or more baffle assemblies and/or hydropower converters which face in opposite directions so that at least one of the hydropower converters generates power if or as the water flows change direction, thereby providing continuous power if deployed, e.g. in a tidal region. In other embodiments, a single hydropower converter may be flanked by baffle assemblies to generate power as the current direction alternates. The entire power generation assembly may also be rotated about its anchor point as the water direction changes, for example, from flood tide to ebb tide.

In embodiments where the support structure is deployed on or near the surface of a body of water, the baffle assembly and hydropower converter may be suspended downward or laterally from the support structure with the hydropower converter positioned in the accelerated water flow. If the support structure is immersed below the surface of the body of water, the baffle assembly and hydropower converter may project upwardly or downwardly, as appropriate, from the support structure, or laterally from a support member which conjoins a pair of pontoons, to generate power while the assembly is deployed in a submerged manner with the baffle assembly positioned to accelerate water flow. Other mounting arrangements are possible consistent with the invention.

The power generation assembly may also comprise a distance adjustment mechanism, for example, on the baffle assembly, which adjusts the relative distance between the intake of the hydropower converter and the baffle assembly in order to optimize the power generated by the hydropower converter, e.g., in response to changes in velocity of the ambient water flow at the deployment site. The distance adjustment mechanism may be fixed to maintain a given distance between the baffle assembly and the intake of the hydropower converter, or the distance adjustment mechanism may be adjustable in real time to modify the distance as may be desirable to optimize performance. In particular embodiments, the distance adjustment mechanism may move the hydropower converter laterally such as forward and back and/or side-to-side, and vertically such as up-anddown, to adjust the position of the hydropower converter for maximal energy capture, or to reduce the amount of energy captured if so desired, again, depending on conditions at the deployment site. The distance adjustment mechanism may comprise a structure such as a track (for example, with wheels), a slide, or similar structure for customization of the hydropower converter position relative to the baffle assembly.

The inventive power generation assembly may comprise a directional converter which converts rotational energy received from the water wheel and transfers the rotational energy to the generator. The directional converter may be operatively coupled to the generator by a gearing mechanism which may have a structure such as a gear box or a chain and sprocket arrangement. Such a gearing mechanism may convert output rotational energy from the hydropower converter to a faster input rotation to the generator for increasing the amount of electricity produced by the generator. Thus, the gearing mechanism may turn the generator at a faster rate and thereby increase the amount of electricity which would otherwise be generated. In certain embodiments of the invention, the gearing mechanism may comprise a drum assembly for increasing rotational energy produced by the water wheel.

The gearing mechanism may engage or disengage one or more of a plurality of generators upon reaching a specified level of torque. For example, in order to maximize the amount of electricity generated when the velocity of accelerated water may be relatively high, additional generators which are not already running may be engaged. Analogously, to avoid damage to the equipment when the velocity of water is relatively slow, running generators may be disengaged to increase the rotational velocity of the remaining generators, as appropriate, and avoid "lugging" the generator.

The invention may comprise any number of directional converters, such as one directional converter, a pair of directional converters, or two or more directional converters deployed as appropriate. For example, if the hydropower converter is a water wheel, there may be a pair of hydropower converters, each located at (and operatively coupled to) a respective end of the water wheel shaft.

Another embodiment of this aspect of the present invention is directed to a hydrodynamic power generation assembly for generating electricity from an accelerated flow of water, comprising a support structure and a baffle assembly mounted to the support structure. The baffle assembly comprises (a) one or more baffle panels, at least one baffle panel member having at least one opening therein, or (b) two or more separate baffle panels having an interpanel spacing between adjacent panels to form said at least one opening therebetween, or (c) a flow passage around and/or beneath the baffle panel(s). Each of the openings, spacings, or the flow passageway around the baffle panel(s), may be configured to accelerate the velocity of water passing through the opening or around the baffle panel(s) and creates a path or wave of accelerated water flow. This embodiment also comprises a hydropower converter mounted to the support structure and deployed in the path of accelerated water downstream of the at least one opening; and at least one generator operatively coupled to the hydropower converter for producing electricity from the water flow acting on the hydropower converter.

Another embodiment of this aspect of the present invention is directed to a hydrodynamic power generation assembly for generating electrical power from a flow of accelerated water, comprising a support structure and an array of two or more baffle panels mounted to the support structure. The array of baffle panels may be oriented to extend at an angle to the anticipated ambient flow of water, and the baffle panels may have an inter-panel spacing between adjacent panels to form at least one opening. Water passing through the inter-panel spacing, or around the baffle panel, provides a path of accelerated water which has an increased velocity relative to the ambient water flow. This embodiment also comprises a hydropower converter mounted to the support structure and deployed in the path of accelerated water downstream of the baffle assembly; and a generator operatively coupled to the hydropower converter. The hydropower converter converts energy from the flow of accelerated water acting on the hydropower converter to a form of energy usable by the generator to generate electricity. This embodiment also comprises a control mechanism which adjusts the vertical and/or horizontal orientation of the baffle panels in the water to vary the velocity of accelerated water flow. The array of baffle panels may be oriented at any angle in the water. For example, in lower-velocity water, the baffle panels (or the array of baffle panels) may be located generally orthogonal to the water flow, whereas at higher velocity water, the baffle panels or the array may be located at an angle to the water, for example, between 0° and 180°, with respect to the current flow. The angle of the baffle panels or the array of baffle panels may be adjusted to optimize the amount of energy "harvested" from the accelerated water flow. In further embodiments, the angle of the baffle panel(s) or the array of baffle panels may be adjusted between 0° and 360°. Adjustment of the angle or orientation of the baffle assembly or baffle panel(s) in relation to the ambient water flow may be performed in real time or on a predetermined schedule. Adjustment of the angle or orientation of the baffle assembly in relation to the water flow may be computer-controlled or manual, for example, using a motor or other adjustment mechanism, or the baffle assembly may be fixedly mounted to the power generation assembly.

Another aspect of the invention is directed to a method of generating hydroelectric power from a flow of water. The method may consist of the steps of deploying the inventive power generation assembly in a flow of water, and orienting the hydropower converter in the water channeled through or around the baffle assembly to accelerate the otherwise ambient water flow and thereby increase the amount of power generated that would otherwise have been possible with ambient flow alone.

Another embodiment of this aspect of the present invention is directed to a method of generating electricity from water flow. The method comprises: deploying a power generation assembly in the water flow; orienting the position of the hydropower converter in the water passing around a baffle assembly or through an opening of the baffle assembly; and causing the hydropower converter to operate the generator to generate electricity. The power generation assembly may comprise a support structure; a baffle assembly mounted to the support structure for accelerating water; a hydropower converter; and a generator which generates electricity, all as further described herein.

Another aspect of the invention is directed to a method of generating electrical power from flowing water. The method comprises: providing a water accelerator assembly in a path of ambient water flow for increasing velocity of the flowing water past the water accelerator assembly; providing a hydropower converter downstream of the water accelerator assembly in the path of the increased velocity flowing water to actuate the hydropower converter for producing mechanical energy; operatively coupling said hydropower converter to at least one generator; and transferring the mechanical energy into a rotational input to said at least one generator to generate electrical power.

In accordance with the invention, operational settings of the water accelerator assembly can be controllably varied, wherein the operational settings are one or more selected from the group consisting of: the distance between the baffle assembly and the hydropower converter to vary the force exerted upon the hydropower converter, and the buoyancy of the support structure to vary the depth to which the increased velocity flow impinges upon the hydropower converter. In particular embodiments, the support structure comprises a pair of pontoons conjoined together by support members to provide an inter-pontoon passage wherein the hydropower converter is positioned for actuation by the increased velocity water flow.

The inventive method is not limited to a single generator and further embodiments comprise providing a plurality of generators operably connected to at least one hydropower converter. The generators do not all need to be in operation at the same time, and therefore the invention may comprise one or more generator engagement mechanisms which selectively engage and disengage a respective generator from operative coupling with the hydropower converter for varying the amount of electricity produced by the plurality of generators in response to decreases and increases in the velocity of water flow acting on the hydropower converter. That is, when the water velocity is high, additional generators of the plurality may be engaged via the generator engagement mechanism to generate electricity, while slower water velocities may cause disengagement of generators to reduce torque or stress on the equipment which may otherwise decrease the amount of electricity generated. The generator engagement/disengagement mechanism may comprise a mechanical switch, an electrical switch, or both for operatively coupling/decoupling one or more generators to/from a hydropower converter and/or may be computer-controlled.

The baffle assembly increases the velocity of water flowing therethrough or therearound by as much as a factor of two or more, thereby advantageously allowing for production of electricity in even slow-moving currents, or locations where water velocity may be insufficient, as a practical matter, for use to generate electrical power via tidal/current water flow. The invention may increase the velocity of water flowing as slowly as 1-2 knots (0.5-1 m/sec), increasing its velocity to about 2-4 knots (1-2 m/sec), thereby providing an increased ability to generate power from slower waters. Water flowing at less than about 1 knot (0.5 m/sec) generally does not have sufficient energy density or inertia to accelerate when it is funneled and it will usually pass through or around the baffle panels at around the same velocity as the ambient current. Even with an initial flow rate of only about 1 knot (0.5 m/sec), the inventive power generation assembly may still generate useful amounts of electrical power at costs which may be substantially below those of imported diesel to an isolated community. In some embodiments, water flowing at 0.5 knots (0.25 m/sec) may still be accelerated using the invention. There is no maximum velocity limit for the invention, although it is evident that water flowing at a very high velocity would require increasingly robust and costly anchoring and structural components. Particular embodiments of the power generator assembly may be labeled for use with a range of water velocities. For example, the invention may be labeled as "For use in water streams of 1-10 knots (0.5-5 m/sec)".

When the velocity of the accelerated water is very high, it may be desirable to "spill" energy to prevent the force of the water from damaging or affecting the equipment. For example, it may be deemed advisable to establish a predetermined maximum ambient current velocity or a maximum accelerated water velocity value above which energy from the flowing water is spilled, thereby reducing the amount of energy captured by the hydropower converter for, e.g., to prevent potential damage. This reduction in energy capture by the hydropower converter may take place in various ways according to and as a result of the present invention, such as by adjusting the depth of the baffle assembly in the water by raising or lowering the height of baffle assembly or baffle panels in the water, so that less water passes through the opening(s) or spacing(s) in the baffle assembly. Alternatively, the angle of the baffle members with respect to the ambient current may be adjusted to reduce the forces of the water against the baffle assembly.

Alternatively, varying the depth of the hydropower converter within the water flow may also serve to adjust the amount of energy captured by the hydropower converter. For example, raising a water wheel relative to the water level may reduce the total force of the water pressing against the paddles of the water wheel. It is also possible to adjust the buoyancy of the support structure in the water flow. For example, making the support structure more buoyant may cause the support structure to be higher in the water and thereby reduce the amount and force of the water exerting against the hydropower converter. If the hydropower converter is a turbine, the turbine may be partly raised out of the water so that the force of the accelerated water on the paddles or blades may be lessened. Similarly, it may be desirable to lower the hydropower converter (or the entire power generation assembly) deeper into the water or to completely submerge it, and this action may be done, for example, by lowering the buoyancy of the support structure by releasing trapped air or introducing water into specific ballast chambers, or by using a relatively non-buoyant support structure.

It is also possible to adjust the size of the opening in the baffle assembly or the inter-panel spacing between two or more adjacent baffle panels in order to reduce the velocity of accelerated water and thereby spill energy. If the baffle panel opening is made larger or smaller than optimal for maximum acceleration (or if the baffle assembly is removed entirely), the velocity of the accelerated water may approach that of the ambient current and thereby reduce the forces against the baffle assembly. In addition, it may be possible to adjust the position of the hydropower converter relative to the water flow, for example, by raising or lowering the hydropower converter, so that the force of the accelerated water against the hydropower converter may be lessened to reduce potential damage to the power generation assembly.

Other uses of the invention will be apparent to those of skill in the art. Any of the features of the embodiments of the invention disclosed herein may be combined with other features from other embodiments to obtain further exemplifications of the invention, even if not expressly stated.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which:

FIGS. 20A-20E show a water wheel paddle having a plate portion and a slideable extension plate.

FIG. 29 shows a portion of a hydrodynamic power generation assembly having a sliding mechanism for moving the baffle assembly between an opened configuration and a closed configuration.

DETAILED DESCRIPTION OF THE INVENTION

Figure 1:
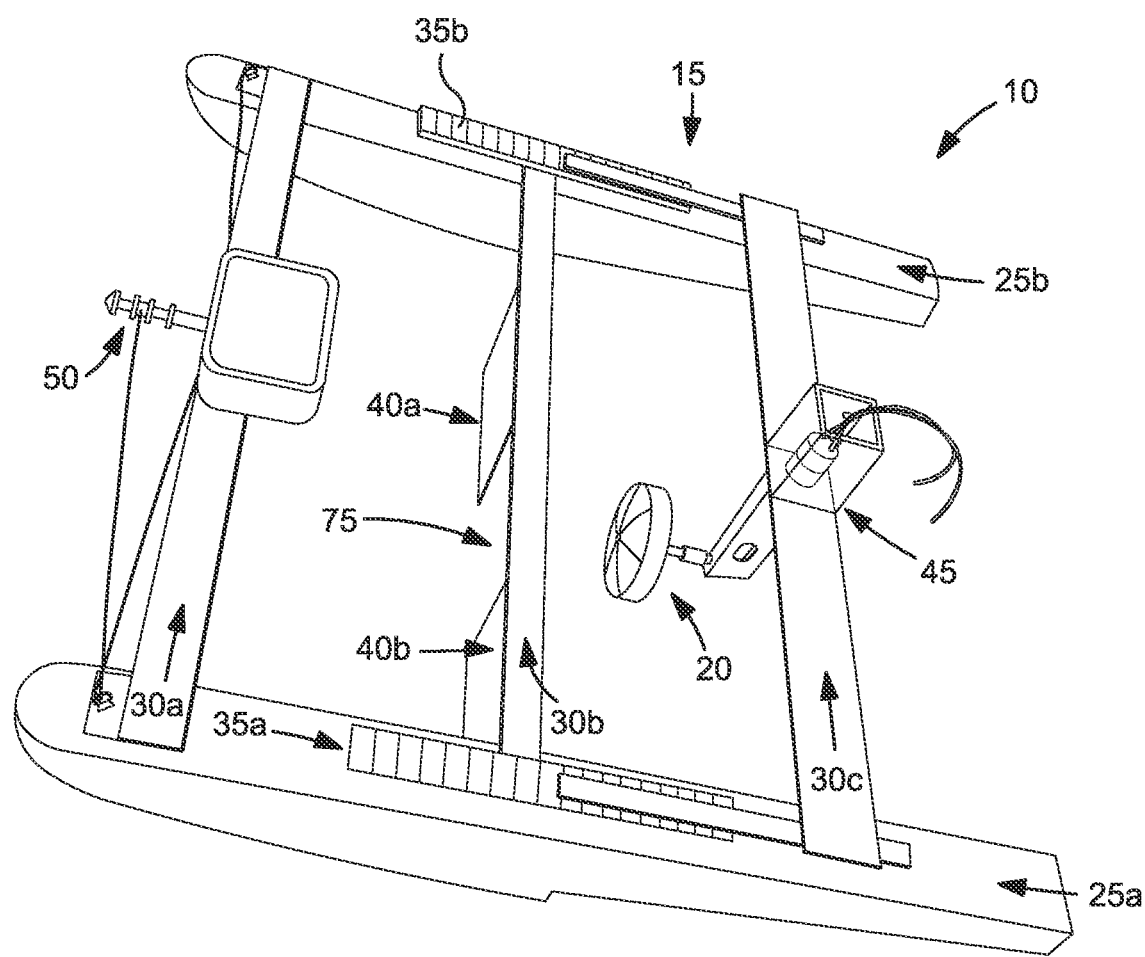
FIG. 1 shows a top left perspective view of a first embodiment of a power generation assembly comprising a hydropower converter in the form of a turbine and a baffle assembly according to the present invention.

The present invention captures kinetic energy, hydrostatic energy, and turbulent energy from a flow of water through, and/or around a hydrodynamic power generation assembly which creates an acceleration in the velocity of the ambient water flow to drive one or more hydropower converters at higher speeds than the ambient water flow would otherwise allow for energizing one or more generators that produce electrical power.

The power generation assembly comprises a support structure which includes at least one baffle assembly which may have one or more openings or one or more spacings therein for accelerating the ambient water flow. As indicated above, the support structure may be a suitably buoyant boat, barge, pontoon, or other vessel which may be positioned on or at the ambient water surface or maintained at a desired depth below the water surface. The baffle assembly may comprise a single baffle panel member with an opening formed in it; or it may comprise two or more baffle panels having an inter-panel opening or spacing therebetween. In other embodiments, the baffle panel does not have an opening but may be structurally configured to cause water to flow around and/or beneath the baffle assembly and thereby accelerate water. In further embodiments, the power generation assembly may be oriented generally perpendicular to the direction of anticipated water flow. At least one hydropower converter may be operatively coupled to at least one generator and also positioned at a predetermined distance from (behind or downstream of) the baffle assembly to provide a spacing therebetween. The configuration of the opening(s) or inter-panel spacing(s) of the baffle panel(s) is not critical and may, for example, be square or rectangular.

The width of the opening in the baffle assembly, or the inter-panel distance between baffle sections, may be optimized, as may the distance between the baffle assembly and the hydropower converter. For example, in an embodiment of the invention, the opening in the baffle assembly may have a width which may be about 30-40% of the total width of the baffle, although the specific dimensions will depend upon the particular implementation of the invention. In one exemplary embodiment, the baffle assembly may be comprised of two baffle sections, each having a width of 2 feet (0.6 m), with an opening therebetween which is 2 feet (0.6 m) wide, making the total width of the baffle assembly to be 6 feet (1.5 m). The baffle assembly may be substantially or fully immersed in the water current. The baffle sections of the baffle assembly may extend into the water column about as low as (or lower than) the depth of the hydropower converter regardless of the size of the hydropower converter, for example, from an 8-inch (20 cm) microturbine to a 50-foot (15.2 m) diameter water wheel. In alternative embodiments, the pontoons (or other buoyant components of a support structure) may extend into the water to a particular depth, while the baffle sections may extend into the water to a lesser depth than the pontoons, thereby providing a flow passageway beneath the waterline for acceleration of ambient water.

It has been found that by providing an opening in the baffle assembly and placing the hydropower converter inlet or actuation area at a predetermined distance downstream of the baffle opening (or, as described below with reference to the spaced-apart baffle plates, spaced a predetermined distance downstream of the inter-plate spacing), preferably without any intervening flow-diverting structure, the velocity of water entering the hydropower converter inlet may be increased by a factor of from 50% to 200% compared to the ambient water velocity. That is, the baffle assembly increases the velocity of water flowing past the baffle assembly by 50-200% compared to the ambient water velocity. In other embodiments in which the baffle assembly does not extend into the water as deeply as the pontoons, as discussed above, the ambient current flowing beneath the baffle assembly will be accelerated. As a result of the increased water velocity, the hydropower converter rotates, spins, or otherwise moves at a much greater velocity than it would in the ambient water current. This acceleration in water flow velocity and the resulting increase in output of the hydropower converter enables increased electrical power output from the generator. Because energy is proportional to the square of the velocity, increasing the water velocity even by a modest amount produces a substantial (exponential instead of linear) increase in its combination of kinetic energy, hydrostatic energy, and turbulent energy which may be converted to electrical power.

In addition to consideration of the rotational velocity of the hydropower converter, it may be desirable to consider torque. There are likely to be situations when it may be undesirable for the hydropower converter to spin above a predetermined rotational velocity. Although rotational velocity may typically be determined by environmental or sensory concerns (such as noise levels), there are also upward operational limits to the rotational velocity such as maximum tip speed and the physics which governs maximum speed. For example, a water wheel may optimally turn such that the paddles on the wheel move at one-third the velocity of the water, and this would be its designed default speed. However, taking into account various factors such as the local environment and the physical properties of the equipment, the hydropower converter may be configured so that it operates at a somewhat slower speed, for example, to minimize its environmental impact and/or to reduce stress on the equipment.

The hydrodynamic power generation assembly may be used in freshwater, brackish water, or salt water, and it will be evident that materials used to fabricate the components of the power generation assembly will need to withstand extended submersion or wet conditions to avoid degradation. Suitable materials include (but are not limited to) polymers (e.g., polyethylene terephthalate), concrete, cement, fiberglass, stainless steel, amorphous metal alloys, wood, or other materials which can be used in a humid environment, and combinations of any of the above.

Exemplary, but non-limiting, dimensions for height, width, and length of a support structure may range between 1 m and 100 m, with a volume ranging between 1 $m^3$ and 1,000,000 $m^3$. The invention may be manufactured or assembled using any suitable manufacturing techniques such as injection molding, blow molding, casting, welding, joining, screw fasteners, or 3D printing. The support structure may optionally be manufactured with a corrugated hull which may increase structural strength by providing a greater resistance to buckling forces when compared to a hull that is not corrugated (e.g., a flat surface).

In one embodiment, the support structure may be buoyant to float in the ambient water flow at or near the water surface, and may comprise a material such as polyethylene foam or polystyrene foam, and/or be filled with air and sealed to maintain full or partial buoyancy of the power generation assembly in the water. The support structure may also have an adjustable buoyancy to adjust the depth to which the hydropower converter is submerged in the path of accelerated water downstream of the baffle assembly and/or the depth of the baffle panel(s). In addition, the position of the hydropower converter in relation to the support structure may be adjustable, for example, using a linear actuator or rack and pinion combination, to vary the depth of the hydropower converter in the water flow. In other embodiments, the support structure may be located beneath the water surface, for example, at or slightly above the bed of the body of water, or at any depth between the water surface and the water bed, and the ambient water flow is accelerated as it moves past an opening in or between baffle panel(s) to impinge upon a hydropower converter such as a turbine.

In order to provide additional flexibility, control, and pitch of the support structure in the water, certain sections of the support structure may have a different buoyancy than other sections. For example, the fore section (the section which is forward of the center of gravity) of the support structure may have a greater buoyancy and rise higher above the water surface than the aft section, or vice versa. The use of multiple pontoons or pontoons having multiple chambers, or inflatable or floodable chambers, to vary its buoyancy and provide the desired amount of buoyancy (or excess buoyancy) to the support structure. This adjustable buoyancy feature may allow, for example, the use of controllers such as winches and/or a harness assembly, to control the cables of the harness assembly to be lengthened or shortened depending on the desired pitch and roll of the assembly. The excess buoyancy of the forward (or rear) chambers would allow the bow (or stern) of the assembly to be pulled down against the excess buoyancy to cause the entire mechanism to ride level or slightly bow up or down if desired, but at any point the winches or other device could be released to whatever extent desired to return the vessel to a bow up position. Such a feature would be advantageous in the event of a marine condition where bow down or stern down could be detrimental to the operation of the invention, particularly if the baffle assembly were located near the bow and the force of current might cause the bow to "tip" downwardly and even become submerged in the water flow. Changing the pitch or roll of the support structure may performed by using a cable running to a central connection, for example, on an anchor member. Alternatively, multiple cables running through fairleads or tether points located at various points on the buoyancy assembly and on baffle members themselves may be used to adjust the pitch or roll of the support structure.

Additional buoyancy may be provided, for example, by an additional support structure section or structure at the fore or aft, as appropriate. For example if the support structure comprises two "main" pontoons which are 8 ft wide by 8 ft tall by 40 ft long (2.4 m×2.4 m×12.2 m), the additional buoyancy may be provided by one or more additional pontoon(s) that are 8 ft wide by 8 ft tall by 16 ft long (2.4 m×2.4 m×4.9 m) which is/are attached lengthwise to the main pontoons beginning at the front of the pontoon and ending 4 ft (1.2 m) ahead of the center of gravity of the main pontoons. If a harness is used to control the position of the support structure, multiple control cables (instead of a single control cable) connected to the harness end and attached to a main anchor cable may afford greater control in pitching bow to stern, stern to bow, or from port to starboard or starboard to port, or any combination thereof. The additional buoyancy sections may have the same or different structure or buoyancy as the "main" pontoons.

The support structure may have any shape such as a box, cube, sphere, or cylinder suitable for maintaining buoyancy and/or capturing drag caused by water flow such as tidal movements. The support structure may be formed of steel, aluminum, wood, or other materials which can be used in a marine environment. The support structure may be buoyant, partly buoyant, or non-buoyant as dependent upon the particular implementation or deployment conditions. In an embodiment of the invention, the support structure may have gas-filled voids or may comprise one or more pontoons (as are known in the art) filled with a gas or a buoyant material such as an extruded polymer foam such as polystyrene foam. The pontoon(s) may have an adjustable buoyancy to vary the depth to which the hydropower converter may be positioned in the water flow. One of skill in the art will recognize herefrom that the support structure may be configured as a single structure or a plurality of joined elements, such as two or more barges, pontoons, vessels, or other structures in a side-by-side, head-to-tail, tail-to-tail, head-to-head, or other arrangement. The support structure or any of the power generation assembly components may be painted or coated with a biocide or an antifouling agent to prevent biofouling.

The baffle panels forming the baffle assembly may have any kind of surface consistent with the ability to channel a flow of water to the hydropower converter. For example, baffle panels may have a flat water-facing surface, or include one or more non-flat water-facing or non-water facing sides configured to capture, minimize, or channel drag, such as a cupped or curved shape. In an embodiment of the invention, the baffle panels have a parabolic shape or a concave shape. A baffle panel may be in any shape suitable for its application and similarly, the opening in the baffle panel, or the inter-panel spacing between adjacent panels, may have any shape. For example, the baffles and openings may be in the shape of a square, rectangle, octagon, trapezoid, circle, or semicircle.

In particular embodiments, the baffle assembly may generally be oriented perpendicular to the direction of water flow to maximize the velocity of the water flowing around and through the baffle panels, and in other embodiments (e.g. FIGS. 25, 27, and 30), the baffle assembly may be at an angle with respect to the direction of water flow, such as between about 0° and about 180, or between about 0° and about 360°. In certain embodiments, the baffle panels may be installed or their position adjusted in real time at the water conditions change, as may be the case during tidal current flows such as during ebb or flood speeds, or during lunar cycles which may affect water flows. The baffle panels may also be installed or deployed at an angle to the water flow if it is deemed suitable, for example, to reduce the amount of water entering the power generation assembly if it would otherwise overburden the system.

In certain embodiments of the invention, the power generation assembly may comprise a flow director upstream of the baffle assembly which may help direct an increased amount of water towards the baffle assembly and thereby help increase the acceleration effect of the water. The flow director may have any kind of overall structure, for example, a conical or frustoconical structure, and be positioned in front of—i.e., upstream of—the baffle assembly, or the flow director may have a non-conical structure, such as a pair of boards or panels which are placed on the sides of the baffle assembly and extend into the current flow before the baffle to thus direct additional water to the baffle assembly. Other funneling or flow-directing structures may be used for particular implementations of the invention.

The power generation assembly may be entirely buoyant to float on the water surface, or the power generation assembly may be completely or partially submerged, depending on the selected deployment site and real-time conditions thereat. Factors that affect surface or submersive operations include environmental issues, visual acceptability, navigable waters restrictions, weather conditions such as high turbulence or high waves, and seasonal considerations such as surface ice, spring thaws, or summer droughts. The power generation assembly may be constructed so as to withstand severe weather conditions or to maintain operations under such conditions. The invention may be designed to operate at water depths that remain flowing even under the most extreme temperature and weather conditions so that electronics are water-tight and can withstand large swells or waves during high winds or severe storms.

As previously stated, the power generation assembly or any of its components may be located at or near the surface of a body of water or submerged below the surface of the water. For example, in winter conditions, the power generation assembly or the baffle assembly may be submerged below the surface of the flowing water where the surface may freeze and thereby continue to generate power as long as the baffle assembly and hydropower converter remain in the path of (non-frozen) flowing water. During conditions of severe cold, it is possible for the support structure to be frozen at the surface of the water, but as long as the hydropower converter (such as a turbine or water wheel) remains in a path of flowing water, whether at the surface such as in a channel cut through the surface ice or submerged below the water surface and located at or near the bottom of the water bed, the invention can still be used to generate power. In certain installations, such as for winter operation, the power generation assembly may optionally be fitted with a heating element to prevent icing of the assembly or particular components such as the hydropower converter or any mechanical parts. A cooling element may also be used to adjust the temperature of a component. The heating or cooling elements may be powered using electricity generated by the generator. If necessary, the invention may be tethered to the riverbed or other location, for example, using a clamp or other device on an anchor cable or tether, so that it maintains a constant height over the bed of the body of water. Surface-operating embodiments of the invention may be constructed with a canopy, dome, or other structure which shields some or all of the support structure from the elements if this is deemed advisable, or to provide operators with protection from the sun or precipitation.

Consistent with the invention, there may be a plurality of baffle assemblies or baffle panels arranged in an array in series or parallel, or both, or a plurality of combinations of assemblies or baffles and hydropower converters arranged in series or parallel, or both. In an illustrative embodiment of the invention, there may be two baffle assemblies in series, and the first accelerator increases the water velocity from 2 knots to 3 knots (1 m/sec to 1.5 m/sec), and the second accelerator increases the water velocity from 3 knots to 4 knots (1.5 m/sec to 2 m/sec). Although the increase in water velocity may not be large, the exponential relationship of water velocity to kinetic energy means that a two-fold increase in water velocity will provide an eight-fold increase in kinetic energy. Thus, even small increases in water velocity may permit significant increases in the amount of power obtainable from a water current flow.

In an exemplary embodiment of the invention, the baffle assembly comprises a baffle panel member in the form of a steel plate which is 5 feet (1.5 m) deep in the water and 13 feet (4 m) wide and has an opening which is 8 feet wide by 5 feet (1.5 m) deep at its center. The baffle panels on each side of the opening in this embodiment are 3 feet (0.9 m) apart. The baffle assembly is welded to a support structure in the form of a single buoyancy chamber that is a rectangular box which is 2 feet (0.6 m) tall, 13 feet (4 m) wide, and 8 feet (2.4 m) in length. Another embodiment of a baffle assembly comprises a baffle panel member consisting of a plate which is 10 feet (3 m) deep and 23 feet (7 m) wide and having an opening of 8 feet by 10 feet (2.4 m by 3 m) at its center, suspended from barges pinned together to make a work platform.

In another embodiment (illustrated in FIGS. 24-27 and 30), the baffle assembly may be pivotally mounted to moveable arms which open and close laterally or vertically within the ambient water flow, or the moveable arms may be the baffle panels themselves which cause water to be accelerated. For example, the baffle assembly may be mounted to a pair of moveable flipper arms (such as those on a pinball machine) which are 20 feet (6 m) wide and 14 feet (4.3 m) deep in one exemplary embodiment. These moveable arms may be pivotally mounted to the pontoons and rotated to any angle between an open configuration, where the arms are fully extended (facing the ambient flow of water) to maximize generation of head and water velocity, to a closed configuration blocking water flow. For example, the arms may be moveable between (a) an open configuration, wherein the arms point away from each other and open the intake of the hydropower converter and cause the baffle panels of the baffle assembly to be orthogonal with respect to the direction of water flow, thereby providing a water acceleration effect, and (b) a closed configuration, wherein the arms point towards each other and close the intake of the hydropower converter and thereby restrict free flow of ambient water past the baffle panels. In this latter configuration, the inlet is substantially blocked and there is no flow of accelerated water through the flow channel of the power generation assembly. In a third configuration, the moveable arms bearing the baffle panels may point directly into the ambient water flow so that the baffle panels are parallel to the ambient flow rather than orthogonal. This third configuration may be used, for example, when the flow velocity is high and further acceleration of the ambient water flow is not desired. Thus, the baffle assembly and/or the baffle panels may be separately moveable to any angle between 0° and 180°, or between 0° and ° and 360°, for example, using a motor or other mechanism. The power generation assembly may also comprise a lock to maintain the baffle assembly in a particular configuration in the ambient water flow.

In an embodiment of the invention, the power generation assembly may comprise a positioning system, for example, a global position system (GPS) receiver, and associated logic modules, such as computer processors, wherein the power generation assembly is capable of determining its current geographical position. The logic modules may be programmed with data regarding locations where strong currents exist within a body of water. An operator or the power generation assembly itself may use this information in addition to location information from the GPS to position the assembly at a specific location within a current flow to generate electrical power.

The generator of the power generation assembly may be located within the assembly at a position which is located below the surface, mounted on the support structure or another structure on the water, or located on land. The generator may be operatively coupled to the hydropower converter and generates electrical power as water flows through the baffle assembly and the water's kinetic energy, hydrostatic energy, and turbulent energy may be converted to rotational energy (or other type of energy) which drives the generator. The generator may be electrically connected to a power transmission line for transmission of generated electricity to the electrical grid, an electrical substation, or to one or more end users. The capacity of the power transmission line may depend on the amount of electricity generated by the generator. The power transmission line may be terrestrial or underwater/undersea, or both. The electrical power generator may also be coupled to an electricity storage unit, e.g., a battery, which may be housed on or within a support structure such as within a pontoon, or at a location on land or elsewhere. The electricity storage unit may be configured to store any suitable amount of power, for example, 1 to 10 MWh. The skilled person understands that the electricity storage and delivery aspects of the invention may depend upon its particular implementation. The electricity storage unit may be configured to store or release the stored electrical energy at a specified time or upon receipt of an instruction to do so.

Figure 28:
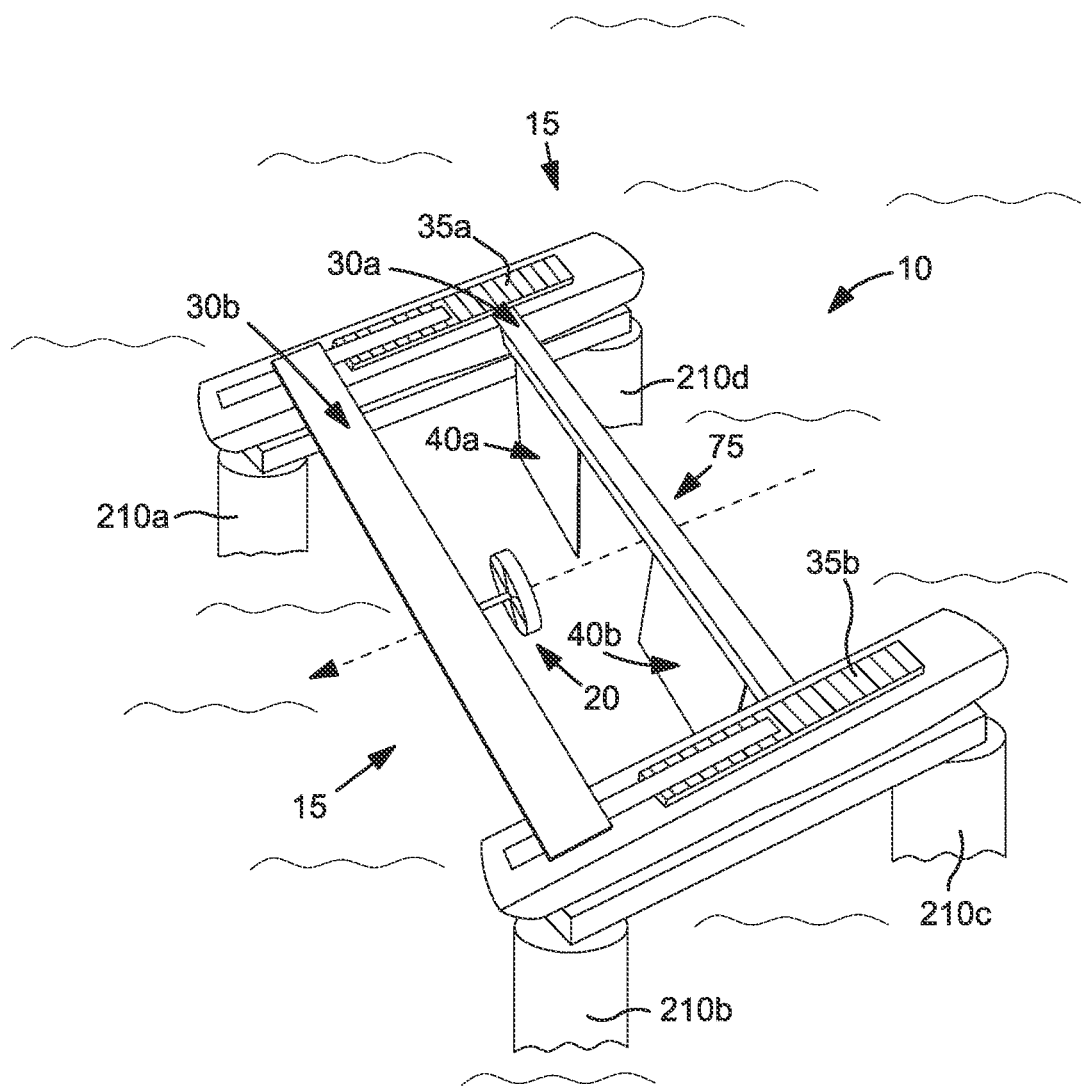
FIG. 28 shows an embodiment of a hydrodynamic power generation assembly for deployment at the bottom of a bed of a body of water.

As an alternative to being deployed at or near the surface of a body of water, the invention may be deployed below the surface of a body of water, as illustrated by FIG. 28. For example, the support structure, baffle assembly, and hydropower converter may be fixedly mounted below the water surface to the bed of the body of water such as a seafloor, riverbed, or tidal bed. In such embodiments, the support structure may be fixedly or moveably mounted below the water surface to the water bed, and the baffle assembly may be mounted to the support structure also beneath the water surface. In exemplary embodiments, the support structure may be mounted to the water bed so that it is located e.g. one foot (0.3 m), three feet (1 m), or ten feet (3 m) above the water bed. The baffle panel(s) may be mounted to the support structure so that they extend down towards the water bed or up from the support structure in the direction of the surface. The baffle panels may also be mounted to move laterally with respect to the water flow passage. The distance between the power generation assembly and the water bed, or between the power generation assembly and the water surface, is not critical so long as the water has sufficient velocity to be accelerated in the manner as discussed herein.

In order to minimize corrosion and the effect of water on the invention, the components of the power generation assembly are optimally manufactured from components which are not affected by water, whether fresh or saline, for example, aluminum, stainless steel, zinc, plastics, and wood. Particular components such as electronics may be sealed in water-tight compartments which may withstand wet or damp conditions to prevent deterioration. It may be also feasible to use conventional non-water resistant components and to periodically replace such items if corresponding water-resistant components are costly or not readily available.

To provide an overall understanding of the systems, devices, assemblies, and methods described herein, certain illustrative embodiments will be described. For the purpose of clarity and illustration, these systems and methods will be described with respect to hydrodynamic power generation assemblies for generating electrical energy from flowing water. It will be understood by one of ordinary skill in the art that the systems, devices and methods described herein may be adapted and modified as may be appropriate, and that these systems, devices and methods may be employed in other suitable applications, such as for other types of energy conversion devices, and that other such additions and modifications will not depart from the scope of invention and claims hereof. When the invention is described with reference to the Figures, like reference numerals refer to like elements.

FIG. 1 shows a top left perspective view of a first embodiment of a power generation assembly (10) with a water accelerator assembly according to the present invention. The power generation assembly (10) comprises a floating support structure (15) having, as the hydropower converter, a turbine (20) mounted thereto. The floating support structure comprises a pair of pontoons (25a, 25b) which are joined by three struts (30a, 30b, 30c). A pair of baffle panels (40a, 40b) with an inter-panel opening or spacing (75) therebetween are mounted to the middle strut (30b), and the turbine (20) is mounted to the rear strut (30c). The middle and/or rear struts (30b, 30c) may be mounted to the pontoons (25a, 25b) via a distance adjustment mechanism (35) in the form of a slide located on both pontoons, and any of the struts (30) may be moveable or have a fixed position.

Any of the struts (30a,30b,30c) may have respective distance adjustment mechanisms (35) in order to optimize the relative spacings between struts for maximum water acceleration and capture of the accelerated water by a hydropower converter or adjust the spacing and resultant water acceleration to accommodate ambient or operational conditions. The distance adjustment mechanism (35) permits the distance between the turbine (20) and baffle panels (40a, 40b) to be varied or adjusted to bring the turbine (20) into an optimal position in the zone of accelerated water behind the inter-panel opening or spacing (75) between the baffle panels (40a, 40b). The turbine (20) is operatively connected to a generator (45) which converts the energy in the water flow, such as kinetic energy, hydrodynamic energy, hydrostatic energy, and turbulent energy in the water flow into electrical energy. A tether line and affixation member (indicated generally at 50) is shown mounted to the front of the power generation assembly (10) for securing the power generation assembly to a fixed location. A generator may be operatively connected to the turbine rotor or shaft via a pulley arrangement, gearing mechanism, or other arrangement as known in the art.

Figure 2:
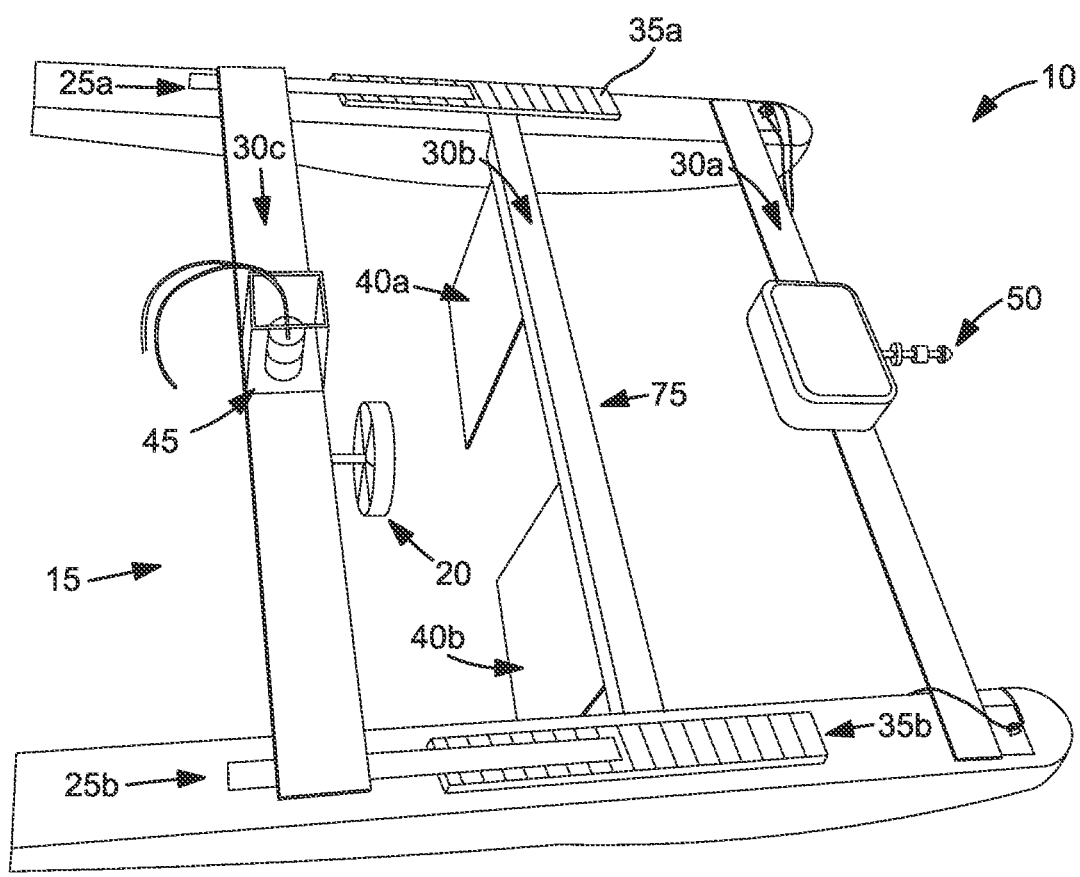
FIG. 2 shows a top right perspective view of the power generation assembly of FIG. 1.
Figure 2A:
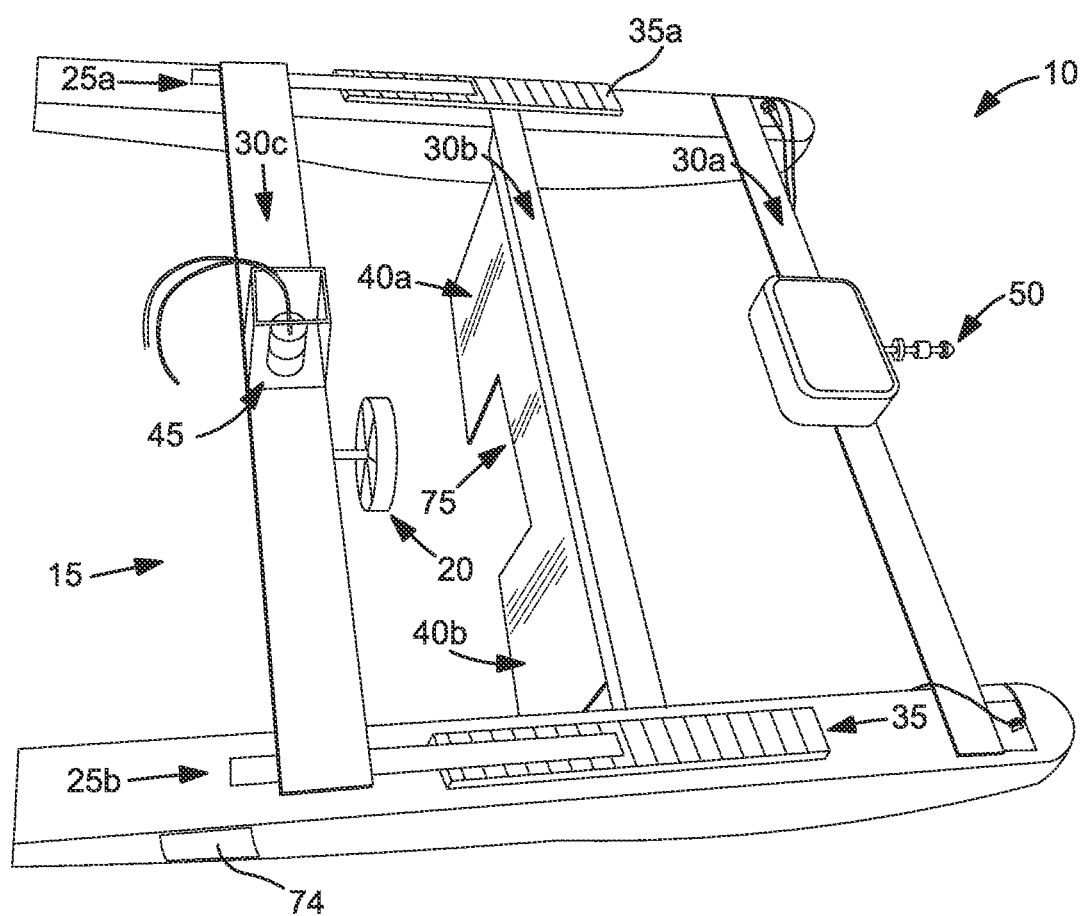
FIG. 2A shows a similar view of an illustrative example of an embodiment of a hydrodynamic power generation assembly with a baffle panel incorporating an opening therein, along with an illustrative example of a buoyancy adjustment mechanism.

FIG. 2 shows a top right perspective view of the power generation assembly of FIG. 1. The power generation assembly (10) comprises a water accelerator assembly comprising a floating support structure (15), a pair of baffle panels (40a, 40b) forming a baffle assembly mounted to the floating support structure (15), and a turbine located downstream of the baffle assembly. Water is channeled between the baffle panels (40a, 40b) through an inter-panel opening or spacing (75) between the baffle panels such that the velocity of water in the zone of accelerated water after the accelerator assembly is increased. In FIG. 2, the turbine (20) is operatively connected to a generator (45). As previously discussed, a pulley arrangement or gearing mechanism as is known in the art, for example, may be used to connect the turbine and generator. The turbine (20) is spaced at a predetermined distance behind the baffle panels (40a, 40b) of the baffle assembly. The resultant water flow entering the actuation area of the turbine (20) has an increased velocity compared to the ambient water stream and turns the turbine (20) to generate more electrical power than if the turbine were in the ambient water flow. FIG. 2A shows an illustrative example of an embodiment having a baffle panel with opening (75) therein as well as an example of a buoyancy adjustment mechanism (74), as further discussed herein. It will be understood that the buoyancy adjustment mechanism can be incorporated in any or all of the pontoons (25a, 25b) throughout the several embodiments of the power generation assembly.

Figure 3:
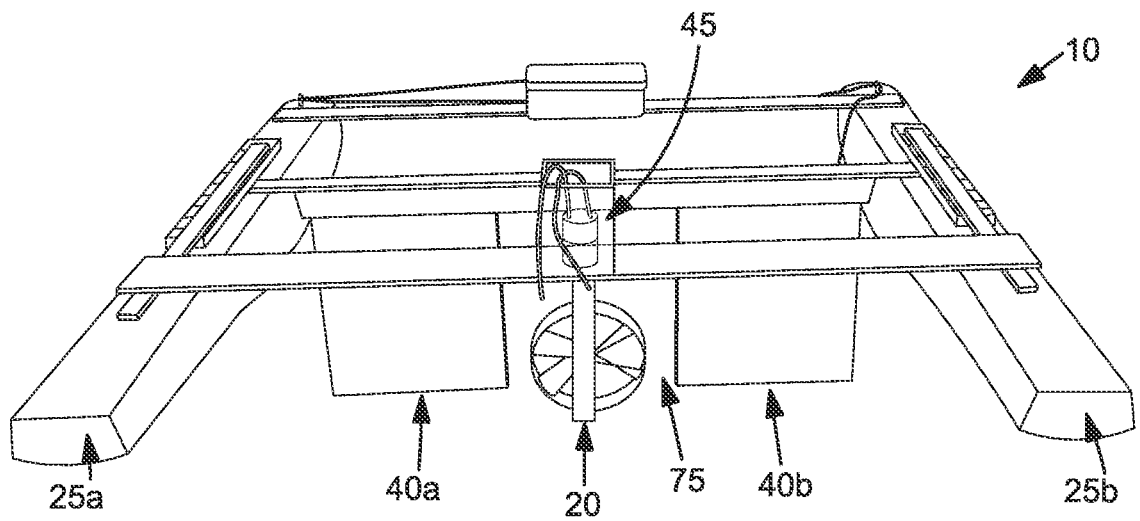
FIG. 3 shows a front view of the power generation assembly of FIG. 1.
Figure 4:
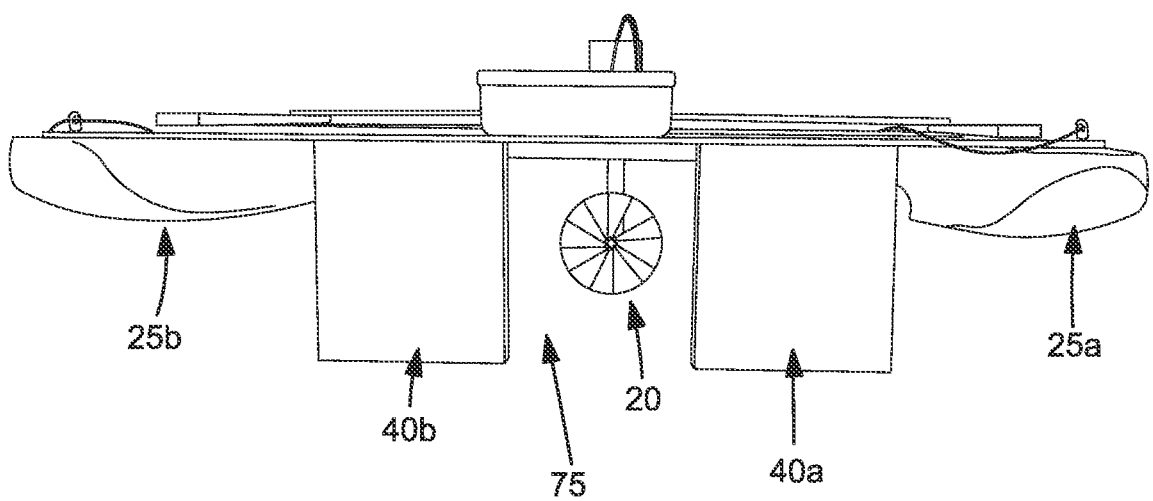
FIG. 4 shows a rear view of the power generation assembly of FIG. 1.

FIG. 3 shows a front view of the power generation assembly (10) of FIG. 1, and FIG. 4 shows a rear view of the power generation assembly (10). The power generation assembly (10) may be deployed at the surface of the flowing water or it may be submerged below the surface—either way to generate power. The pair of baffle panels (40a, 40b) increase the velocity of the water flowing through the inter-panel opening or spacing (75) between the baffle panels (40a, 40b) and entering the actuation area of the turbine (20), as compared to the ambient water flow, in order to spin the turbine (20) at a faster rate than if immersed only in the ambient water flow and thereby provide a greater amount of electricity than merely placing the turbine in the ambient water stream.

Figure 5:
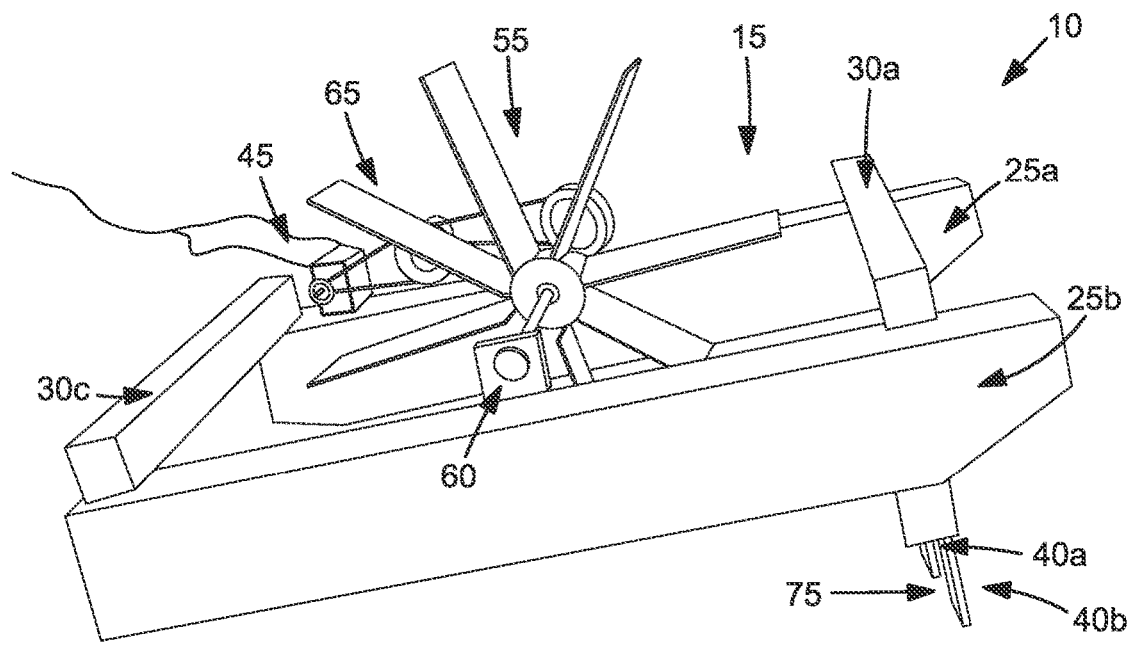
FIG. 5 shows a second embodiment of a power generation assembly according to the invention, comprising a hydropower converter in the form of a water wheel and a baffle assembly according to an aspect of the invention.
Figure 6:
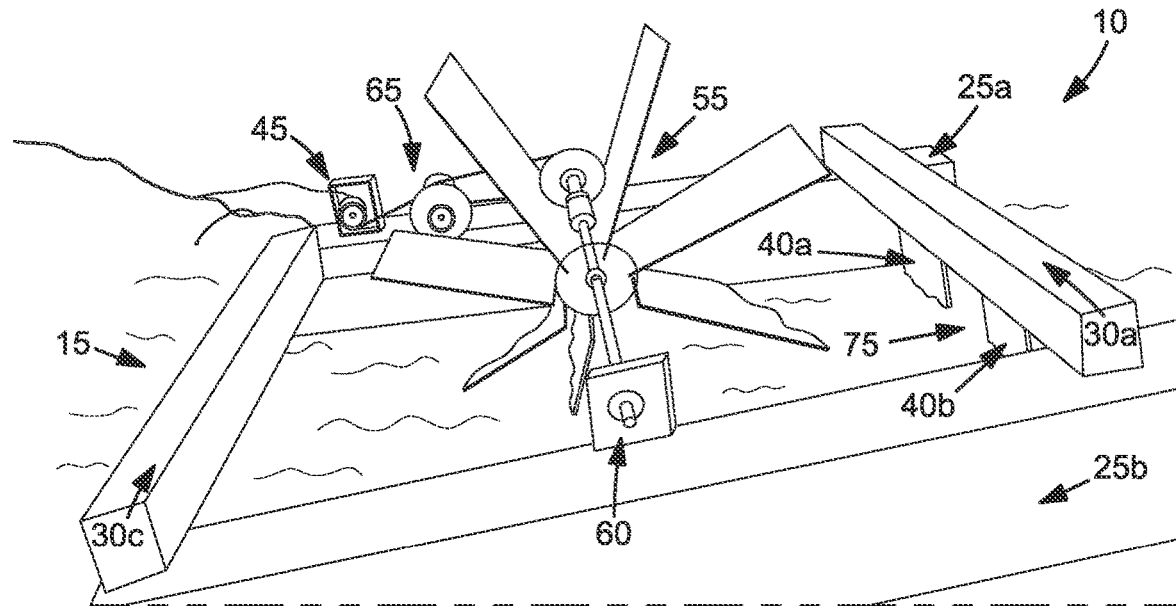
FIG. 6 shows a top right perspective view of the power generation assembly of FIG. 5.
Figure 7:
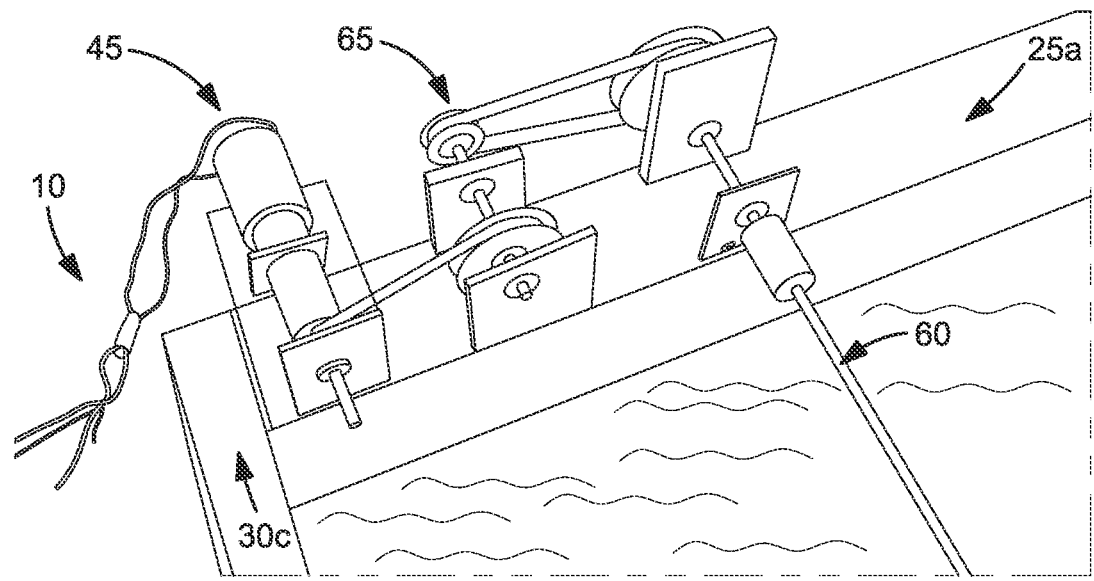
FIG. 7 shows a top perspective view of the pulley arrangement illustrated in FIGS. 5 and 6.

FIG. 5-7 show a second embodiment of a power generation assembly (10) according to the invention. The embodiment of FIGS. 5-7 is similar to that of FIGS. 1-4 except that the hydropower converter in this embodiment is a water wheel (55) instead of a turbine (20). Specifically, FIG. 5 shows a right perspective view of this second embodiment of the power generation assembly (10). The power generation assembly (10) comprises a floating support structure (15) having a pair of pontoons (25a, 25b) which are joined by two struts (30a, 30c). A pair of baffle panels (40a, 40b) are mounted to the front strut (30a) with an inter-panel opening or spacing (75) between the baffle panels (40a, 40b). A water wheel (55) is mounted on an axle (60) between the pair of struts (30a, 30c). A distance adjustment mechanism (not illustrated but similar to mechanism (35) above) permits the distance between the water wheel (55) and baffle panels (40a, 40b) to be adjusted to bring the water wheel (55) into an optimal position in the flow of accelerated water downstream of the baffle panels (40a, 40b) of the baffle assembly. The water wheel (55) is located in the zone of accelerated water and is operatively connected, in this embodiment, via a pulley arrangement (65) to a generator (45) which converts kinetic or hydrodynamic energy in the water flow into electrical energy. A tether (not illustrated but may be, e.g., similar to tether and affixation member 50 described above) may be mounted to the front of the power generation assembly is used to position the power generation assembly at a particular location. It will be understood that the water wheel may alternatively be operatively coupled to the generator by a gearing assembly, as described herein.

FIG. 6 shows a top right perspective view of the power generation assembly (10) of FIG. 5. The power generation assembly (10) comprises a water accelerator assembly comprising a floating support structure (15) and a baffle assembly comprising a pair of baffle panels (40a, 40b) mounted to the floating support structure (15). Water is channeled through the inter-panel opening or spacing (75) between adjacent baffle panels (40a, 40b) and around the baffle panels such that the velocity of water passing through the accelerator assembly to the water wheel (55) is increased. In FIG. 6, the water wheel (55) is operatively connected to a generator (45) via a pulley arrangement (65). The actuation area of the water wheel (55) is located in the zone of accelerated water at a predetermined distance behind (downstream of) the pair of baffle panels (40a, 40b). The baffle panels (40a, 40b) create head in the water and thus water flow driving the water wheel (55) has an increased velocity compared to the ambient water stream and this increased flow velocity turns the water wheel (55) to generate electrical power. Once again, because the pair of baffle panels (40a, 40b) increases the velocity of the water passing through the inter-panel opening or spacing (75), the water wheel (55) turns at a faster rate and provides a greater amount of electricity generating potential than merely placing the water wheel (55) in the ambient water stream.

FIG. 7 shows a top perspective view of the pulley arrangement (65) illustrated in FIGS. 5 and 6. The pulley arrangement (65) is operatively connected to the axle (60) of the water wheel (55) and the pulley arrangement (65) in turn drives the generator (45) to generate power using a step-up mechanism to turn the generator at greater rotational speed than the water wheel.

Figure 8:
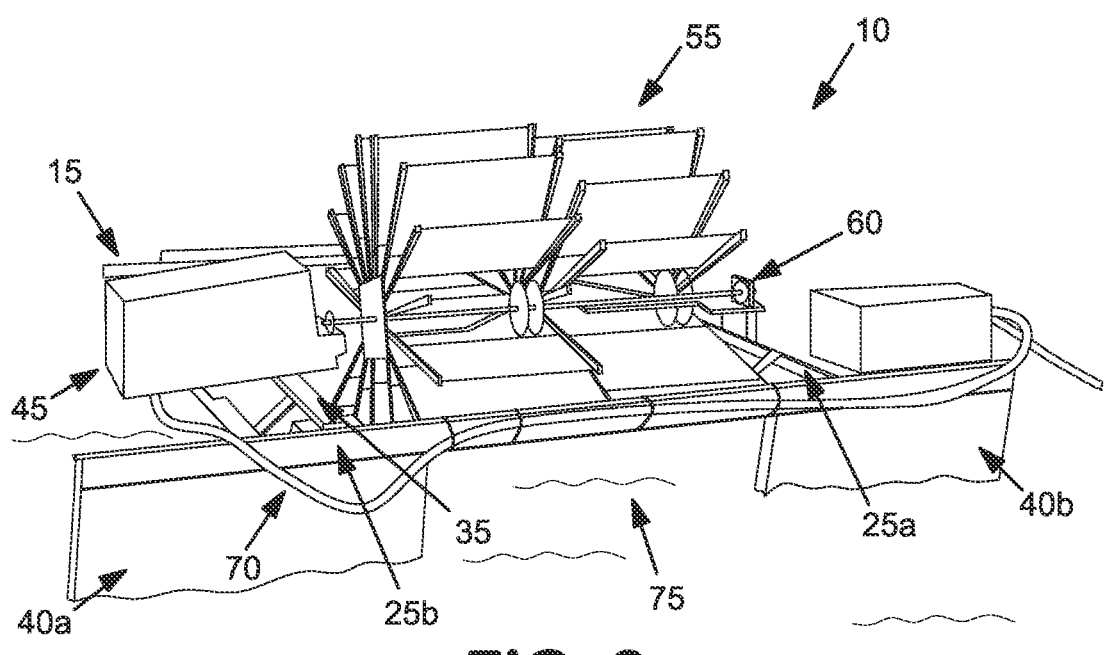
FIG. 8 shows a front view of a second implementation of the embodiment of the power generation assembly illustrated in FIGS. 5-7, comprising a water wheel and a baffle assembly for accelerating water.

FIG. 8 shows a front view of a second implementation of the embodiment of the power generation assembly (10) illustrated in FIGS. 5-7, comprising a hydropower converter in the form of a water wheel (55) and a baffle assembly. Two baffle panels (40a, 40b) having an inter-panel opening or spacing (75) therebetween are positioned at the left and right ends of the support structure (15). Pontoons (25a, 25b) (better evident in FIGS. 6 and 9) are mounted to the support structure so that the support structure (15) is at the surface of the water. The two baffle panels (40a, 40b) cause an increase in the velocity of the water current flowing through the baffle assembly, thereby allowing for a greater amount of electrical energy to be generated as compared to the ambient current. The inter-panel opening or spacing (75) between the baffle panels (40a, 40b) directs the accelerated water through the power generation assembly to the actuation area of the water wheel (55). In this embodiment, the water wheel (55) comprises two sets of radially extending paddle members which, advantageously are circumferentially offset from each other in order to enhance the energy absorption from the accelerated water flow and/or to result in a more uniform rotational speed of the overall water wheel. The water wheel (55) is operatively connected to a generator (45) which generates electricity as the water wheel (55) turns. As the water wheel (55) turns about the axle (60), the generator (45) converts the rotational energy produced by the water wheel (55) into electrical energy. This electrical energy is then transmitted via an electrical cable (70) to a power substation, power grid, battery, or directly to a user. A distance adjustment mechanism (35) allows for optimization of the position of the axle of the water wheel (55) so that the actuation area of the water wheel is located in the optimal location in the zone of accelerated water to generate a maximal amount of electrical power.

In FIG. 8, the two baffle panels (40a, 40b) and the opening or inter-panel spacing (75) are each about one-third of the width of the support structure (15). Consistent with the invention, the baffle panels (40a, 40b) and the inter-panel opening or spacing (75) may have the same or different widths depending on the particular implementation of the invention.

Figure 9:
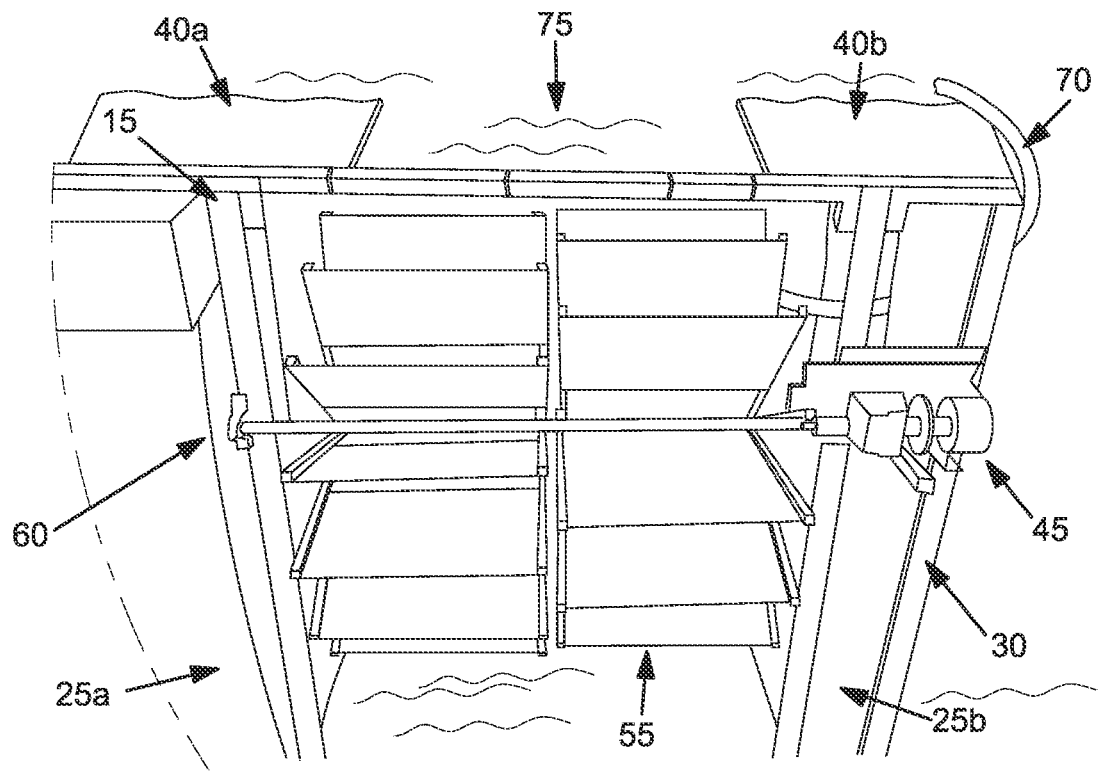
FIG. 9 shows a top view of the embodiment of FIG. 8.

FIG. 9 shows a top view of the embodiment of the power generation assembly (10) of FIG. 8. The two baffle panels (40a, 40b) are on opposite ends of the support structure (15) which is maintained at the surface of the water via a pair of pontoons (25a, 25b). A hydropower converter in the form of a water wheel (55) is located behind the inter-panel opening or spacing (75) between the two baffle panels (40a, 40b) which increases the velocity of the water passing therethrough. The increased velocity of the water passing through the baffle assembly allows for generation of a greater amount of electrical power as compared to the ambient current. The water wheel (55) is located in the zone of accelerated water behind the baffle assembly and is turned about the axle (60) by the water flow accelerated through the baffle assembly. Power generated by the generator (45) is transmitted via an electrical cable (70) to the electrical power grid or another suitable destination.

Figure 10:
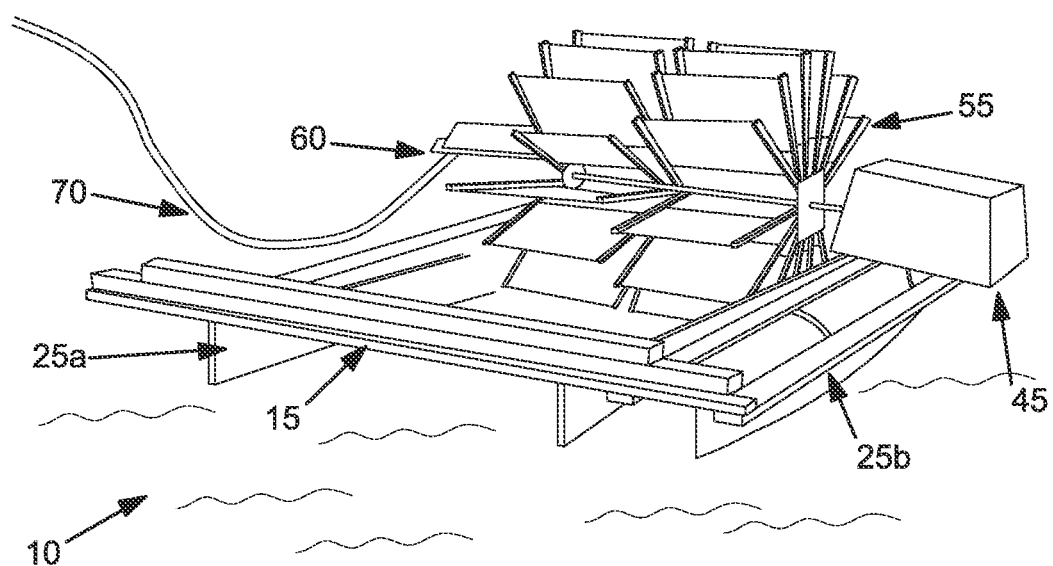
FIG. 10 shows a rear view of the embodiment of FIG. 8.

FIG. 10 shows a rear view of the embodiment of the power generation assembly (10) of FIG. 8. The water wheel (55) turns about an axle (60) and is operatively coupled to a generator (45) which generates electrical power as the water wheel (55) is turned by the water flow. The power generation assembly is deployed in the current of a stream and may generate power continuously as long as there is at least a minimum flow of about 1 knot (0.5 m/sec) of water in the stream. Higher velocity water will, of course, generate more electrical power than may slower-flowing water.

In any of the embodiments of the invention, the baffle panels (40a, 40b) comprising the baffle assembly may optionally be moved from a deployed position, where the baffle panels are immersed in the water and accelerating water passing therethrough, to a retracted position in which the baffle panels are partly or completely lifted out of the water in order to vary the degree to which the ambient current is accelerated as it acts on the hydropower converter after traversing the baffle assembly. In certain embodiments, the baffle panels or the baffle assembly may also be moved to any angle between 0° and 360° along the vertical and/or horizontal axes. If the water current is very strong, it may be desirable to retract the baffle panels (40a, 40b) or to deploy them at an angle to the water flow instead of head-on so as to partly deflect some of the water current which would otherwise flow between the baffle panels, or to prevent the baffle assembly from generating "lift" and causing the support structure (15) or the power generation assembly (10) to experience lifting forces. It may also be desirable to allow the baffle panels (40a, 40b) to be retracted or temporarily removed from the support structure for maintenance purposes.

Figure 11:
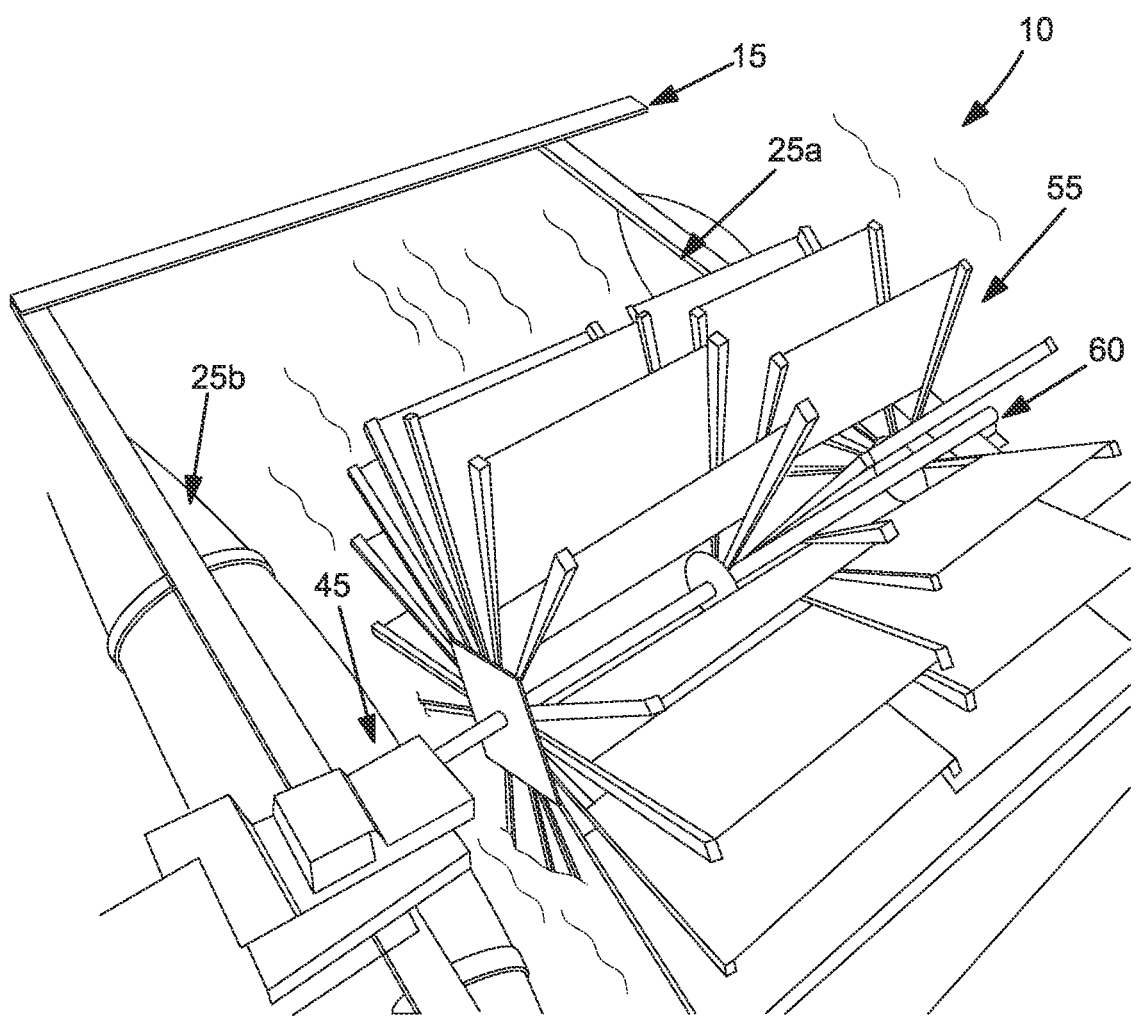
FIG. 11 shows a top perspective view of the embodiment of FIG. 8.

FIG. 11 shows a top perspective view of the embodiment of FIG. 8. The water accelerator assembly comprises the support structure (15) and the baffle assembly (not shown) at the front of the support structure (15). The water flowing through the inter-panel spacing between adjacent baffle panels produces a zone of accelerated water which has an increased velocity as compared to the ambient water flow, and this increased velocity water in the actuation area of the water wheel turns the water wheel (55) about the axle (60) to generate more electrical power by the generator (45) than would otherwise be obtained from the ambient flowing stream. Pontoons (25a, 25b) in this embodiment maintain the support structure (15) at the surface of the water.

Figure 12:
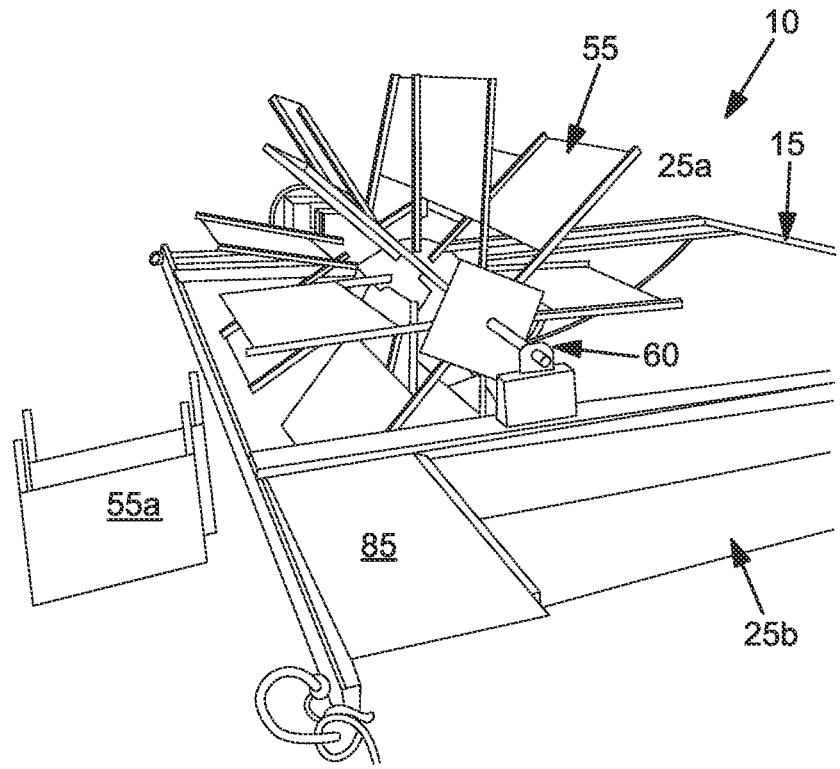
FIG. 12 shows a right side view of the embodiment of FIG. 8 in which the baffle panels are shown in a retracted position.

FIG. 12 shows a left side view of the embodiment of FIG. 8 in which the power generation assembly is in a partially assembled state. The baffle panels have been removed for maintenance or storage. One or more paddles (55a) of the water wheel (55) has been removed and is resting along the front of the power generation assembly. In this figure, a standing deck (85) is shown at the left side of the support structure (15). The standing deck (85) provides a location for a worker to stand on, for maintenance purposes or while the invention is in operation. The optional standing deck (85) may have any dimensions, although it should be evident that it will need to have sufficient strength to support the weight of an individual. There may be one or more standing decks, such as a wraparound deck, located at any convenient or appropriate location on the support structure. In large embodiments of the invention, some or all of the support structure may have standing capabilities to permit workers to move about the power generation assembly as needed.

Figure 13:
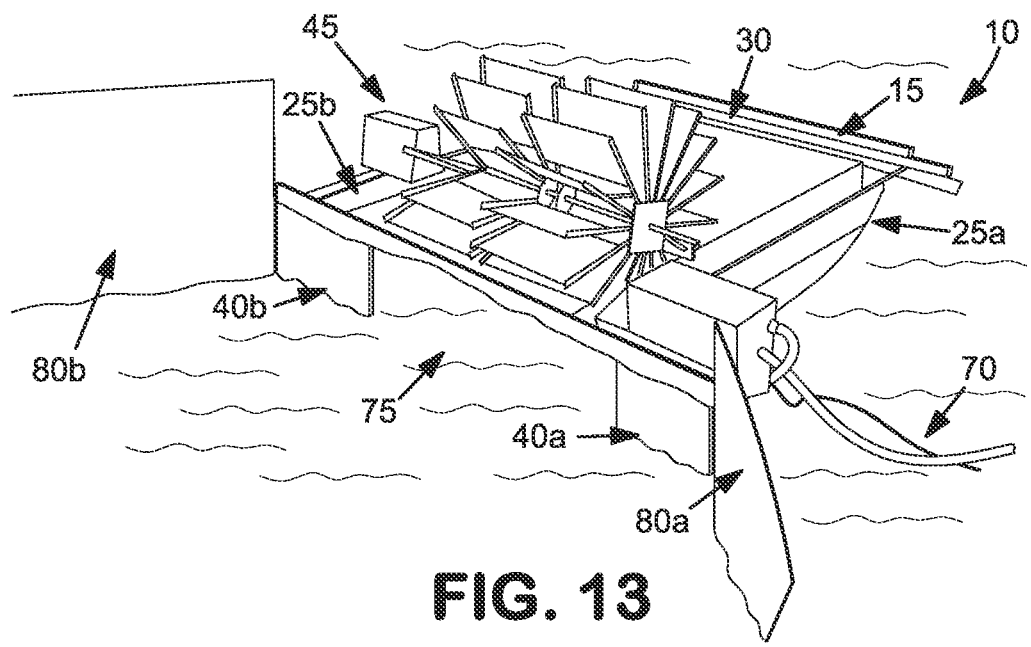
FIG. 13 shows a front perspective view of a third implementation of the embodiment of the power generation assembly illustrated in FIGS. 5-7, in which flow director elements extend in front of the baffle assembly to direct water to the accelerator.

FIG. 13 shows a front perspective view of another implementation of the power generation assembly (10) illustrated in FIGS. 5-7, in which flow directors (80a, 80b) extend in front of the baffle assembly to help direct the ambient water flow toward the baffle panels (40a, 40b). Pontoons (25a, 25b) maintain the support structure (15) at the water surface, and struts (30) join the pontoons (25a,25b) to form the support structure (15). Electricity is generated by the generator (45) which is turned by the hydropower converter which is a water wheel (55) in this embodiment. Generated electricity is transmitted via an electrical cable (70) to a land-based destination such as the local electrical grid or a battery.

Flow directors (80a, 80b) in this embodiment may be flat panels which are placed on opposite sides of the support structure (15) before (or upstream of) the baffle panels (40a, 40b) and inter-panel opening or spacing (75) between the baffle panels (40a, 40b) in order to help direct the moving water flow to the front of the baffle assembly, and the flow directors (80a, 80b) extend below the water surface. The flow directors (80a,80b) may have any particular shape such as (but not limited to) flat, curved, conical, and frusto-conical, consistent with the ability to help channel the water flow towards the baffle assembly for acceleration. Although the flow directors (80a, 80b) are shown as two panels on opposite sides of the baffle assembly, the flow directors may also be located below the water surface in front of the support structure (15) instead of being along the outer sides of the support structure (15). There may also be any number of flow directors (80a, 80b) such as one, two, three, four, or more, and a single flow director panel (80a, 80b) may also be composed of several component parts. The flow directors (80a, 80b) may be located along one side of the baffle assembly, along both sides, in front of the accelerator below the waterline, or at any location deemed desirable, without restriction.

Figure 14A:
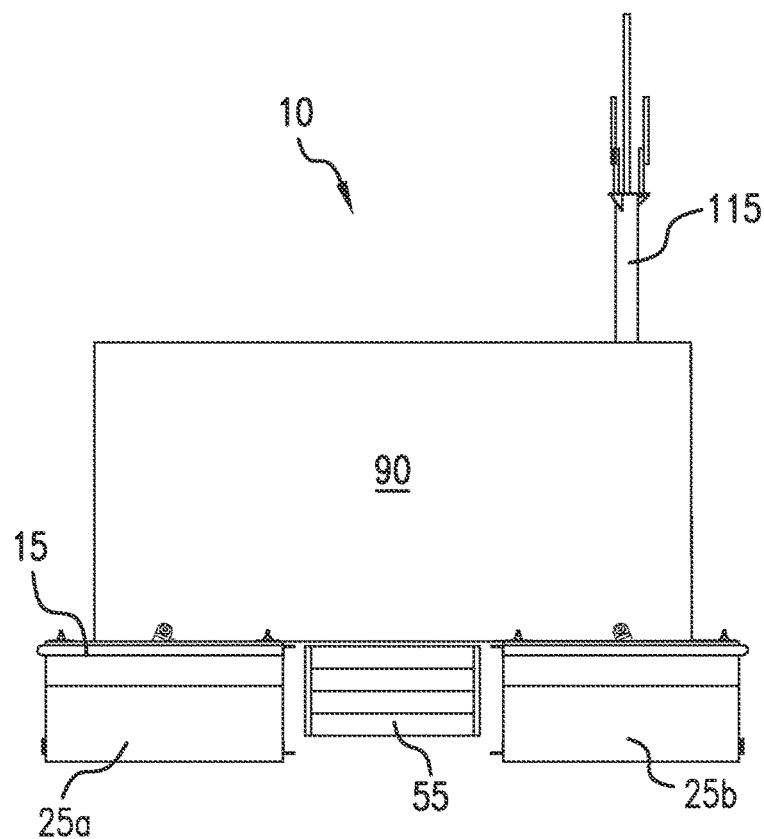
FIGS. 14A and 14B show front and right side views of an embodiment of a power generation assembly according to the invention comprising a water accelerator assembly and water wheel and having a cover over the water wheel.
Figure 14B:
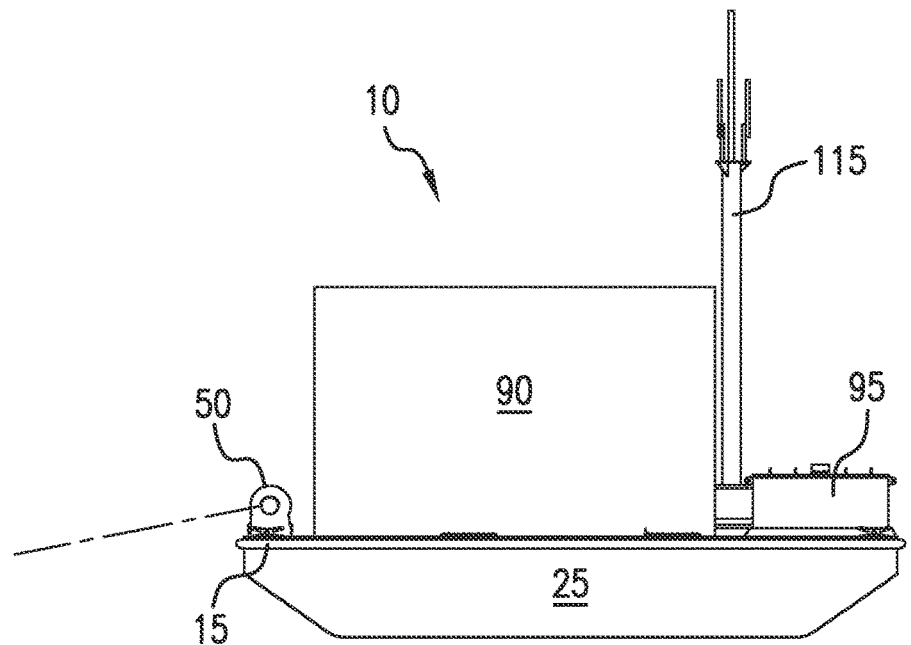

FIGS. 14A and 14B show front and right side views of an embodiment of a power generation assembly (10) comprising a water wheel (55). The power generation assembly (10) is comprised of a support structure (25) to which a pair of pontoons (25) are mounted, and the assembly (10) is tethered to a fixed location via a tether (shown in phantom in FIG. 14B) which is attached to an attachment point (50) located at the front of the support structure (15). The pontoons (25) provide buoyancy to the power generation assembly (10) so that it floats on the water surface. The water wheel (55) is located between the adjacent pontoons (25a,25b) and is covered by a wheel cover or housing (90). The wheel cover (90) shields the water wheel (55) from the elements and prevents any water spray from the water wheel (55) from blanketing the surfaces of the power generation assembly (10) and may reduce noise as well. It may be evident that any water spray from the water wheel (55) enclosed by the cover (90) may eventually drain down into the body of water upon which the power generation assembly (10) is floating. In this embodiment of the invention, an antenna (115) is used for wireless electronic communications or data exchange between the power generation assembly (10) and another location (not shown) such as a control room or central station. An electrical compartment (95)—ideally, as water-tight as possible—may be used to contain any of the electronic, electrical, or hydraulic components of the invention such as a battery and prevent such components from being exposed to the elements.

Figure 15:
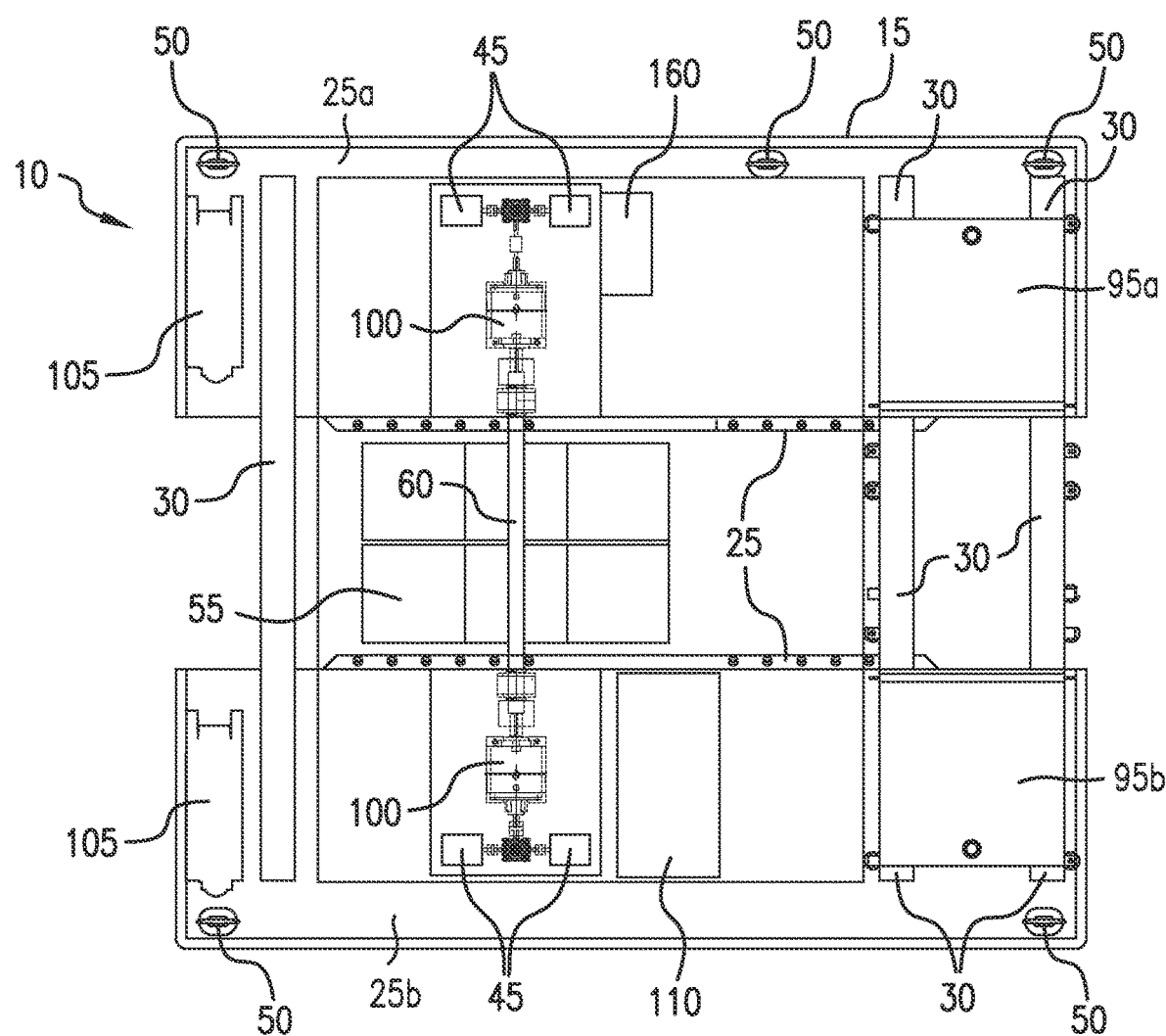
FIG. 15 shows a top view of an embodiment of a power generation assembly according to the invention comprising a plurality of generators operatively connected to the axle of a water wheel.

FIG. 15 shows a top view of an embodiment of a power generation assembly (10) according to the invention comprising a plurality of generators (45) operatively connected to the axle (60) of a water wheel (55). The power generation assembly (10) comprises a support structure (15) floating on a pair of pontoons (25) forming part of the support structure (15). Struts (30) are used to secure the pontoons (25) of the support structure (15) in this embodiment of the invention. A plurality of tether attachment points (50) are mounted to the support structure (15) for tethering the power generation assembly (10) to a fixed location. A load bank (160), as is known in the art, is located on the support structure (15) and used for replicating, proving, and verifying the real-life demands of the power generation assembly (10). A programmable logic controller box (110) is also located on the support structure (15) and is used as a high-reliability automated control of the water wheel (55), and an electrical compartment (95) contains a battery and hydraulic parts. A pair of winches (105) is available on the support structure (15) to adjust the tension of a rope or tether to a fixed location. The winches (105) may also be used to provide tipping capabilities to the support structure (15) or the baffle assembly, for example, to adjust the angle of the support structure or one or more baffle plates (40) of the baffle assembly in the water. Although two winches (105) are illustrated, any number of winches (105) may be used and they may be positioned at suitable locations, for example, at each corner of the support structure (15) or at the midpoint between corners. Electrical compartments (95a,95b) may be used to contain any of the electronic, electrical, or hydraulic components of the invention and prevent such components from being exposed to the elements.

In this embodiment of the invention, the axle (60) of the water wheel (55) is operatively connected to a pair of directional converters (100) which converts rotational energy received from the water wheel (55) and transfers the rotational energy to the generators (45). The directional converters (100) in this embodiment consist of gearboxes and bevel gearboxes which convert the rotational kinetic energy of the axle (60) moving in one direction to an input rotation in two different directions for use by the generators (45). Thus, in this illustration, each of the two directional converters (100) drives two generators (45), and the total number of generators (45) in FIG. 15 is four. The directional converter (100) may also include a control mechanism having a gearing mechanism which engages or disengages one or more generators (45) upon reaching a specified level of torque. For example, as the velocity of the accelerated water increases, the water wheel (55) captures increasing amounts of kinetic energy from the water and offline (disengaged) generators (45) may be engaged to generate more electricity. As the velocity of the accelerated water decreases, one or more generators (45) may be disengaged to prevent the generators (45) from "lugging" the drivetrain, thus allowing the drivetrain to spin with less resistance. By selectively engaging and disengaging generators, the present invention maximizes generation of power while reducing wear on the generators whenever possible, and as a result, is enabled to run efficiently in essentially any deployment location and/or any varying conditions.

Figure 16:
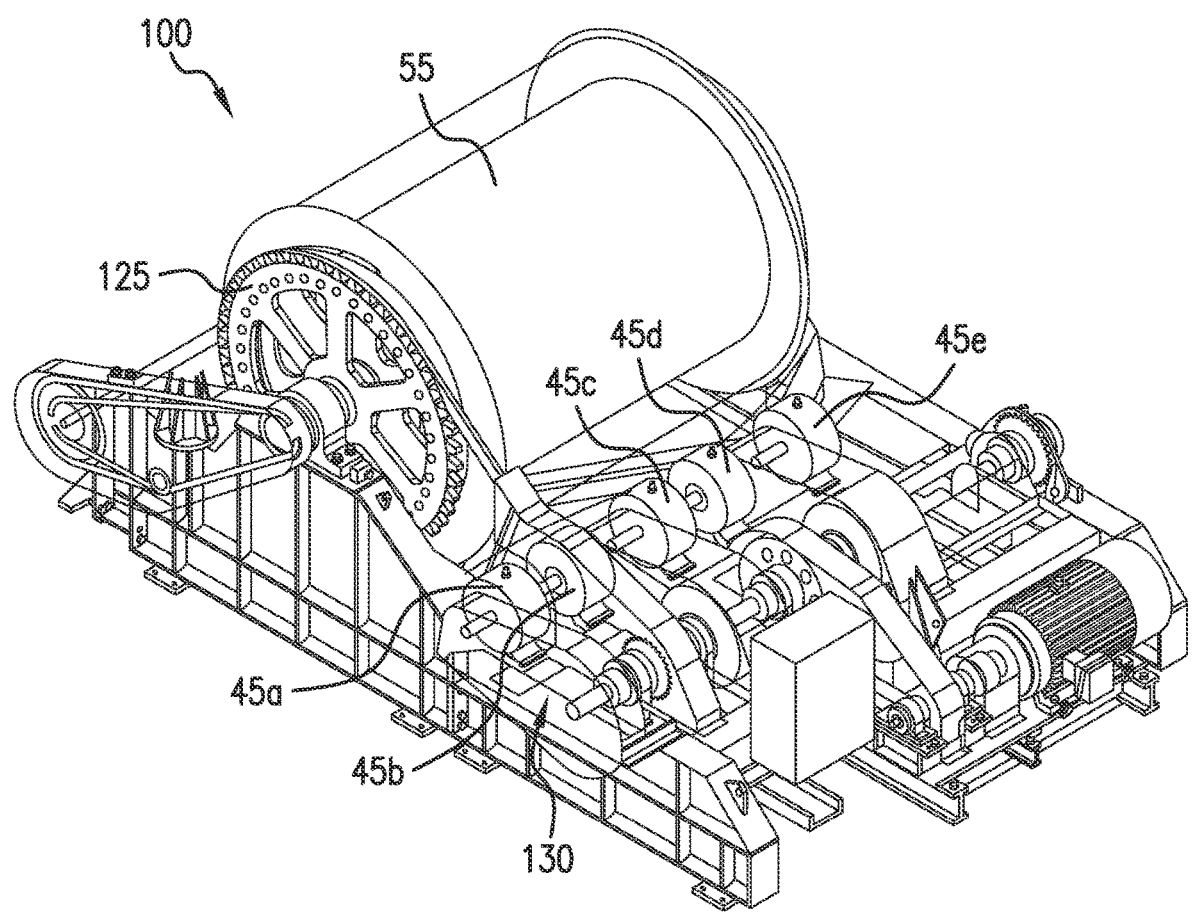
FIG. 16 shows a rear perspective view of an embodiment of a directional converter comprising a gearing mechanism for transferring rotational energy to a plurality of generators.

FIG. 16 shows a rear perspective view of an embodiment of a directional converter (100) comprising a gearing mechanism (130) for transferring rotational energy to a plurality of generators (45). A water wheel (55) (shown without paddles for ease of illustration) drives the directional converter (100) which is operationally connected to the generators (45a, 45b, 45c, 45d, 45e) via a drive gear (125) and gearing mechanism (130). The directional converter (100) similarly also includes a control mechanism for selectively engaging and disengaging particular generators (45) of the plurality.

When operating to generate electricity, the generators are mechanically engaged and connected to the drivetrain and are electrically connected to the electrical grid. When a generator is not being used to generate electricity, it may be mechanically disengaged from the power generation assembly. When a generator is mechanically engaged but electrically disengaged, the generator remains coupled to the power generation assembly and it spins freely since there is no electrical load or impedance on the system. At the point when another generator is needed to generate additional electricity, the electrical connection between the generator and the power grid is re-established by, e.g. activating a switch or other mechanism. Once the generator is reconnected to the electrical grid (load), the generator then begins to convert the rotational power from the hydropower converter into electrical energy. In another embodiment of the invention, the generators are connected to the system mechanically by a mechanical switch, such as a clutch system or a moveable coupling system, and electrically by an electrical switch as discussed above. Thus, the generator engagement mechanism may comprise a mechanical switch, an electrical switch, or both. In a further embodiment of the invention, the generators are manually or automatically connected and disconnected from the power generation assembly using aligned couplers or other structures as are known in the art.

Figure 17:
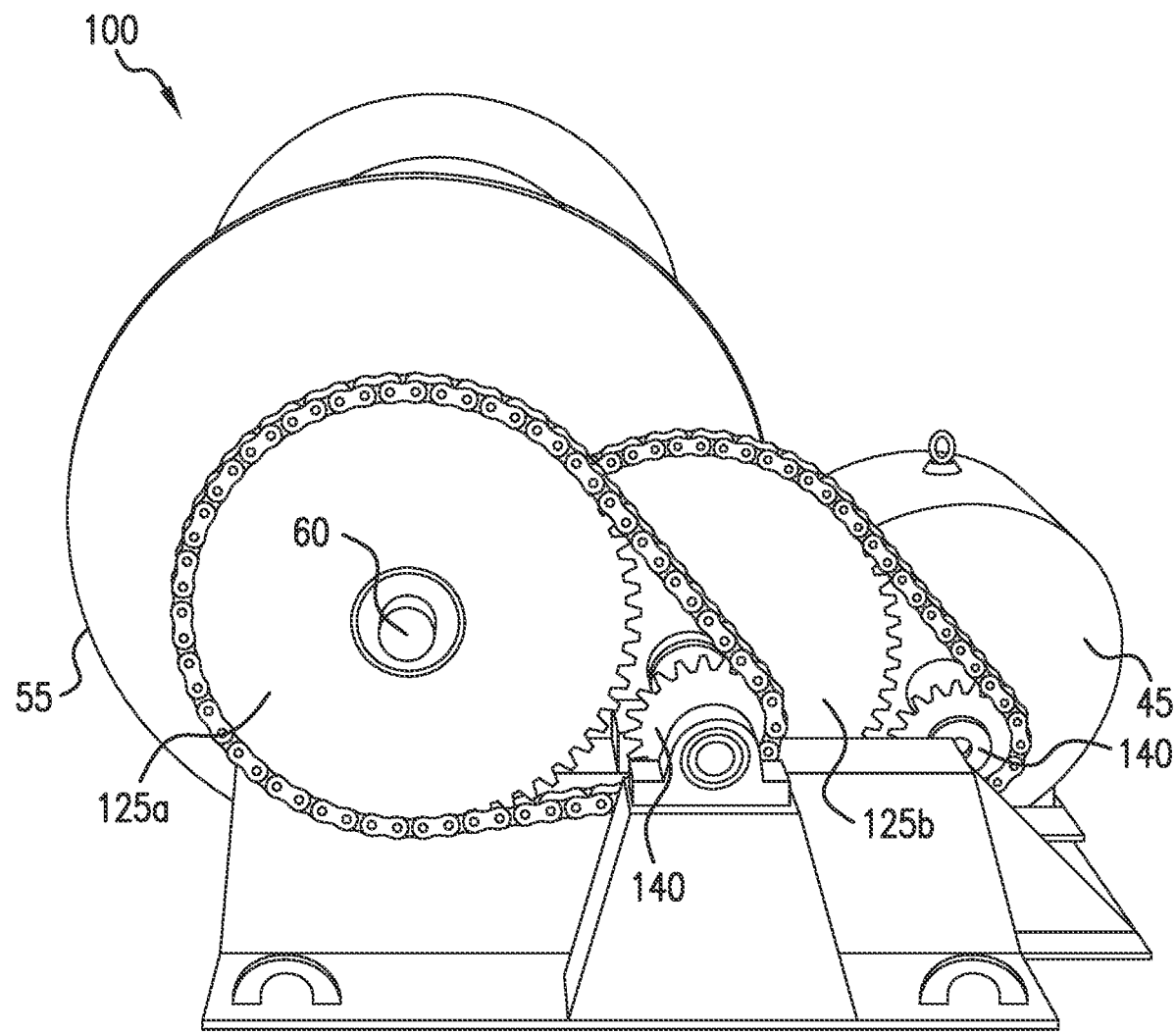
FIG. 17 shows a side view of another embodiment of a gearing mechanism, comprising a chain and sprocket arrangement.

FIG. 17 shows a side view of another embodiment of a directional converter (100) having a gearing mechanism (130) comprising a chain (135) and sprocket (140) arrangement. A water wheel (55) (shown without paddles for ease of illustration) having an axle (60) is operatively connected to a first drive gear (125a). The drive gear (125a) is operatively connected to a second drive gear (125b) via a chain (135) and sprocket (140) arrangement. The second drive gear (125b) is operatively connected to a generator (45) which rotates to generate electricity. Although only a single generator (45) is shown, any number of generators may be used to generator electricity, as explained herein including with respect to FIG. 15.

Figure 18:
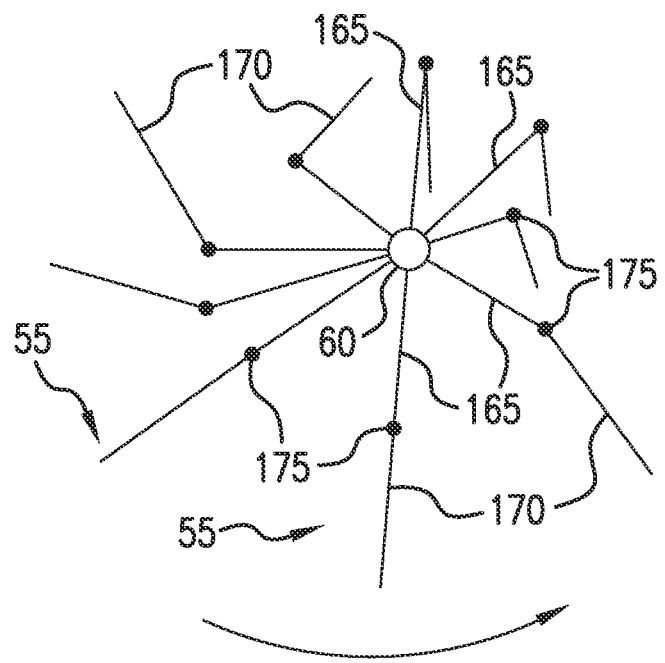
FIG. 18 shows an embodiment of a water wheel having paddles with hinges for reducing the surface area of the paddles out of the water and associated noise.

FIG. 18 shows a cross-sectional right side view of an embodiment of a water wheel having paddles (55) with hinge points (175) for reducing the surface area of the paddles out of the water. This configuration reduces the noise associated with a water wheel and prevents, or least minimizes, "belly flopping" or slapping of the water surface by the paddles. The paddles (55) comprise a static section (165) and a folding section (170) which are connected at the hinge points (175). The static section (165) of a paddle (55) is mounted to the axle (60) of the water wheel. At the 6 o'clock position, the paddle (165,170) is fully extended and capable of capturing a maximal amount of kinetic energy from the water. As the paddle rotates counterclockwise from 6 o'clock, the paddle (55) begins to fold onto itself, and at 3 o'clock, the folding section (170) of the paddle is angled in comparison to the fully-extended 6 o'clock position. At 12 o'clock, the folded section (170) of the paddle (55) is folded completely or almost completely upon itself so that its radius is halved and surface area is minimized. This configuration decreases the amount of drag caused by movement through the air. As the paddle (55) moves further counterclockwise from the 12 o'clock position to the 9 o'clock position, the folded section (170) of the paddle (55) starts to unfold and become extended. At 8 o'clock, the paddle (55) is close to being fully extended and it begins to enter the water at about a 90° angle. The force of the water would continue to flatten the paddle (55) as it moves to the 6 o'clock position and thus captures more energy, reaching maximum drag at this position.

Figure 19:
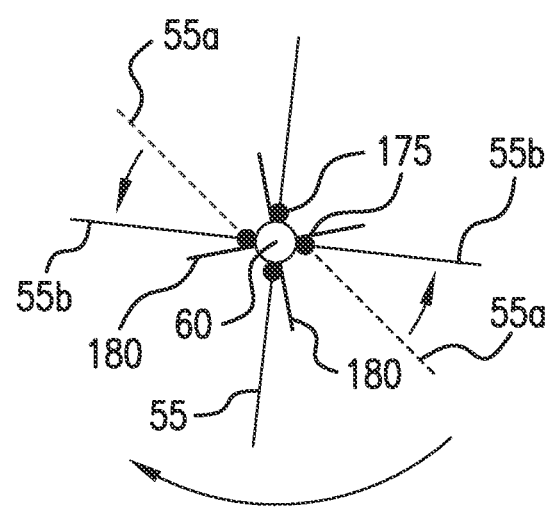
FIG. 19 shows an embodiment of a water wheel mounted to an axle via pivot points and having detents to restrict motion within a particular range.

FIG. 19 shows a cross-sectional right side view of an embodiment of a water wheel having paddles (55) mounted to an axle (60) via pivot points (175) and having detents (180) to restrict motion of the paddles to within a particular range. As the water wheel rotates about the axle (60), the paddles (55) pivot in the water within a range delimited by the dashed and solid lines. That is, as a paddle (55) rotates clockwise and enters the water, the force of the water moves the paddle counterclockwise from an initial position shown by a dashed line (55a) to a final position shown by a solid line (55b). Detents (180) are located on the axle (60) to prevent the paddles (55) from moving beyond a particular position and to provide structural stability to withstand the force of water on the paddle (55). A spring (not shown) or comparable structural element may be used to bias the paddles (55) so that they move in a particular direction when not immersed in the water.

FIGS. 20A-20E show right side views of embodiments of a water wheel paddle (55) having a static paddle section (145) and a slideable extension section (150) which slides between extended and retracted positions under the influence of gravity as the paddle (55) rotates under the force of water. For purposes of clarity, only a single paddle (55) is illustrated, and a complete water wheel would comprise a plurality of paddles. At the 12 o'clock position (FIG. 20A), the paddle (55) is fully upright and the extension section (150) of the paddle (55) has slid all the way into the static paddle section (145), for example, into a square tube section, by the action of gravity on the slideable extension section (150). In this configuration, the extension section (150) of the paddle is entirely or almost-entirely enveloped by the static section (145) of the paddle as the extension section (150) has a smaller profile (size and cross-section) than the static section (145). Consequently, drag caused by movement of the paddle (55) through the air is reduced. Thus, when the paddle (55) is in the fully-retracted configuration, an inner arm structure (155) and the slideable extension section (150) are fully enveloped by the static section (145) and the radius of the paddle (55) is about 50 percent of the fully-extended configuration.

As the water wheel rotates clockwise past the 2 o'clock position (FIG. 20B) and reaches the 4 o'clock position (FIG. 20C), the slideable extension section (150) of the paddle (55) begins to extend as gravity pulls on it. The slideable extension section (150) enters the water and at the 6 o'clock position (FIG. 20D), it is fully extended and the maximum amount of plate area is exposed to the moving water. As the water wheel continues to rotate clockwise, at about the 10 o'clock position (FIG. 20E), gravity begins to pull on the extension section (150) of the paddle (55) and the extension section (150) begins to slide down the interior of the larger static section (145) of the paddle (55). This action reduces the radius of the water wheel and the amount of the slideable extension section (150) which is exposed, thereby allowing each paddle (55) of the water wheel to have a lower profile. At the 12 o'clock position (FIG. 20A), gravity has pulled the retractable extension section (150) all the way down into the larger static paddle section (145), reducing the radius of the water wheel by approximately 50 percent. Each time the wheel rotates through 360°, the paddle extension and retraction process repeats the extension and retraction cycle in the manner discussed.

Figure 21A:
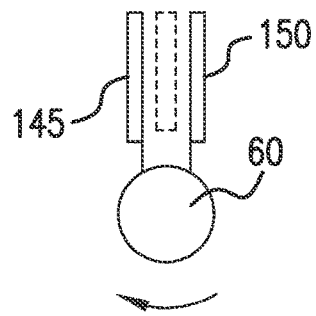
FIGS. 21A-21C show a water wheel paddle having a retractable plate.
Figure 21B:
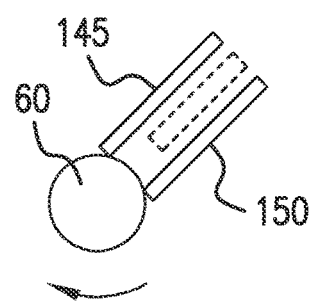
Figure 21C:
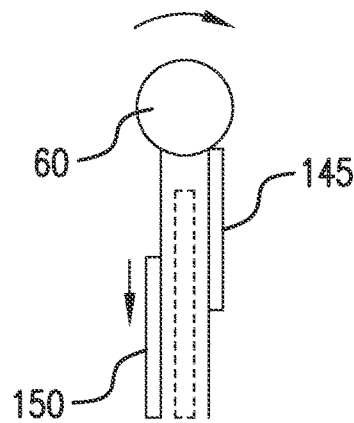

FIGS. 21A-21C show a right side view of the embodiment of FIGS. 20A-20E in greater detail, in which the slideable extension section (150) of a paddle (55) is fully retracted in the at the 12 o'clock position (FIG. 21A), beginning to extend at the 2 o'clock position (FIG. 21B), and fully extended due to the force of gravity at the 6 o'clock position (FIG. 21C). It is to be understood that FIGS. 20A-20E and FIGS. 21A-21C are not drawn to scale.

Figure 22:
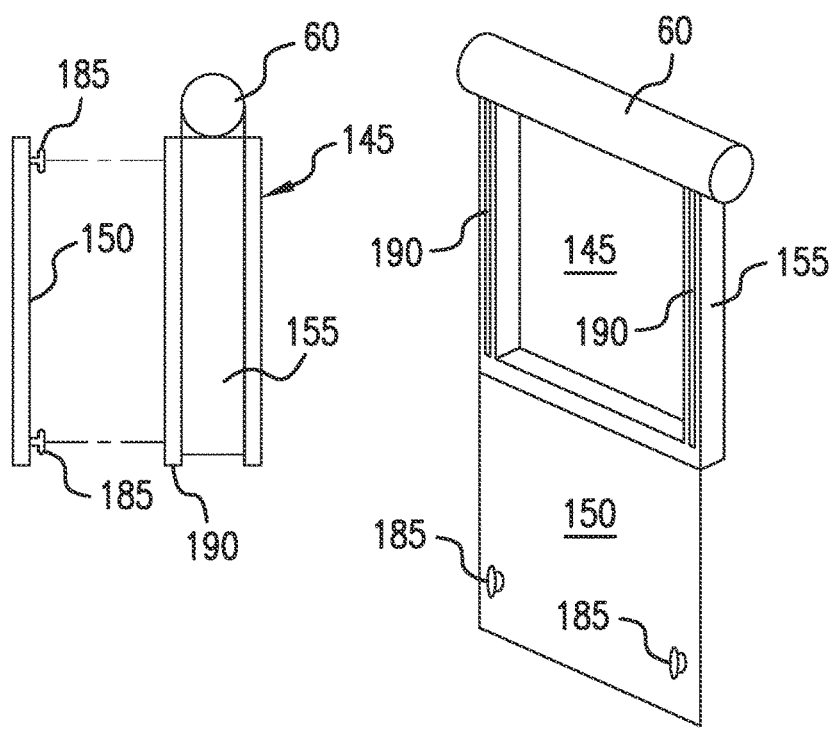
FIG. 22 shows an embodiment of a paddle having a slotted track for a water wheel.

FIG. 22 shows another embodiment of a paddle (55) for a water wheel, the paddle (55) having a static paddle section (145) and a slideable extension paddle section (150) which moves between extended and retracted configurations as a result of the influence of gravity, similarly to FIGS. 20A-20E and FIGS. 21A-21C. The paddle (55) is mounted to an axle (50) of a water wheel (not shown). The left and right sides of the extension paddle section (150) of the paddle (55) are configured to slide in slots of respective support arms (155) of the static paddle section (145). To this end, the slideable extension sections (150) have protrusions (185) which slide in the slotted track of the support arm (155). As the paddle (55) move downward, gravity may cause the slideable paddle section (150) to slide down into an extended configuration away from the static paddle section (145) so that the paddle (55) may harness the kinetic energy of flowing water, as discussed previously. As the paddle (55) moves upward, the slideable paddle section (150) may slide down to mate with the static paddle section (145) in a retracted configuration. Water wheel paddles having retractable and extendable sections have a reduced drag caused by the paddles pushing air as the paddles have a smaller surface area, advantageously reducing losses due to friction.

Figure 23:
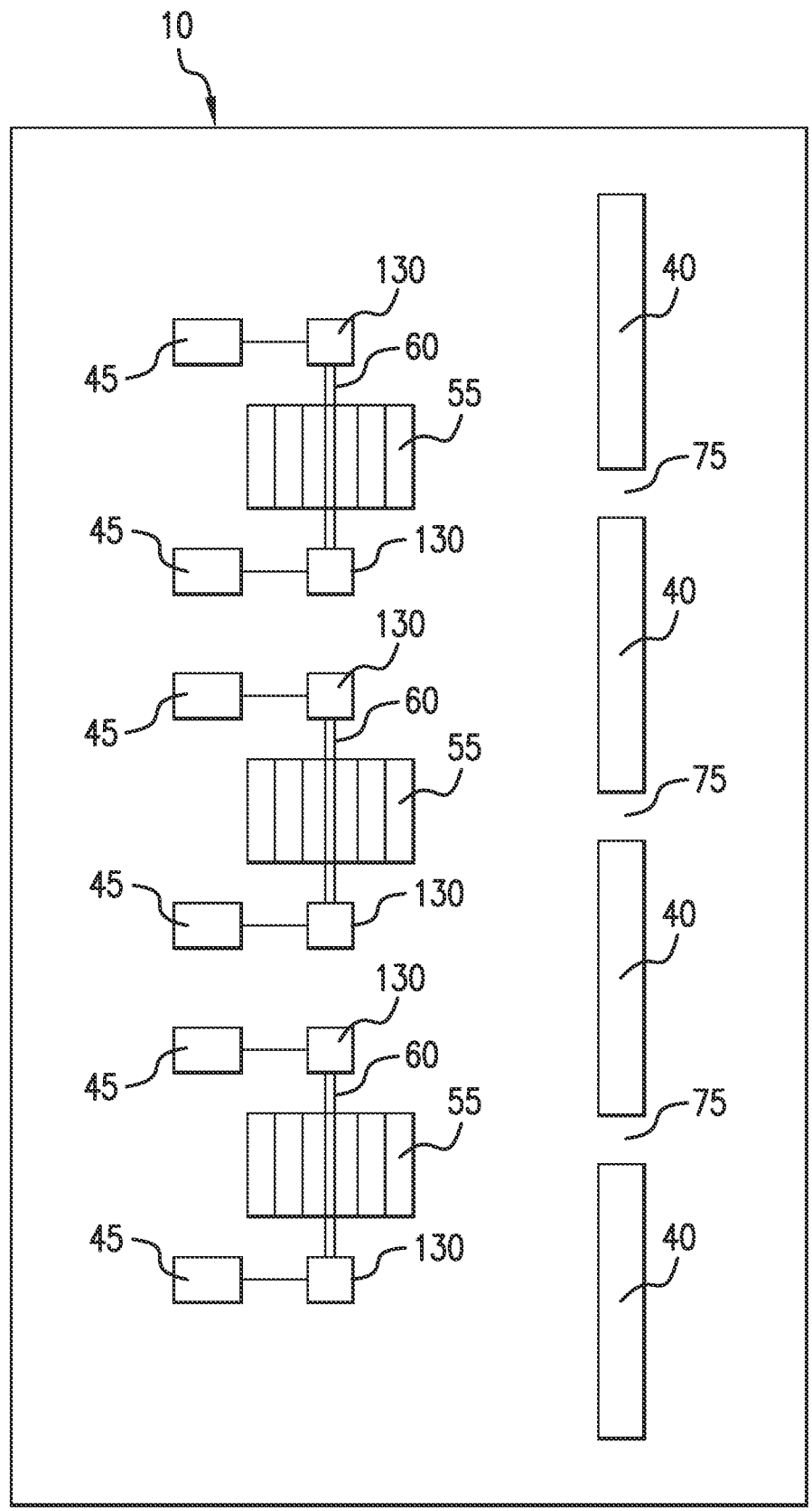
FIG. 23 shows a hydrodynamic power generation assembly comprising a baffle assembly formed of four adjacent baffle panels in a linear arrangement providing three inter-panel spacings and a hydropower converter located downstream of each inter-panel spacing.

FIG. 23 shows an embodiment of a hydrodynamic power generation assembly (10) comprising a baffle assembly formed of four adjacent baffle panels (40) in a linear arrangement thereby providing three inter-panel spacings (75) therebetween. The arrangement of the baffle panels in the assembly increases the velocity of the water flow as compared to the ambient water velocity so that a greater amount of kinetic energy may be extracted from the water. A hydropower converter in the form of a water wheel (55) is located downstream of each of the three inter-panel spacings (75). Each water wheel (55) rotates about an axle (60) which is operably connected to a directional converter in the form of a gearing mechanism (130) which converts the rotational movement of the water wheel axle (60) and transfers it to a generator (45) which generates electrical power. Consistent with the invention, there may be a plurality of generators operably connected to each directional converter/gearing mechanism (130), and selective generators may be engaged or disengaged (manually or automatically) upon various conditions such as reaching a specified level of torque or accelerated water velocity.

In an exemplary embodiment of the invention, a power generation assembly comprises a water accelerator assembly comprising (a) a support structure which is about 90 feet (27.4 m) wide and (b) a pair of baffle panels which are about 30 feet (9.1 m) wide and 15 feet (4.6 m) deep in the water. The opening between the pair of baffle panels is about 30 feet (9.1 m). A hydropower converter in the form of a water wheel which is 30 feet (9.1 m) in diameter is mounted to the support structure and has an actuation area which is in the zone of accelerated water behind the baffle assembly. The water wheel is operatively connected to a generator. The power generator assembly generates about 1 megawatt of electricity which is sufficient to power about 350 homes using U.S. industry conventions.

Figure 24:
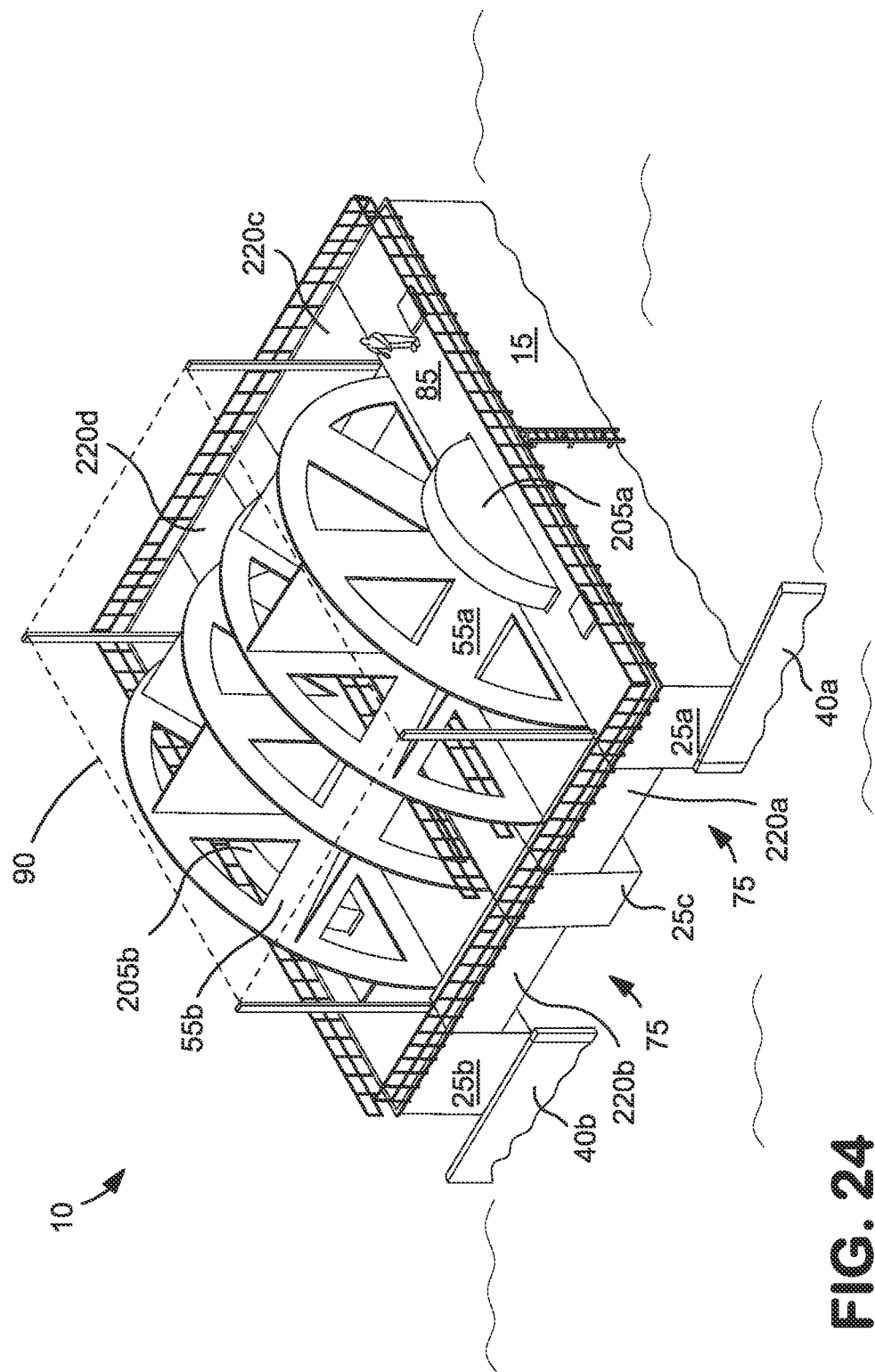
FIG. 24 shows an embodiment of a hydrodynamic power generation assembly having three pontoons and two water wheels arranged in parallel and the baffle assembly is in an open configuration.
Figure 25:
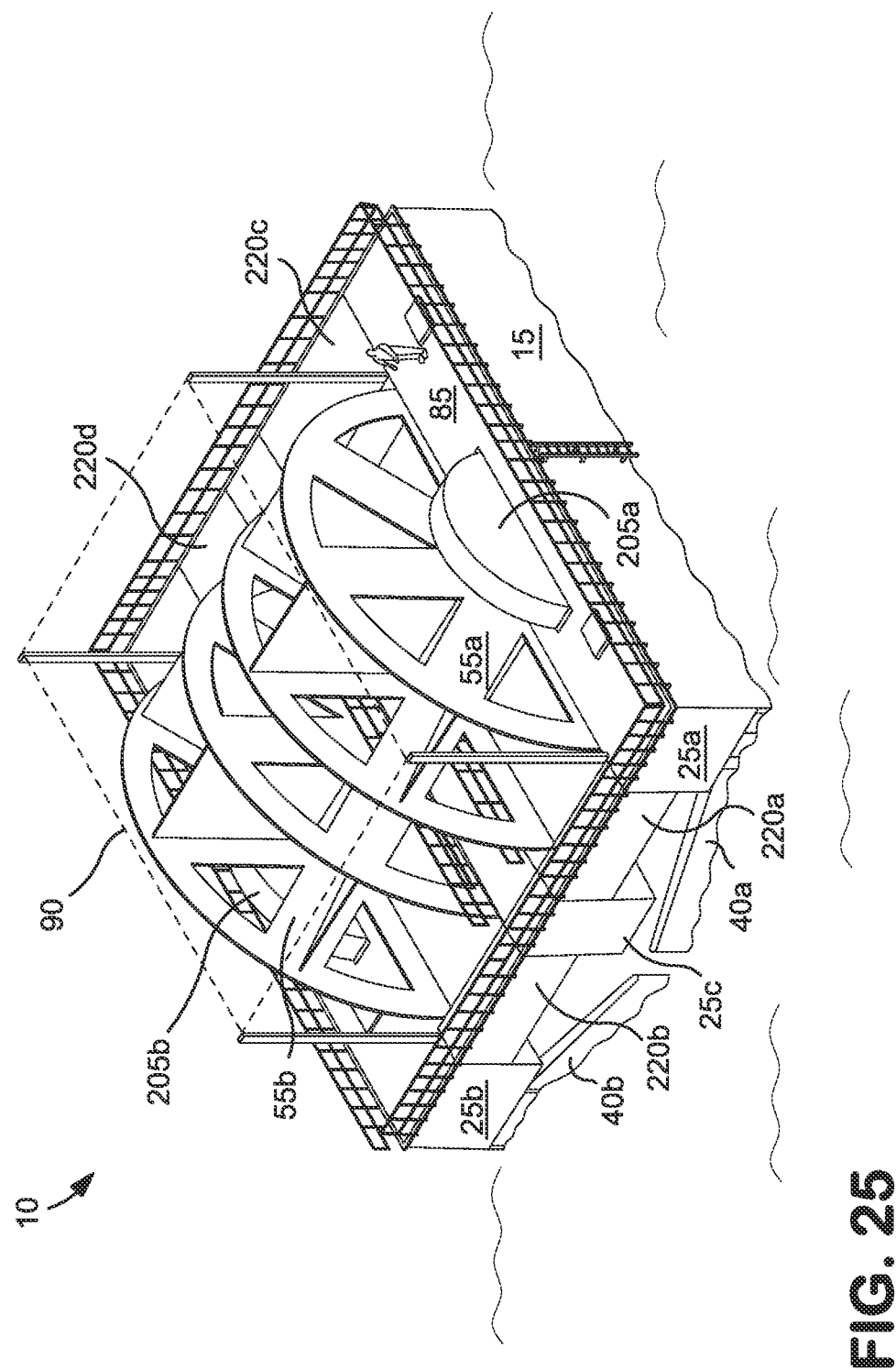
FIG. 25 shows the embodiment of FIG. 24 in which the baffle assembly is in a closed (or partly closed) configuration.

FIGS. 24 and 25 illustrate an embodiment of a hydropower generation assembly (10) having two water wheels (55a, 55b) in parallel. The structure of the hydropower generation assembly (10) in both FIGS. 24 and 25 is the same, and the figures only differ in the position of the baffle panels (40a,40b) with respect to the ambient water flow. The power generation assembly (10) in these figures comprises a water accelerator assembly having a support structure (15) and a baffle assembly having two baffle panels (40a,40b) mounted to a pair of pivotable baffle arms. The support structure (15) includes three pontoons (25a,25b,25c) which are buoyant (or variably buoyant) and maintain the power generation assembly (10) at the surface of the water. Each support structure (15) may have a deck (85) to provide a location for a worker to stand on, for maintenance purposes or while the invention is in operation. In FIGS. 24 and 25, the deck (85) extends over substantially the entire upper surface of the pontoons (25a,25b,25c). The three pontoons (25a,25b,25c) consist of two side pontoons (25a,25b) forming port [left] and starboard [right] sides of the support structure (15) and a narrower pontoon (25c) between the two side pontoons (25a,25b). The water wheels (55a,55b) are enclosed by a cuboid cover (90, shown in phantom) to protect them from environmental conditions and to minimize water spray and noise.

The water wheels (55a,55b) are mounted on an axle (not visible in the figures). Each water wheel (55a,55b) may be mounted on a separate axle, or both water wheels may be mounted on a common axle. Operatively coupled to the water wheel are gearing mechanisms (not illustrated) which may be covered by a cover (205a,205b) to protect them from deterioration due to water spray or environmental conditions. The gearing mechanism may be operationally connected to a directional converter which converts an input rotational kinetic energy from the water wheel axle to an output rotation energy for use by one or more generators. Exemplary embodiments of a gearing mechanism, directional converter, and generator which may be used in this power generation assembly are shown in FIGS. 16 and 17. Other types of power generators which can convert rotational energy to electrical energy may be used.

The illustrated power generation assembly (10) of FIGS. 24 and 25 has two inlets (75) at its leading edge where the baffle panels (40a,40b) are located, and corresponding outflows at its rear by which water flowing through the assembly (10) merges back into the ambient water flow. In an exemplary embodiment, the front and rear sides of the assembly (10) may have a length of 54 feet (16.5 m) and the left and right sides of the assembly may have a length of 60 feet (18.3 m). In this exemplary embodiment, the side pontoons (25a,25b) may each have a width of 10 feet (3 m) and the middle pontoon (25c) may have a width of 8 feet (2.5 m), and the distance between the middle pontoon (25c) and the outer pontoons (25a,25b) may be 13 feet (4 m), although the invention is not restricted to these particular dimensions. The support structure (15) may be attached to the top or sides of the pontoons (25a,25b,25c), as deemed desirable for securing the pontoons together.

The support structure (15) may comprise a truss (shown schematically by 220a,220b,220c, 220d) attached directly between adjacent pontoons (25a,25b,25c), via a securement flange on the truss end and, optionally, a reinforcing plate on the pontoon wall, using bolts, rivets, welds, and/or other connectors. For example, one truss may connect the leading end of a side pontoon (25a,25b) with the leading end of the middle pontoon (25c), and a separate truss may connect the trailing end of the same side pontoon (25a,25b) with the trailing end of the middle pontoon (25c); a pair of corresponding trusses may be used to connect the other side pontoon to the middle pontoon. The trusses may include a protective outer covering and may have an interior void or open space which accommodates structural beams or mechanical or electrical equipment. At least the forward trusses (220a, 220b) may have slanted bottom surfaces to act as spoilers in potentially rough seas.

The use of moveable baffle arms to control the opening between adjacent baffle panels will now be discussed. In FIGS. 24 and 25, the baffle panels (40a,40b) are mounted to the side pontoons (25a,25b) on moveable arms which are motorized (not shown) to open and close as desired. When the moveable arms are extended as shown in FIG. 24 to provide an open configuration, the baffle panels (40a,40b) are orthogonal to the ambient water flow and accelerate water flowing through the baffle panel openings—i.e., through inlets (75) which are unobstructed—in the manner previously discussed. When the baffle arms are moved to a closed position as shown in FIG. 25, the baffle panels (40a,40b) obstruct baffle openings—i.e. inlets (75)—of the baffle assembly formed by the arms and baffle panels (40a, 40b) and the flow of accelerated water is stopped. Such a configuration is useful to reduce the speed of the water impinging on the water wheel (55) or other hydropower converter, for example, to avoid over-straining the equipment during high velocity ambient water flow or stop its movement altogether to enable maintenance or repair of the power generation assembly). The motor to move the baffle panels (40a,40b) between open and closed configurations may be a steerable motor, a rudder steering system, or other mechanical or hydraulic mechanism with sufficient strength to manipulate the position of the baffle panels (40a,40b) against the ambient water flow and to maintain them in the desired position. It may also be possible to move the moveable baffle arms to a 90° position, where the arms are facing into the ambient water flow and hence the baffle panels (40a,40b) are parallel to the direction of water flow. In such a configuration, the water is not being accelerated and passes at ambient velocity through the hydropower converter. This 90° configuration is useful, for example, when the ambient water flow is very high and further acceleration of the water is not desired.

The motor may be mounted to the pontoons (25a,25b) as shown in FIGS. 24 and 25 or to another support structure as may be deemed desirable. The motor may move the baffle panels (40a,40b) between a fully open configuration (0°) and a fully closed configuration (180° apart) as shown in FIGS. 24 and 25, although in other embodiments, the baffle panels (40a,40b) may move beyond 180°, such as up to 270° and thus be positioned within the inlets (75), or up to 360° in further embodiments. In FIGS. 24 and 25, each moveable arm has a single baffle panel (40a,40b) and has a length which is sufficient to close a respective water channel (75) of the power generation assembly (10). In other embodiments, a baffle assembly comprising a pair of moveable baffle arms may be mounted adjacent each water channel opening (75). In other embodiments (not illustrated), the movable arms may be connected via a hinge or other mechanism to a support element located in the middle of the water channel opening (75). In this case, the arms may extend from the middle of the water channel to respective pontoons between open and closed configurations as discussed with respect to other embodiments. Other arrangements of baffle assemblies and moveable baffle panels are within the scope of the present invention.

Figure 26:
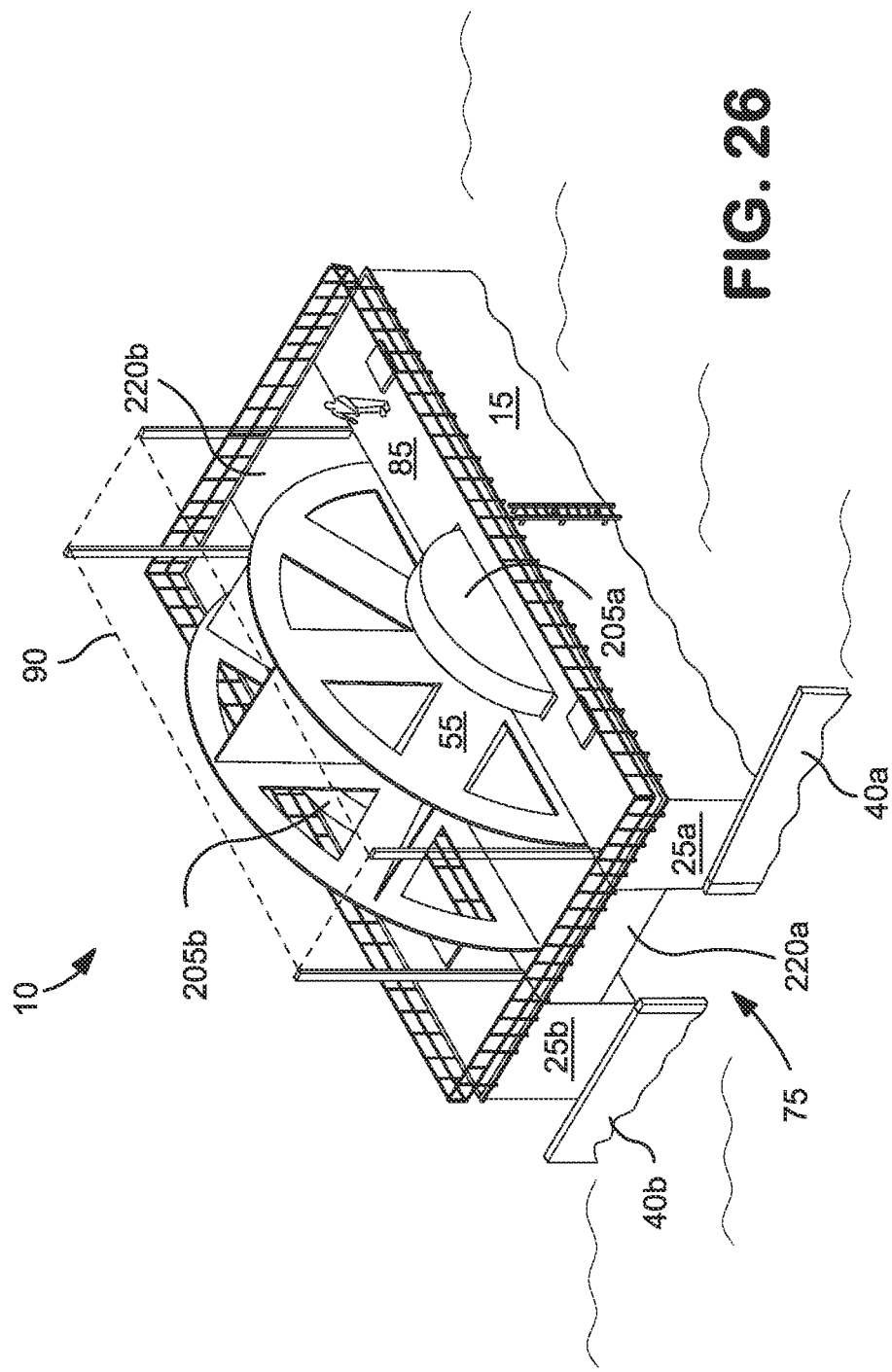
FIG. 26 shows an embodiment of a hydrodynamic power generation assembly having a pair of pontoons and a single water wheel, and the baffle assembly is in an open configuration.
Figure 27:
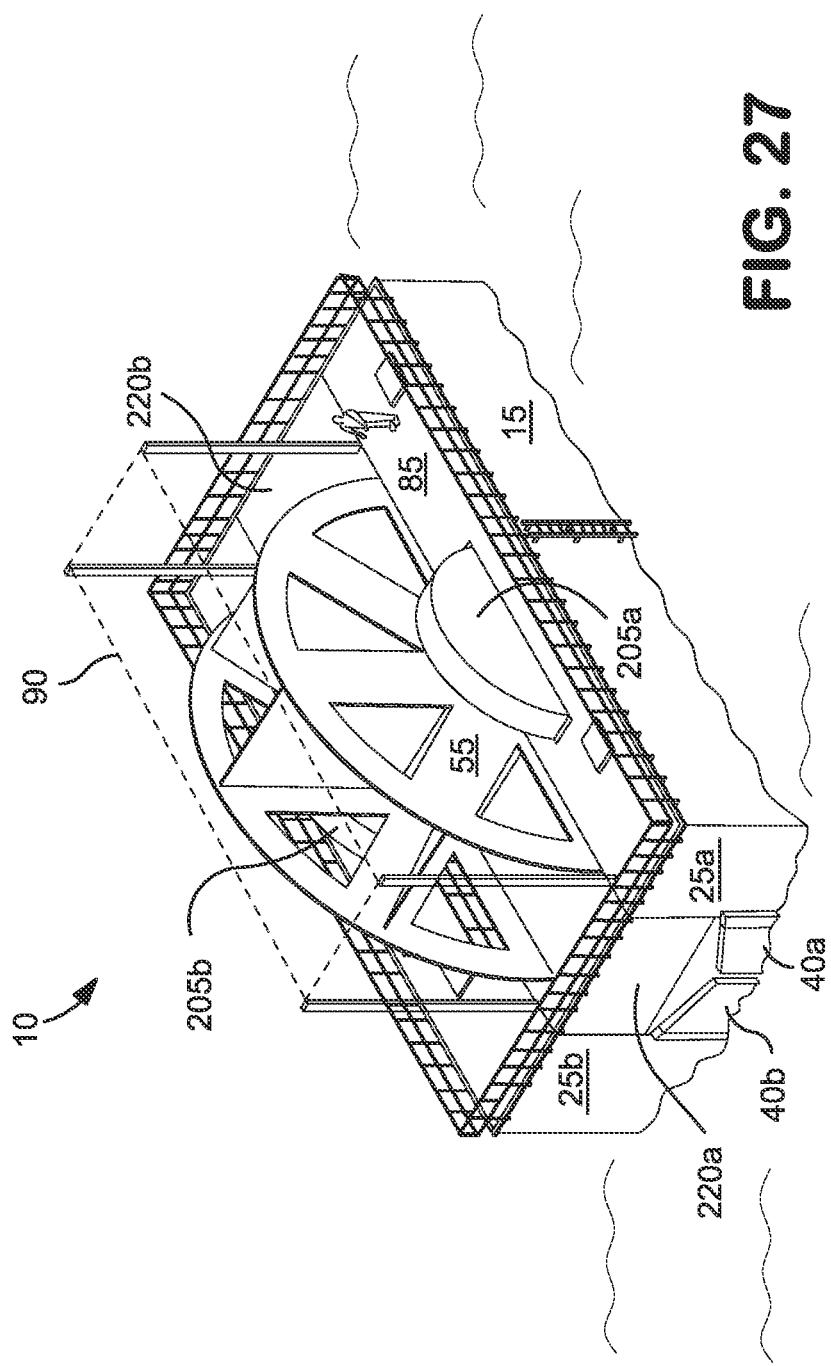
FIG. 27 shows the embodiment of FIG. 26 in which the baffle assembly is in a closed (or partly closed) configuration.

FIGS. 26 and 27 illustrate an exemplary embodiment of the invention in which a single water wheel (55) is positioned between two pontoons to generate electrical power. FIG. 26 show a pair of moveable baffle arms (not to scale), each bearing a baffle panel member (40a,40b) in the open configuration in order to accelerate water flowing to the hydropower converter (a water wheel (55) in this embodiment), while FIG. 27 shows the same embodiment but with the pair of moveable arms and baffle panels (40a,40b) in a closed configuration. The features of this embodiment are generally otherwise comparable to those of FIGS. 24 and 25.

Figure 28A:
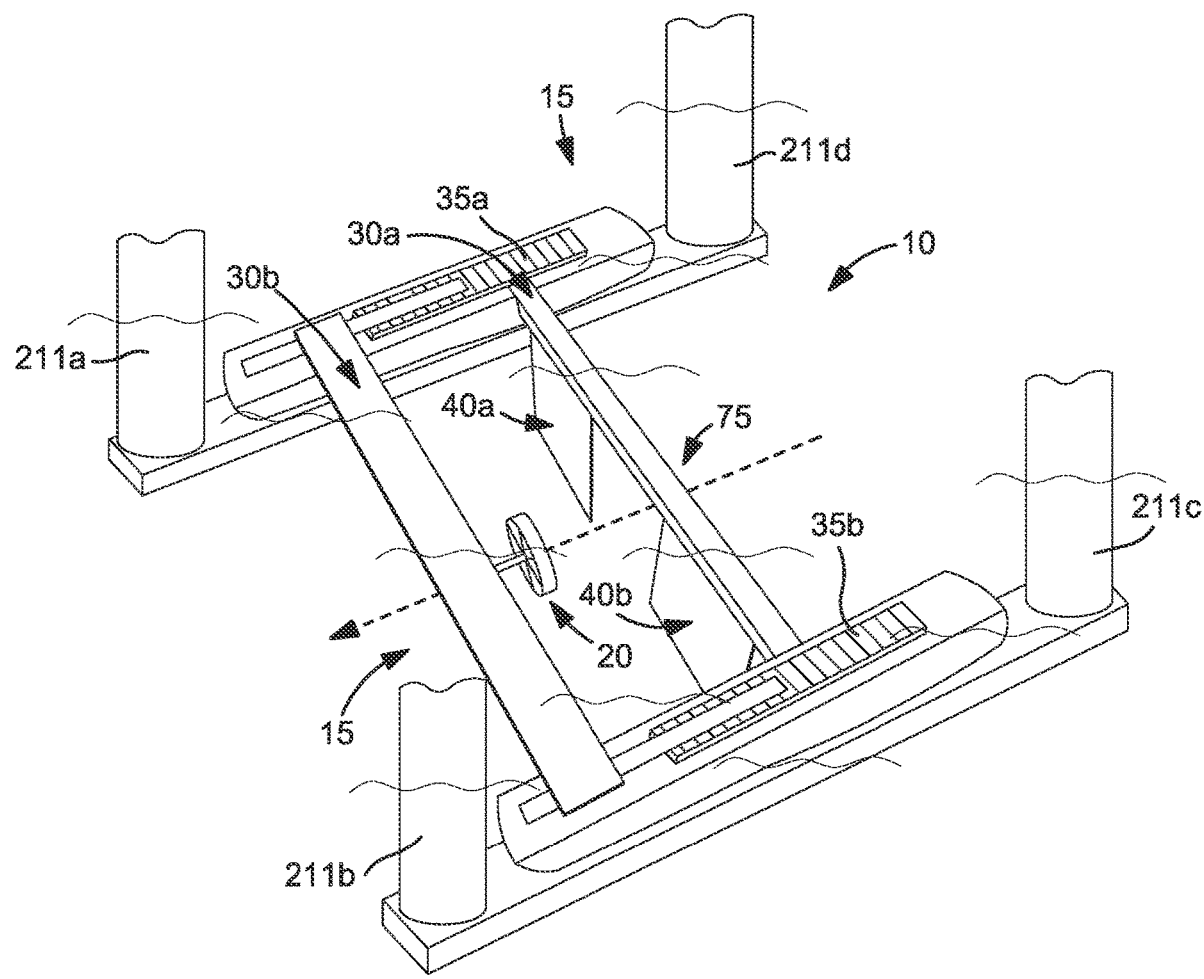
FIG. 28A shows an illustrative example of an embodiment of a hydrodynamic power generation assembly suspended below the surface of a body of water.

FIG. 28 shows an embodiment of a power generation assembly (10) for deployment under the surface of a body of water. The embodiment comprises a support structure (15) and a hydropower converter in the form of a turbine (20) in this embodiment. Four support beams (210a,210b, 210c, 210d) are used to fixedly connect the power generation assembly (10) to the bed of a body of water in which the invention is deployed. The lower ends of the support beams may be fixed to the water bed using, an anchor, for example, concrete, cabling, pilings, or other types of connections known to those of skill. A pair of baffle panels (40a,40b) are mounted to a strut (30a) to form a baffle assembly, and a second strut (30b) maintains the structural integrity of the support structure (15). A distance adjustment mechanism (35a,35b) on the support structure (15) is present to optimize the distance between the opening (75) between adjacent baffle panels (40a,40b) and the turbine (20), similar to FIGS. 1-4. Another distance adjustment mechanism (not illustrated) may also be used to adjust the separation between adjacent baffle panels. Although the baffle panels (40a,40b) and turbine (20) are illustrated as extending downwards from the support structure (15), in alternative embodiments, the baffle panels (40a,40b) and turbine (20) may be extending upwards or laterally from the support structure (15) in order to optimize the ability to capture energy from the surrounding water flow. A generator (not illustrated) may be located below the water surface and operably connected to the turbine (20) for generation of electricity, or torque from the turbine (20) may be transferred to a land-based or surface-based (e.g. floating) generator for generation of electricity. FIG. 28A shows a similar embodiment as FIG. 28 except that the support beams (210a, 210b, 210c, 210d) extend downwardly from a support structure at or submerged below the surface of the water, rather than upwardly from the water bed. Other configurations are also possible and within the scope of the present invention.

The power generation assembly (10) generates electrical power as the turbine (20) spins in the flow of accelerated water generated by the baffle assembly (75,40a,40b). The electrical power may be transferred via an electrical cable (not illustrated) to land or a power storage unit such as a battery for subsequent use. The depth of the power generation assembly (10) under the water surface and the height of the assembly (10) above the water bed in this embodiment is not critical. Nevertheless, it may be clear that the ambient water flow should be at least 0.5-1 knots (0.25-0.5 m/sec) as discussed earlier in order for the water to have sufficient velocity to be accelerated. It may also be clear that the power generation assembly should be positioned in a location on or near the water bed which is sufficiently deep or is marked in some manner to avoid being damaged by passing vessels.

FIG. 29 shows a portion of a hydrodynamic power generation assembly (10) having a slide mechanism (215a, 215b) instead of moveable baffle arms for moving the baffle assembly (40a,40b) between an opened configuration and a closed configuration, as shown using arrows to mark the direction of movement, much like sliding "barn doors". In such an embodiment, each baffle panel member (40a,40b) is mounted to the support structure (15) via a respective slide mechanism (215a,215b) which may be, for example, a motorized wheel assembly. In FIG. 29, the baffle panels (40a,40b) are illustrated in a partially opened configuration in that they provide an inter-panel spacing (75) which causes water passing therethrough to accelerate in velocity in accordance with the principles of the present invention. In a fully opened configuration, the baffle panels (40a,40b) slide away from each other so that the inlet to the hydropower converter is completely open and unobstructed to the ambient water flow. In a fully closed configuration, the baffle panels (40a,40b) slide towards each other such that they are adjacent and fully obstruct the inlet to the hydropower converter. In such a configuration, there is no longer an inter-panel spacing (75) between the baffle panels (40a,40b). As previously discussed, a fully open configuration such as when the baffle panels (40a,40b) are directly in front of the pontoons, may be adopted when, for example, the ambient current flow is very high and further acceleration is not desired, and a fully closed configuration may be adopted to minimize or stop water flow to the hydropower converter, for example, during maintenance. A brake may be installed with any of the embodiments to slow down or completely arrest movement of the hydropower converter.

Although this embodiment has been illustrated with respect to a baffle assembly comprising a pair of baffle panels, any number of baffle panels may be used. In addition, a single slidable baffle panel member may be used in combination with a fixed support structure such as a pontoon to generate head for the desired water acceleration effect. Slideable baffle panels may also be used with subsurface embodiments of the invention and their principles of operation are the same as those of surface-deployed embodiments of the invention.

Figure 30:
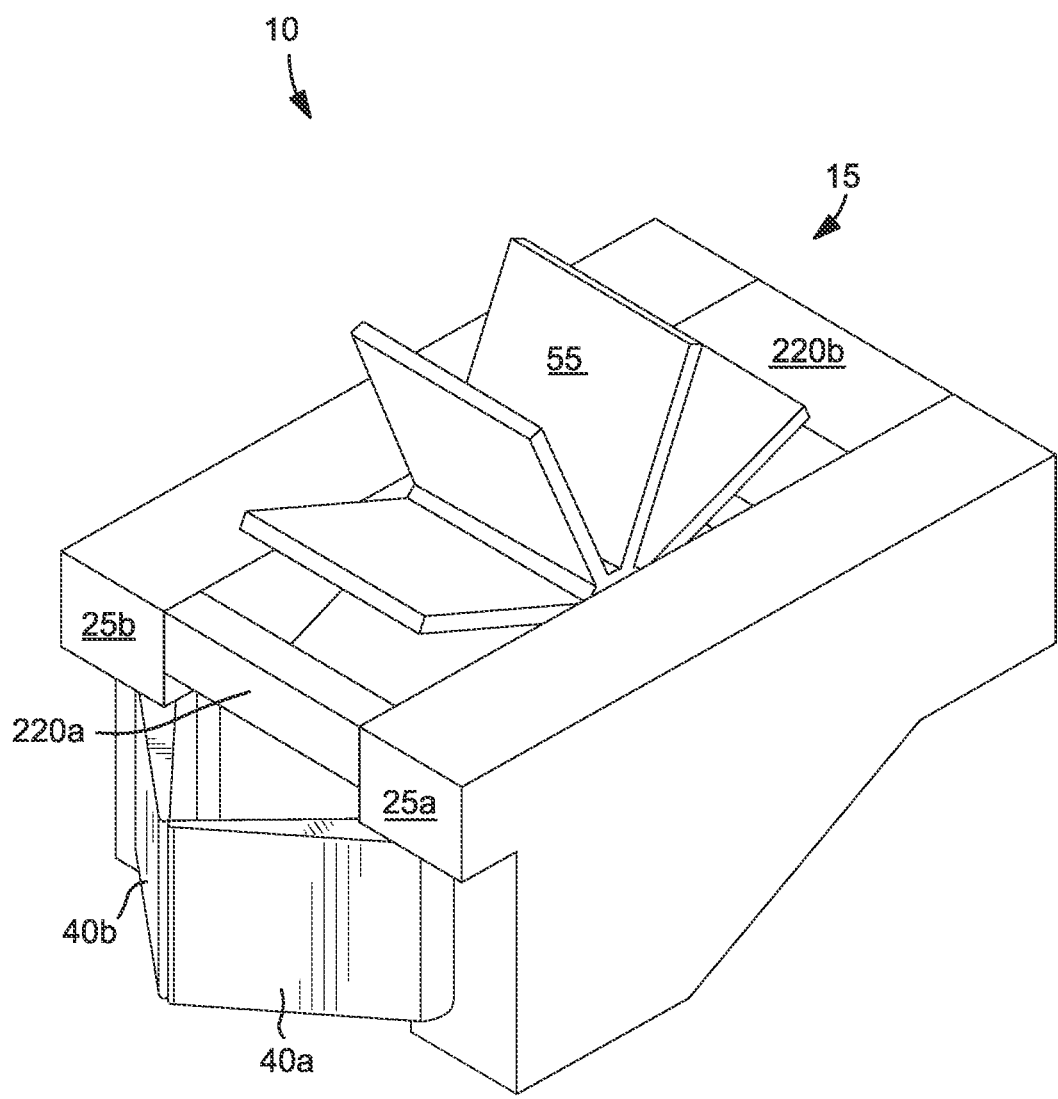
FIG. 30 shows a second embodiment of a hydrodynamic power generation assembly having a single water wheel.

FIG. 30 shows a second embodiment of a hydrodynamic power generation assembly (10) having a single water wheel as previously shown in FIGS. 26 and 27. In FIG. 30, the power generation assembly comprises a support structure (15) formed by a pair of pontoons (25a,25b) joined by forward and rear trusses (220a,220b) which are illustrated schematically as struts. The ends of the trusses (220a,220b) are mounted to the inner-facing surfaces of the pontoons (25a,25b). A hydropower converter in the form of a water wheel (55) is supported by the support structure (15), and a generator is operatively coupled to the water wheel for generating electricity. In FIG. 30, the axle (not shown) of the water wheel (55) is located below the top surface, or deck of the pontoons (25a,25b) in order to maintain a low center of gravity. The gearing mechanism(s), generator(s), and/or other equipment may also be located below the top surface or deck. A baffle assembly is mounted to the front of the pontoons (25a,25b) before the inlet of the water wheel (55). The baffle assembly consists of a pair of moveable baffle arms (40a,40b) which may move from an open configuration (as illustrated in FIG. 26) to a closed configuration as shown in FIG. 30. In the open configuration, the baffle arms (40a,40b) are orthogonal to the direction of flow and cause acceleration of the ambient water flow moving through the inter-panel opening (75) between the baffle arms (40a,40b). In the closed configuration illustrated in FIG. 30, the baffle arms (40a,40b) obstruct the inlet of the water wheel (55), for example, to reduce the amount of water flowing through the flow channel of the power generation assembly (10) for maintenance or during periods of high velocity ambient water flows. In a second open configuration (not illustrated), the baffle arms (40a,40b) point in the direction of the ambient water flow and thus permit the unaccelerated water current to pass directly into the inlet of the water wheel (55).

The moveable baffle arms (40a,40b) in the closed position do not necessarily have to be orthogonal to the direction of water flow. As shown in FIG. 30, the baffle arms (40a,40b) may form a V-shape in the closed position to direct the ambient water to flow around the power conversion assembly (10). The baffle arms (40a,40b) are hingedly mounted to the leading edges of the pontoons (25a,25b) and may be moved between open and closed configurations (0° and 180° apart) in the manner as previously discussed with respect to FIGS. 26 and 27. A motor (not illustrated) or other hydraulic or mechanical device may be used to move the baffle arms (40a,40b) between open and closed configurations. The baffle arms (40a,40b) may be a single structural element or may comprise a plurality of joined elements.

Figure 31:
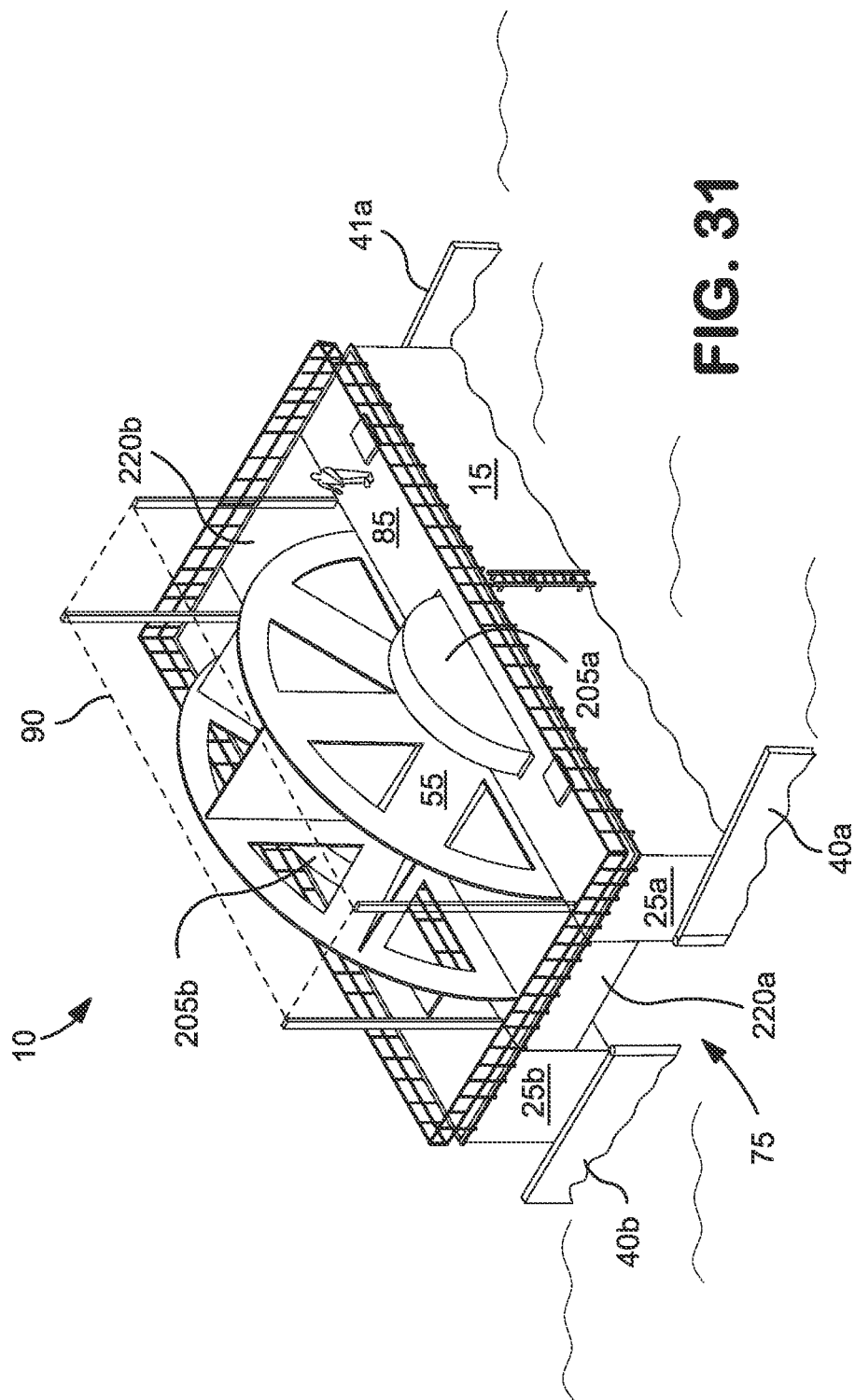
FIG. 31 shows an embodiment of a hydrodynamic power generation assembly having baffle assemblies and water flow inlets on opposite ends.

FIG. 31 shows an embodiment of a hydrodynamic power generation assembly (10) having baffle assemblies and water flow inlets on opposite ends of the assembly and a reversible hydropower converter (10). Such an embodiment can be used in locations where water flows in two directions, for example, due to tidal flows or current flows. Consequently, this embodiment does not strictly have "front" and "rear" sides since the water flows into the power generation assembly (10) in either direction for acceleration and generation of power. The hydropower converter (a water wheel (55) in this embodiment) is reversible and changes its direction of rotation as the ambient water flow changes direction. When the ambient water flow is in one direction (for example, in the direction shown by arrow (75)), the water flows past the opening (75) between baffle panels (40a,40b) and be accelerated compared to the ambient current flow. When the ambient current is in the opposite direction, the water flows past the pair of baffle panels (41a; 41b not visible in this figure) on the opposite side for acceleration. Consequently, a water inlet when the water flows in one direction, becomes a water outlet when the water flows in the opposite direction. The position of the hydropower converter (10) may be adjusted to optimize the distance between the baffle assembly (40a,40b/41a,41b) and the intake of the hydropower converter (10).

Figure 32A:
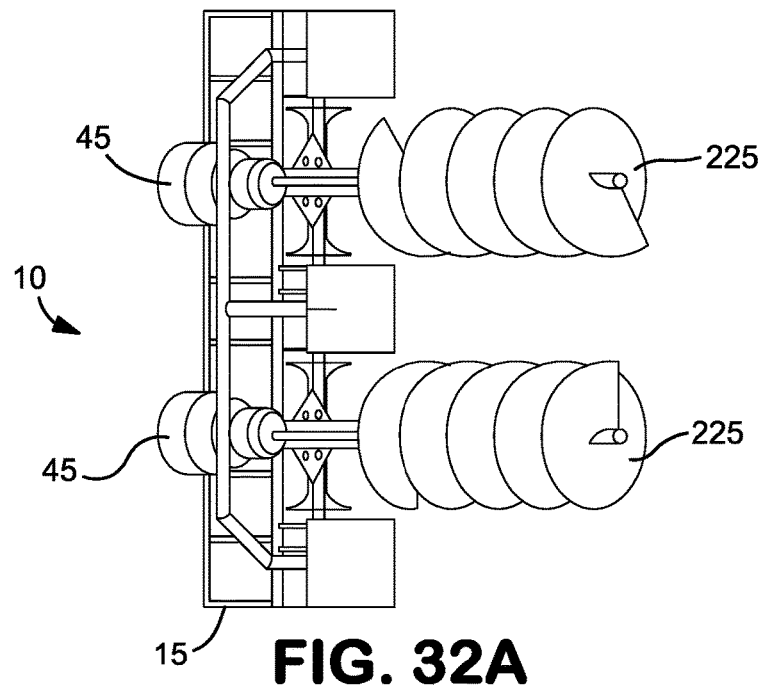
FIGS. 32A and 32B show a rear view and a top view, respectively, of an illustrative example of an embodiment of a hydrodynamic power generation assembly incorporating an Archimedes screw.
Figure 32B:
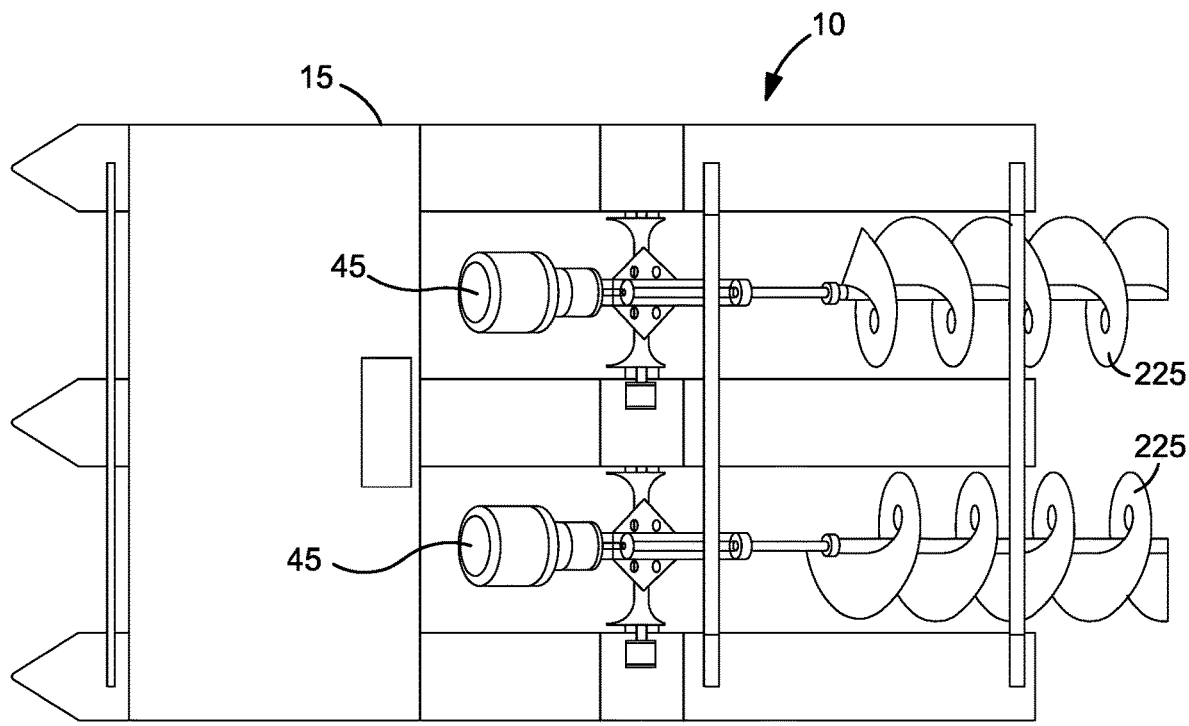

FIGS. 32A and 32B show a rear view and a top view, respectively, of an illustrative example of an embodiment of a hydrodynamic power generation assembly (10) incorporating an Archimedes screw (225) supported by a support structure (15) for driving a generator (45) for generating electrical power.

Variations and modifications will occur to those of skill in the art after reviewing this disclosure. Examples of changes, substitutions, and alterations are ascertainable by one skilled in the art and could be made without departing from the scope of the invention disclosed herein. All references cited herein are incorporated by reference in their entirety and made part of this application.

The various embodiments described above can be combined to provide further embodiments. Aspects of the embodiments can be modified to provide yet further embodiments. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented. Any of the claims as provided herein may also be combined to furnish additional embodiments even if dependencies for such combinations are not expressly indicated.

Other objects, advantages and embodiments of the various aspects of the present invention will be apparent to those who are skilled in the field of the invention and are within the scope of the description and the accompanying figures. For example, but without limitation, structural or functional elements might be rearranged, or method steps reordered, consistent with the present invention. Similarly, an element may comprise a single instance of an element or comprise a plurality of elements, such plurality functioning as a single unitary component. The structure of the invention described in various embodiments is not meant to limit the invention to those embodiments or aspects of the present invention, and other components that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A hydrodynamic power generation assembly for generating electricity in an ambient water flow, comprising:
    a support structure;
    a baffle assembly mounted to the support structure and positionable in the water flow for increasing velocity of the ambient water flow, the baffle assembly comprising at least one baffle panel member for providing at least one opening to enable water to pass said baffle assembly at an increased velocity relative to that of the ambient water flow when the support structure is deployed therein, wherein the baffle assembly is a single structural element;
    a hydropower converter located at a predetermined distance rearward, or downstream, of the baffle assembly and positioned to be actuated by water passing said baffle assembly at said increased velocity; and
    a generator operatively coupled to the hydropower converter for generating electricity as a result of flowing water actuating said hydropower converter.

2. The power generation assembly according to claim 1, wherein the baffle assembly comprises two or more baffle panel members having an inter-panel spacing between adjacent panel members to form a said at least one opening through which the flow of water passes at increased velocity relative to ambient water flow.

3. The power generation assembly according to claim 1 wherein the at least one opening is located in the at least one baffle panel member and the flowing water passing said baffle assembly is increased in velocity relative to ambient water for actuating said hydropower converter with increased force relative to the ambient water flow.

4. The power generation assembly according to claim 1, further comprising a distance adjustment mechanism for adjusting the distance between the hydropower converter and said baffle assembly and thereby vary the velocity of flowing water actuating said hydropower converter.

5. The power generation assembly according to claim 4, wherein the distance adjustment mechanism comprises a track or slide.

6. The power generation assembly according to claim 4, wherein the distance adjustment mechanism adjusts the vertical position of the hydropower converter relative to the water surface, the lateral distance of the hydropower converter relative to the support structure, or both.

7. The power generation assembly according to claim 1 wherein the support structure comprises one or more pontoons.

8. The power generation assembly according to claim 7, wherein the one or more pontoons has an adjustable buoyancy to vary the depth to which the hydropower converter is positioned in the water flow.

9. The power generation assembly according to claim 7, wherein an inward-facing side of the one or more pontoons defines a water channel for water flowing past said baffle assembly.

10. The power generation assembly according to claim 1 wherein the support structure is buoyant to float in the ambient water flow.

11. The power generation assembly according to claim 1, wherein the support structure has an adjustable buoyancy to adjust the depth to which the hydropower converter is submerged in the path of accelerated water.

12. The power generation assembly according to claim 1 wherein the support structure comprises one or more winches for controllably adjusting the pitch and/or roll of the support structure.

13. The power generation assembly according to claim 1 wherein a fore section of the support structure has a buoyancy greater than an aft section of the support structure.

14. The power generation assembly according to claim 1 wherein the position of the hydropower converter in relation to the support structure is adjustable to vary the depth of the hydropower converter in the water flow.

15. The power generation assembly according to claim 1 wherein the baffle assembly and the hydropower converter are mounted to struts comprising the support structure.

16. The power generation assembly according to claim 1, wherein the support structure is at or near the surface of a body of water during use of the power generation assembly.

17. The power generation assembly according to claim 1 wherein the support structure is below the surface of a body of water during use.

18. The power generation assembly according to claim 1, wherein the hydropower converter is a turbine, water wheel, or Archimedes screw.

19. The power generation assembly according to claim 1 further comprising:
    (a) a plurality of baffle panels, at least one baffle panel member having at least one opening therein, or the plurality of baffle panels having an inter-panel spacing between adjacent panels to form said at least one opening therebetween, for enabling the flowing water to pass said baffle assembly at an increased velocity relative to the ambient water flow; and (b) a plurality of hydropower converters, each hydropower converter positioned rearwardly, or downstream of, the baffle assembly at a distance to thereby be actuated by the increased velocity water impinging upon the hydropower converter relative to ambient water flow.

20. The power generation assembly according to claim 1, further comprising a plurality of hydropower converters positioned rearwardly, or downstream of, the opening of the baffle assembly.

21. The power generation assembly according to claim 1 wherein the baffle assembly and hydropower converter are suspended downward from the support structure such that the support structure can be deployed to float at or near at the water surface with the baffle assembly positioned in the ambient water flow and the hydropower converter positioned in the increased velocity water flow.

22. The power generation assembly according to claim 1, wherein the baffle assembly and hydropower converter extend upward from the support structure such that the support structure can be deployed in a submerged manner with the baffle assembly positioned in the ambient water flow and the hydropower converter is positioned in the increased velocity water flow.

23. The power generation assembly according to claim 1, wherein the opening of the baffle assembly is about one-third of the width of the baffle assembly.

24. The power generation assembly according to claim 1, wherein the hydropower converter has an intake which is located downstream of the opening of the baffle assembly.

25. The power generation assembly according to claim 1 wherein the opening of the baffle assembly is about 30-50% of the width of the entire face of the baffle assembly.

26. The power generation assembly according to claim 1 wherein the baffle assembly comprises a plurality of baffle panels having an inter-panel spacing between adjacent panels, and the total width of the inter-panel spacings is about 30-50% of the width of the entire face of the baffle assembly.

27. The power generation assembly according to claim 1 wherein the bottom edge of the baffle assembly extends 0-3 ft (0-1 m) below the lowest part of the hydropower converter.

28. The power generation assembly according to claim 1 further comprising a control mechanism to adjust the angle of the at least one baffle panel member about the horizontal axis, vertical axis, or both, to vary the amount of velocity increase imparted to the ambient water flow as it flows past the baffle assembly.

29. The power generation assembly according to claim 28, wherein the control mechanism adjusts the angle of the at least one baffle panel member between 0 degrees and 180 degrees about the horizontal axis, vertical axis, or both, to vary the amount of velocity increase imparted to ambient water flow as it flows past the baffle assembly.

30. The power generation assembly according to claim 28, wherein the control mechanism independently adjusts the angle of each of a plurality of baffle panels about the horizontal axis, vertical axis, or both.

31. The power generation assembly according to claim 1 further comprising a tether to a fixed position for maintaining the support structure in desired position within the ambient water flow.

32. The power generation assembly according to claim 1 further comprising one or more flow directors for channeling the water flow to the baffle assembly.

33. The power generation assembly according to claim 1 wherein the hydropower converter is a water wheel comprising a plurality of paddles mounted to a rotatable shaft.

34. The power generation assembly according to claim 33, wherein the water wheel comprises two or more adjacent sets of paddles, each set mounted to said shaft.

35. The power generation assembly according to claim 34, wherein the paddles of the respective sets of paddles are circumferentially offset from each other.

36. The power generation assembly according to claim 33, wherein the water wheel paddles are adjustably mounted to the shaft to vary the length to which each extends radially outwardly from the shaft during a rotation cycle of the water wheel.

37. The power generation assembly according to claim 33, wherein the paddles have a non-flat surface for cupping water during rotation of the water wheel.

38. The power generation assembly according to claim 33, further comprising a cover configured to enclose the water wheel.

39. The power generation assembly according to claim 33, further comprising a directional converter which converts rotational energy received from the water wheel and transfers the rotational energy to the at least one generator for actuating the at least one generator.

40. The power generation assembly according to claim 39, wherein the directional converter is operatively coupled to the generator by a gearing mechanism.

41. The power generation assembly according to claim 40, wherein the gearing mechanism converts output rotational energy from the water wheel to a faster input rotation to the generator for increasing electricity produced by the generator.

42. The power generation assembly according to claim 40, wherein the gearing mechanism comprises a drum assembly for increasing rotational energy produced by the water wheel.

43. The power generation assembly according to claim 40, wherein the gearing mechanism engages or disengages one or more of a plurality of generators upon reaching a specified level of torque.

44. The power generation assembly according to claim 40, wherein the gearing mechanism comprises a gear box or a chain and sprocket arrangement.

45. The power generation assembly according to claim 40, wherein the gearing mechanism engages or disengages one or more of a plurality of generators upon reaching a specified level of torque.

46. The power generation assembly according to claim 39, further comprising at least a pair of directional converters located at respective ends of the water wheel shaft.

47. The power generation assembly according to claim 33, wherein the water wheel paddles are independently retractable and extendable.

48. The power generation assembly according to claim 47, wherein the paddles have a fixed section attached to the water wheel shaft and a retractable section capable of moving radially inwardly and outwardly, such that the retractable section retracts into the fixed section when exiting the water and extends radially inwardly towards said fixed section when the paddle is entering the water.

49. The power generation assembly according to claim 48, wherein the retractable section slides along a slotted track between retracted and extended configurations.

50. The power generation assembly according to claim 33, wherein each paddle comprises a hinge for allowing the paddle to fold and reduce the projected area of the paddle during its cycle out of the water.

51. The power generation assembly according to claim 33, wherein the paddles are at least partly retractable when out of the water to reduce air resistance, sound levels, or both.

52. The power generation assembly according to claim 33, wherein the paddles are pivotally attached to the shaft and fold down as they exit the water to reduce air resistance, sound levels or both, and each paddle is provided with a detent to secure the paddles in a predetermined radially-extended configuration when re-entering the water for engagement by the water flow.

53. The power generation assembly according to claim 1 further comprising a plurality of generators operably connected to the hydropower converter via a generator engagement mechanism which selectively engages and disengages one or more generators from operative coupling with the hydropower converter for varying the amount of electricity produced by the plurality of generators.

54. The power generation assembly according to claim 53, wherein the generator engagement mechanism comprises a mechanical switch, an electrical switch, or both.

55. The power generation assembly according to claim 53, wherein each generator of the plurality of generators has a power generation capacity which is independent of the other generators.

56. The power generation assembly according to claim 1 wherein the baffle assembly or the at least one baffle panel member is generally orthogonal to the direction of water flow.

57. The power generation assembly according to claim 1 wherein the baffle assembly or the at least one baffle panel member is orientable at an angle of between about 0° and about 180° to the direction of water flow.

58. The power generation assembly according to claim 1 wherein operational settings of the water accelerator assembly can be controllably varied, wherein the operational settings are one or more selected from the group consisting of: the distance between the baffle assembly and the hydropower converter to vary the force exerted upon the hydropower converter, and the buoyancy of the support structure to vary the depth to which the increased velocity flow impinges upon the hydropower converter.

59. The power generation assembly according to claim 1 wherein the support structure comprises a pair of pontoons conjoined together by support members to provide an inter-pontoon passage within which the hydropower converter is positioned for actuation by the increased velocity water flow.

60. The power generation assembly according to claim 1 further comprising a second baffle assembly mounted to the support structure at a location opposite to the first baffle assembly, and wherein the hydropower converter is reversible in direction to generate electricity from ambient water flow in either of two directions.

61. The power generation assembly according to claim 1 further comprising one or more plates mounted to the support structure to define one or more sides of a water channel for water flowing past said baffle assembly.

62. A method of generating electricity from ambient water flow, the method comprising the steps of:
deploying a power generation assembly in the water flow, the power generation assembly comprising:
a support structure;
a baffle assembly mounted to the support structure and positionable in the water flow for increasing velocity of the ambient water flow, the baffle assembly comprising at least one baffle panel member for providing at least one opening to enable water to pass said baffle assembly at an increased velocity relative to that of the ambient water flow when the support structure is deployed therein;
a hydropower converter located at a predetermined distance rearward, or downstream of, the baffle assembly and positioned to be actuated by water passing said baffle assembly at said increased velocity; and
a generator operatively coupled to the hydropower converter for generating electricity as a result of water flowing through the baffle assembly;
positioning the hydropower converter in the increased water flow passing the baffle assembly for actuating said hydropower converter;
causing the hydropower converter to operate the generator to generate electricity; and
adjusting the depth of the at least one baffle assembly in the water to reduce the amount of energy captured by the hydropower converter.

63. The method according to claim 62, wherein the baffle assembly increases the velocity of water passing through the at least one opening by 50-200% relative to the ambient water velocity.

64. The method according to claim 62, wherein the at least one opening of the baffle assembly is located on the at least one baffle panel member and the flow of water passes through the opening at increased velocity relative to ambient water.

65. The method according to claim 62, wherein the baffle assembly comprises two or more separate baffle panels having an inter-panel spacing between adjacent panels to form a said at least one opening through which the flow of water passes at increased velocity relative to ambient water.

66. The method according to claim 62, wherein the support structure of the power generation assembly is deployed at the surface of the flow of water.

67. The method according to claim 62, wherein the support structure is deployed below the surface of the flow of water.

68. The method according to claim 62, wherein the hydropower converter is a turbine, water wheel, or Archimedes screw.

69. The method according to claim 62, wherein the hydropower converter is a water wheel comprising a plurality of paddles mounted to a rotatable shaft.

70. The method according to claim 69, wherein the water wheel comprises two or more adjacent sets of paddles.

71. The method according to claim 70, wherein the paddles of the respective sets of paddles are offset from each other.

72. The method according to claim 69, further comprising at least partly retracting the paddles of the water wheel when out of the water to reduce air resistance, sound levels, or both.

73. The method according to claim 62, which further includes providing a plurality of generators operably connected to at least one hydropower converter and selectively engaging and disengaging one or more generators from operative coupling with a hydropower converter for varying the amount of electricity produced by the plurality of generators.

74. The method according to claim 73, wherein the selective engagement and disengagement of generators is performed in response to decreases and increases in the velocity of water flow acting on the hydropower converter.

75. The method according to claim 62, further comprising controllably adjusting forces acting on the hydropower converter as a result of accelerated water flow by performing one or more actions selected from the group consisting of:
(a) varying the depth of the hydropower converter within the water flow;
(b) adjusting the buoyancy of the support structure in the water flow;
(c) adjusting the size of the at least one opening in the baffle assembly or an inter-panel spacing between two or more adjacent baffle panels; and
(d) adjusting the position of the hydropower converter relative to the water flow.

76. The method according to claim 62, further comprising reducing the amount of energy captured by the hydropower converter when the velocity of accelerated water is above a predetermined value.

77. The method according to claim 62, wherein the baffle assembly or the at least one baffle panel member is oriented generally orthogonal to the direction of water flow.

78. The method according to claim 62, wherein the baffle assembly or the at least one baffle panel member is oriented at an angle of between 0° and 180° to the direction of water flow.

79. A method of generating electrical power from flowing water, the method comprising:
providing a first water accelerator assembly in a path of ambient water flow for increasing velocity of the flowing water once past said water accelerator assembly;
providing a hydropower converter downstream of the water accelerator assembly in the path of the increased velocity flowing water to actuate said hydropower converter for producing mechanical energy;
providing a second water accelerator assembly on a side of the hydropower converter opposite that of the first water accelerator assembly; and
operatively coupling said hydropower converter to at least one generator for transferring the mechanical energy from said hydropower converter into rotational input to said at least one generator to generate electrical power;
wherein the hydropower converter is reversible for enabling acceleration of ambient water flow which flows from different directions for facilitating generation of electrical power irrespective of the direction of ambient water flow.

80. A hydrodynamic power generation assembly for generating electricity in an ambient water flow, comprising:
a support structure;
a baffle assembly mounted to the support structure and positionable in the water flow for increasing velocity of the ambient water flow, the baffle assembly comprising at least one baffle panel member for providing at least one opening to enable water to pass said baffle assembly at an increased velocity relative to that of the ambient water flow when the support structure is deployed therein;
a hydropower converter located at a predetermined distance rearward, or downstream, of the baffle assembly and positioned to be actuated by water passing said baffle assembly at said increased velocity, wherein the hydropower converter is a water wheel comprising a plurality of paddles mounted to a rotatable shaft,
a generator operatively coupled to the hydropower converter for generating electricity as a result of flowing water actuating said hydropower converter, and
at least a pair of directional converters located at respective ends of the water wheel shaft which convert rotational energy received from the water wheel and transfers the rotational energy to the at least one generator for actuating the at least one generator.

81. The power generation assembly according to claim 80, wherein the baffle assembly comprises two or more baffle panel members having an inter-panel spacing between adjacent panel members to form a said at least one opening through which the flow of water passes at increased velocity relative to ambient water flow.

82. The power generation assembly according to claim 80, wherein the position of the hydropower converter in relation to the support structure is adjustable to vary the depth of the hydropower converter in the water flow.

83. The power generation assembly according to claim 80, wherein the baffle assembly is a single structural element.

84. The power generation assembly according to claim 80, wherein the support structure is at or near the surface of a body of water during use of the power generation assembly.

85. The power generation assembly according to claim 80, wherein the hydropower converter is a turbine, water wheel, or Archimedes screw.

86. The power generation assembly according to claim 80, further comprising:
(a) a plurality of baffle panels, at least one baffle panel member having at least one opening therein, or the plurality of baffle panels having an inter-panel spacing between adjacent panels to form said at least one opening therebetween, for enabling the flowing water to pass said baffle assembly at an increased velocity relative to the ambient water flow; and
(b) a plurality of hydropower converters, each hydropower converter positioned rearwardly, or downstream of, the baffle assembly at a distance to thereby be actuated by the increased velocity water impinging upon the hydropower converter relative to ambient water flow.

87. The power generation assembly according to claim 80, further comprising a control mechanism to adjust the angle of the at least one baffle panel member about the horizontal axis, vertical axis, or both, to vary the amount of velocity increase imparted to the ambient water flow as it flows past the baffle assembly.

88. The power generation assembly according to claim 80, further comprising one or more flow directors for channeling the water flow to the baffle assembly.

89. The power generation assembly according to claim 80, wherein the hydropower converter is a water wheel comprising a plurality of paddles mounted to a rotatable shaft.

90. The power generation assembly according to claim 89, further comprising a directional converter which converts rotational energy received from the water wheel and transfers the rotational energy to the at least one generator for actuating the at least one generator.

91. The power generation assembly according to claim 80, further comprising a second baffle assembly mounted to the support structure at a location opposite to the first baffle assembly, and wherein the hydropower converter is reversible in direction to generate electricity from ambient water flow in either of two directions.

92. A hydrodynamic power generation assembly for generating electricity in an ambient water flow, comprising:
- a support structure;
- a baffle assembly mounted to the support structure and positionable in the water flow for increasing velocity of the ambient water flow, the baffle assembly comprising at least one baffle panel member for providing at least one opening to enable water to pass said baffle assembly at an increased velocity relative to that of the ambient water flow when the support structure is deployed therein;
- a hydropower converter located at a predetermined distance rearward, or downstream, of the baffle assembly and positioned to be actuated by water passing said baffle assembly at said increased velocity,
- a second baffle assembly mounted to the support structure at a location opposite to the first baffle assembly, and wherein the hydropower converter is reversible in direction to generate electricity from ambient water flow in either of two directions; and
- a generator operatively coupled to the hydropower converter for generating electricity as a result of flowing water actuating said hydropower converter.

93. The power generation assembly according to claim 92, wherein the baffle assembly comprises two or more baffle panel members having an inter-panel spacing between adjacent panel members to form a said at least one opening through which the flow of water passes at increased velocity relative to ambient water flow.

94. The power generation assembly according to claim 92, wherein the position of the hydropower converter in relation to the support structure is adjustable to vary the depth of the hydropower converter in the water flow.

95. The power generation assembly according to claim 92, wherein the baffle assembly is a single structural element.

96. The power generation assembly according to claim 92, wherein the support structure is at or near the surface of a body of water during use of the power generation assembly.

97. The power generation assembly according to claim 92, wherein the hydropower converter is a turbine, water wheel, or Archimedes screw.

98. The power generation assembly according to claim 92, further comprising:
(a) a plurality of baffle panels, at least one baffle panel member having at least one opening therein, or the plurality of baffle panels having an inter-panel spacing between adjacent panels to form said at least one opening therebetween, for enabling the flowing water to pass said baffle assembly at an increased velocity relative to the ambient water flow; and
(b) a plurality of hydropower converters, each hydropower converter positioned rearwardly, or downstream of, the baffle assembly at a distance to thereby be actuated by the increased velocity water impinging upon the hydropower converter relative to ambient water flow.

99. The power generation assembly according to claim 92, further comprising a control mechanism to adjust the angle of the at least one baffle panel member about the horizontal axis, vertical axis, or both, to vary the amount of velocity increase imparted to the ambient water flow as it flows past the baffle assembly.

100. The power generation assembly according to claim 92, further comprising one or more flow directors for channeling the water flow to the baffle assembly.

101. The power generation assembly according to claim 92, wherein the hydropower converter is a water wheel comprising a plurality of paddles mounted to a rotatable shaft.

102. The power generation assembly according to claim 101, further comprising a directional converter which converts rotational energy received from the water wheel and transfers the rotational energy to the at least one generator for actuating the at least one generator.

103. The power generation assembly according to claim 101, further comprising at least a pair of directional converters located at respective ends of the water wheel shaft.

* * * * *